United States Patent [19]

Yoshida et al.

[11] Patent Number: 5,696,598

[45] Date of Patent: Dec. 9, 1997

[54] COLOR IMAGE COMMUNICATION APPARATUS CAPABLE OF ACCOMMODATING MONOCHROME COMMUNICATION PARTNERS

[75] Inventors: Takehiro Yoshida; Toshifumi Nakajima, both of Tokyo, Japan

[73] Assignee: Canon Kabushiki Kaisha, Tokyo, Japan

[21] Appl. No.: 77,910

[22] Filed: Jun. 17, 1993

[30] Foreign Application Priority Data

| Jun. 18, 1992 | [JP] | Japan | 4-159448 |
| Jun. 30, 1992 | [JP] | Japan | 4-173233 |

[51] Int. Cl.$^6$ .............. H04N 1/00; H04N 1/46
[52] U.S. Cl. .......... 358/434; 358/435; 358/500; 358/440
[58] Field of Search .............. 358/400, 401, 358/405, 406, 434, 435, 436, 437, 438, 439, 462, 468, 500, 501, 504, 515, 518, 440

[56] References Cited

U.S. PATENT DOCUMENTS

| 4,729,033 | 3/1988 | Yoshida | 358/257 |
| 4,739,397 | 4/1988 | Hayashi | 358/501 |
| 4,773,080 | 9/1988 | Nakajima et al. | 375/5 |
| 4,814,894 | 3/1989 | Yoshida | 358/298 |
| 4,815,121 | 3/1989 | Yoshida | 379/67 |
| 4,823,375 | 4/1989 | Yoshida | 379/100 |
| 4,833,529 | 5/1989 | Yamamoto | 358/500 |
| 4,862,250 | 8/1989 | Takei | 358/515 |
| 4,862,282 | 8/1989 | Nakajima | 358/400 |
| 4,885,755 | 12/1989 | Yoshida | 375/58 |
| 4,897,799 | 1/1990 | LeGall et al. | 364/514 |
| 4,926,250 | 5/1990 | Konishi | 358/501 |
| 4,939,767 | 7/1990 | Saito | 358/434 |
| 5,020,096 | 5/1991 | Sakakibara et al. | 379/100 |
| 5,032,904 | 7/1991 | Murai | 358/500 |
| 5,128,985 | 7/1992 | Yoshida et al. | 379/100 |
| 5,208,681 | 5/1993 | Yoshida | 358/404 |
| 5,220,417 | 6/1993 | Sugiura | 358/468 |
| 5,241,403 | 8/1993 | Ishikawa | 358/440 |
| 5,270,805 | 12/1993 | Abe et al. | 358/500 |
| 5,276,509 | 1/1994 | Mizuno | 358/500 |

FOREIGN PATENT DOCUMENTS

| 0390597 | 10/1990 | European Pat. Off. . |
| 0477262 | 9/1991 | European Pat. Off. . |
| 0483969 | 5/1992 | European Pat. Off. . |
| 3408321 | 9/1984 | Germany . |
| 4034540 | 5/1991 | Germany . |

OTHER PUBLICATIONS

Patent Abstracts of Japan, vol. 11, No. 61 (E-483), Feb. 25, 1987, & JP-A-61 220 559 (Hitachi Ltd.), Sep. 30, 1986.

Primary Examiner—Kim Vu
Assistant Examiner—Tia M. Harris
Attorney, Agent, or Firm—Fitzpatrick, Cella, Harper & Scinto

[57] ABSTRACT

A facsimile apparatus comprises discriminating means for discriminating whether a sending image is a color information or not. The apparatus transmits a color information in the transmitting mode corresponding to the discrimination provided by the foregoing discriminating means subsequent to sending to a receiver at a destination in advance the page information determined by the foregoing discriminating means as having a color information when the receiver at the destination has a color receiving function, and transmits all the page information as monochromic information when the receiver at the destination does not have any color receiving function.

15 Claims, 45 Drawing Sheets

FIG. 20

```
'92 05/18 10:36    ☎ 03 123 4567         SALE DEPARTMENT                    📄 001

*********************
                     **** COMMUNICATION RESULTS REPORT ****
                     *********************

SENDING IS COMPLETED
COMMUNICATION NUMBER              7226                SELECTION OF COLOR TRANSMISSION : YES
DESTINATION TELEPHONE NUMBER      03 300 00           EXECUTION OF COLOR TRANSMISSION : YES
DESTINATION ABBREVIATION          SALE DEPARTMENT
START TIME                        05/18 10:31
COMMUNICATION TIME                05'08
NUMBER OF SHEETS                  6
```

FIG. 21

'92 01/06 14:04 ☎ 03 123 4567  SALE DEPARTMENT

************************
* COMMUNICATION MANAGEMENT REPORT **
************************

📄 001

| COMMUNICATION MODE | | DESTINATION TELEPHONE NUMBER | DESTINATION ABBREVIATION | START TIME | COMMUNICA-TION TIME | NUMBER OF SHEET | COMMUNICA-TION RESULT | COLOR TRANSMISSION | |
|---|---|---|---|---|---|---|---|---|---|
| | | | | | | | | SELECTION | EXECUTION |
| SENDING | G3 | 03 300 00△▽ | SALE DEP. | 12/27 15:30 | 01'26 | 1 | OK | YES | YES |
| SENDING | ECM | 03 300 00△▽ | SALE DEP. | 12/27 15:59 | 00'48 | 1 | OK | — | NO |
| SENDING | G3 | 03 300 00△▽ | SALE DEP. | 12/27 16:13 | 02'36 | 4 | OK | YES | NO |
| SENDING | ECM | 03 300 00△▽ | SALE DEP. | 12/27 16:19 | 01'31 | 2 | OK | — | YES |
| SENDING | ECM | 03 300 00△▽ | SALE DEP. | 12/27 16:21 | 00'41 | 1 | OK | YES | — |
| SENDING | ECM | 03 300 00△▽ | SALE DEP. | 12/27 16:38 | 07'22 | 10 | OK | NO | NO |
| SENDING | ECM | 03 300 00△▽ | SALE DEP. | 12/27 16:48 | 00'35 | 1 | OK | NO | NO |
| AUTO RECEPTION | ECM | 03 300 00△▽ | SALE DEP. | 12/27 16:55 | 00'45 | 1 | OK | NO | — |
| SENDING | ECM | 03 300 00△▽ | SALE DEP. | 12/27 17:00 | 00'43 | 1 | OK | YES | YES |
| SENDING | G3 | 03 300 00△▽ | SALE DEP. | 12/27 17:05 | 00'49 | 1 | OK | — | NO |
| SENDING | G3 | 03 300 00△▽ | SALE DEP. | 12/27 17:59 | 00'44 | 1 | OK | — | NO |
| SENDING | G3 | 03 300 00△▽ | SALE DEP. | 12/27 18:21 | 07'03 | 13 | OK | — | YES |
| AUTO RECEPTION | G3 | 03 300 00△▽ | SALE DEP. | 12/27 19:25 | 00'48 | 1 | OK | YES | — |
| AUTO RECEPTION | ECM | 03 300 00△▽ | SALE DEP. | 12/27 23:34 | 00'56 | 2 | OK | YES | NO |
| AUTO RECEPTION | G3 | 03 300 00△▽ | SALE DEP. | 12/28 01:43 | 01'05 | 2 | OK | NO | — |
| AUTO RECEPTION | G3 | 03 300 00△▽ | SALE DEP. | 12/28 04:48 | 01'23 | 2 | OK | YES | — |
| AUTO RECEPTION | G3 | 03 300 00△▽ | SALE DEP. | 12/30 15:15 | 00'43 | 1 | OK | YES | — |

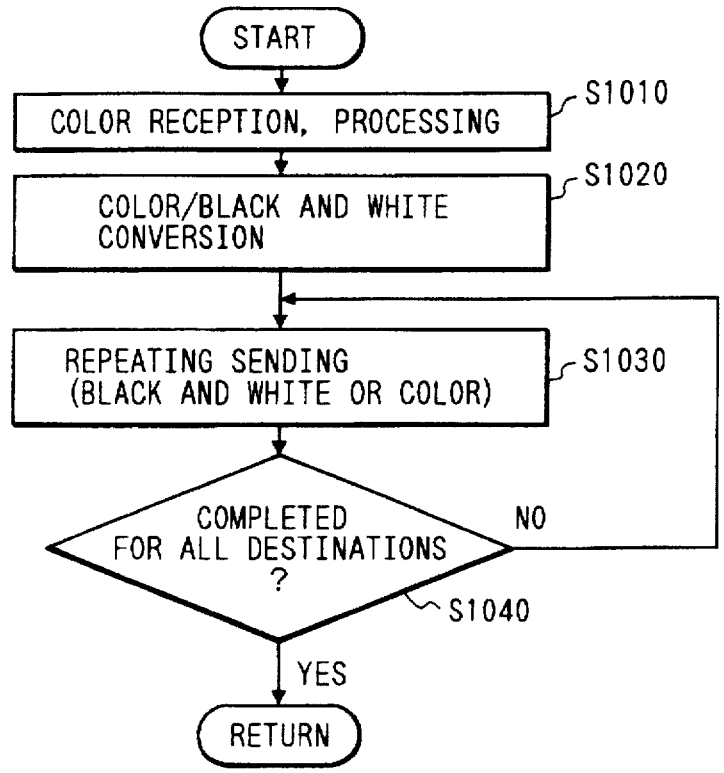
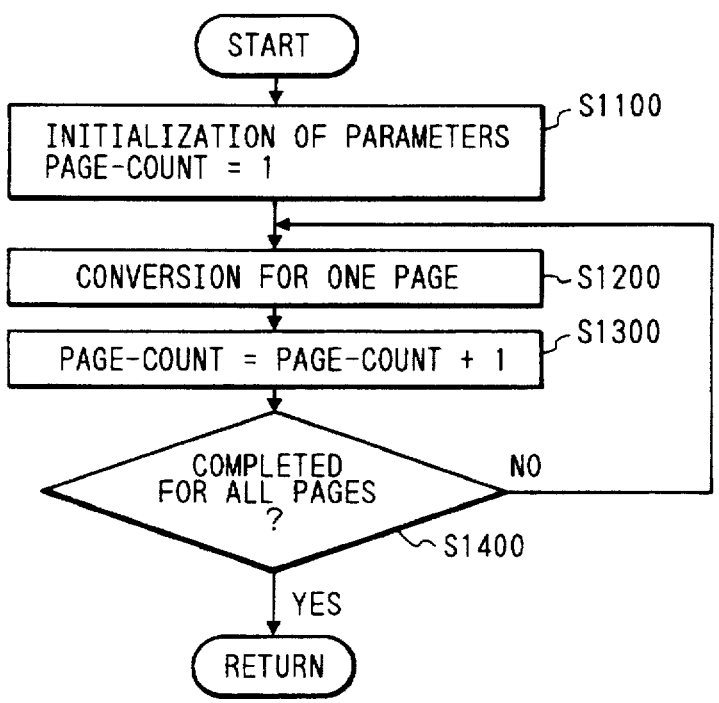

| RED | GREEN | BLUE | 64 GRADATIONS BLACK AND WHITE |
|---|---|---|---|
| 255 | 255 | 255 | 63 |
| 255 | 255 | 254 | 63 |
| . | . | . | . |
| . | . | . | . |
| . | . | . | . |
| . | . | . | . |
| . | . | . | . |
| 0 | 0 | 1 | 0 |
| 0 | 0 | 0 | 0 |

```
RED              : FROM 0 TO 255 → 256 DEGREES {REDDEST IN 255}
GREEN            : FROM 0 TO 255 → 256 DEGREES {GREENEST IN 255}
BLUE             : FROM 0 TO 255 → 256 DEGREES {BLUEST IN 255}
64 GRADATIONS
BLACK AND WHITE: FROM 0 TO 63  →  64 DEGREES {0=WHITE 63=BLACK}
```

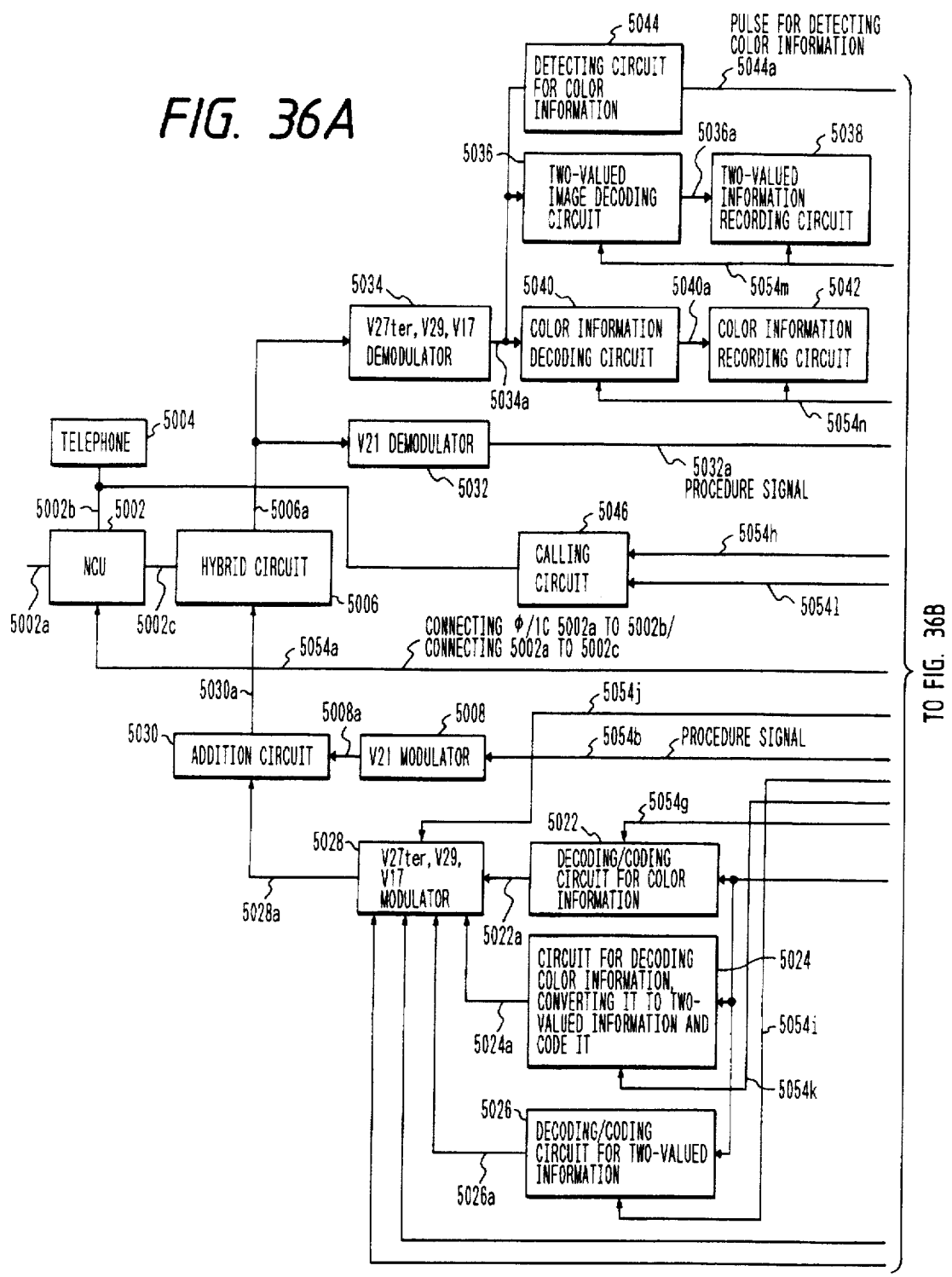

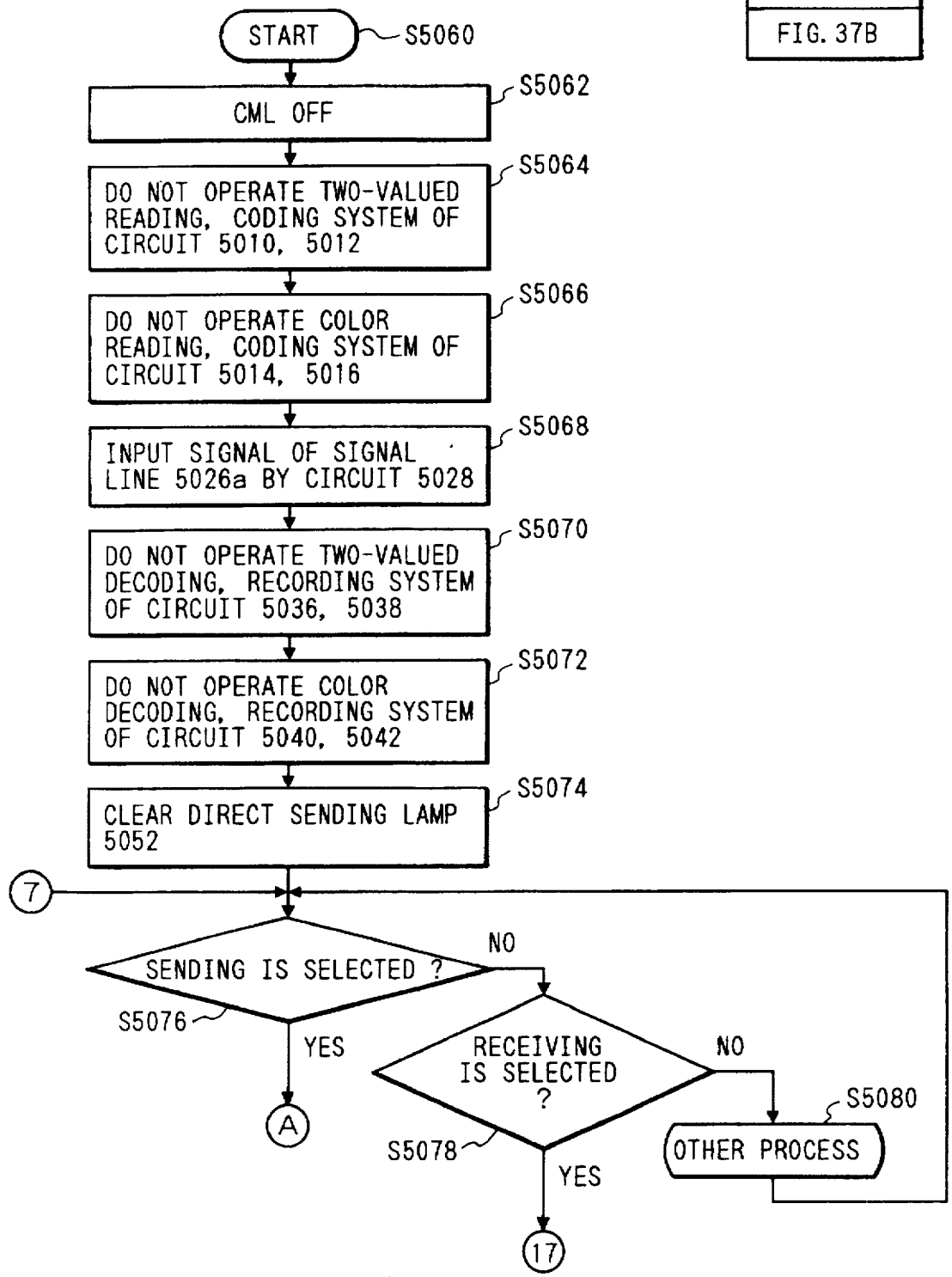

FIG. 43
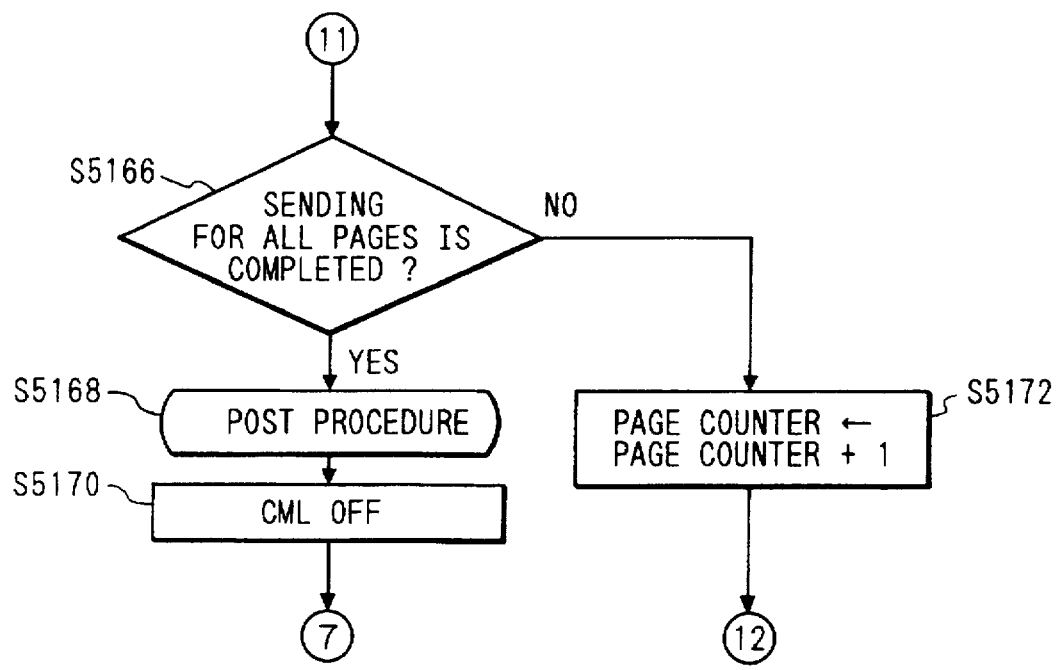
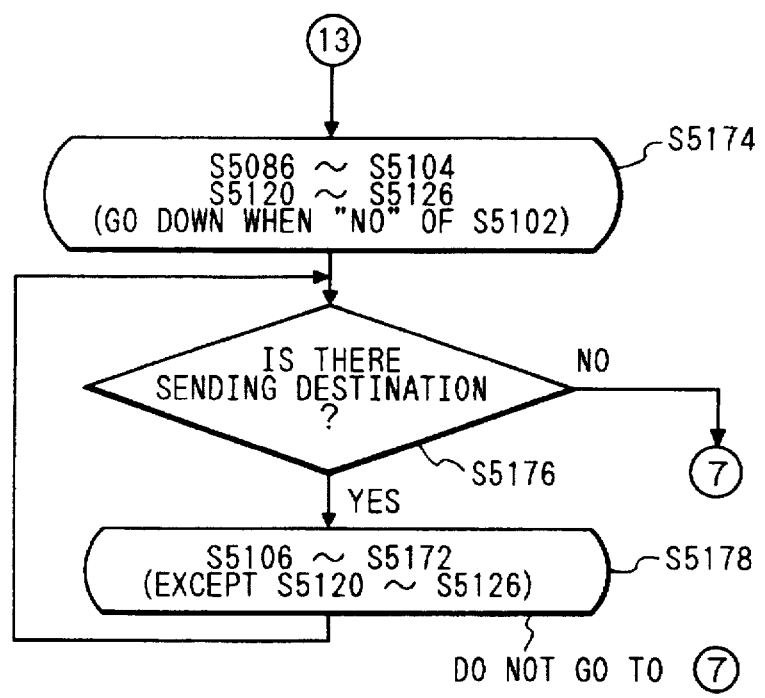

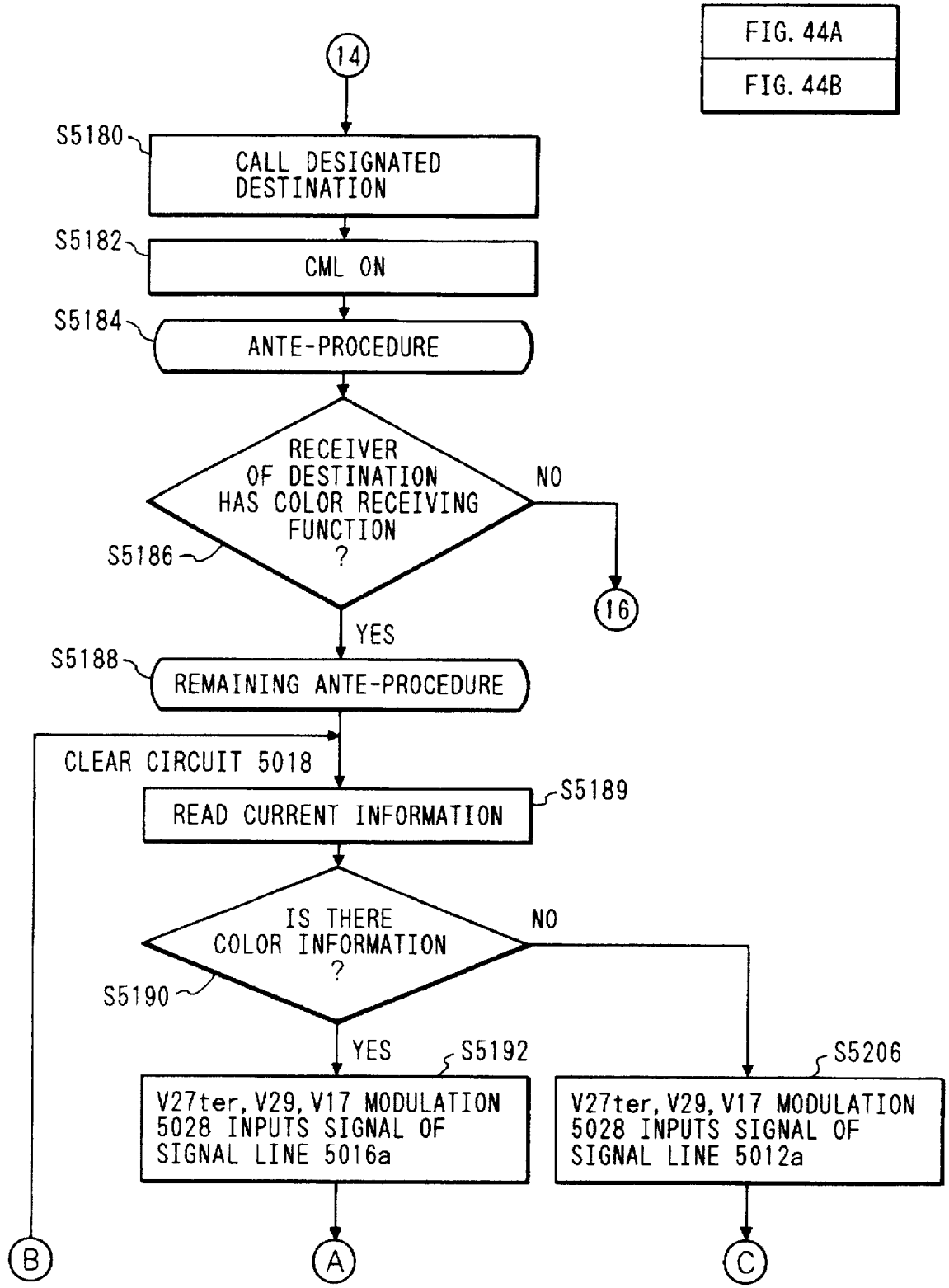

COLOR IMAGE COMMUNICATION APPARATUS CAPABLE OF ACCOMMODATING MONOCHROME COMMUNICATION PARTNERS

BACKGROUND OF THE INVENTION

1. Field of the Invention

The present invention relates to an image sending or receiving apparatus such as an apparatus capable of sending or receiving color image data.

2. Related Background Art

In a conventional facsimile apparatus capable of color reading, color transmitting, and color recording, the color transmission is confined only to a specific destination. In other words, if a color transmission is selected on the sending side, the facsimile apparatus on the sending side immediately reads the source document in color for the color transmission on the assumption that an apparatus on the receiving side is also equipped with a function to transmit or record data in color without any particular attention given to the apparatus on the receiving side.

Also, in a transit sending, the conventional facsimile apparatus may be capable of relaying only monochromic image or of communicating color image, but not capable of providing any function required for transit sending.

Now, although it is apparent that the demand on the color transmission will increase, which will lead to a wide use of color transmission, there are still many numbers of facsimile apparatuses in use on the market, which handle only the two-valued information of black and white. Therefore, along the wide spread of the color transmission, there will be a more mix up of the facsimile apparatuses handling only the two-valued data on black and white, and those capable of handling color transmission. Accordingly, such an inconvenience will often take place that the receiving side is not equipped with any means to receive color transmission even if the sending side has selected the color transmission.

Also, in a facsimile apparatus having the function of color image communication and relaying monochromic image only, but not equipped with any function of executing any transit sending, there is a problem that it is impossible to send the color image received from the other color facsimile apparatus as a transit sending to any facsimile apparatus dedicated only to the monochromic communication.

SUMMARY OF THE INVENTION

It is an object of the present invention to provide an image transmitting apparatus whereby to solve the above-mentioned problems individually or totally.

With a view to solving such problems, it is another object of the present invention to provide an image transmitting apparatus capable of executing a multiple sending.

It is still another object of the present invention to provide an image transmitting apparatus capable of sending color image data at a high speed.

In order to achieve these objectives, an image transmitting apparatus which will be disclosed according to the preferred embodiment of the present invention comprises:

discriminating means for discriminating whether the multiple receiving sides have a color receiving function or not;

means for converting a color image information to a monochromic image information;

transmitting means for transmitting the color image information when the multiple receiving sides are discriminated by the aforesaid discriminating means as having the color receiving function in transmitting a color image information; and transmitting means for transmitting the monochromic image information when the multiple receiving sides are discriminated by the aforesaid discriminating means as not having the color receiving function.

Also, it is a further object of the present invention to provide a new function for a color transmitting apparatus.

The above-mentioned and other objects, features, and advantages of the present invention will become more apparent by reference to the following detailed description of the invention taken in conjunction with the accompanying drawings.

BRIEF DESCRIPTION OF THE DRAWINGS

FIG. 20 is a view showing an example of the report on the communication results according to an embodiment.

FIG. 21 is a view showing an example of the report on the communication management according to an embodiment.

FIG. 22 is a view showing an example of the one-touch dial list according to an embodiment.

FIG. 30 is a flowchart showing the outline of the transit sending control for the facsimile apparatus according to the second embodiment.

FIG. 31 is a detailed flowchart showing the step S1020 shown in FIG. 30.

FIG. 36 which comprises FIGS. 36A and 36B is a block diagram showing the structure of another embodiment according to the present invention.

FIGS. 44A and 44B to FIG. 47 are views showing the operation of the embodiment shown in FIGS. 36A and 36B.

DETAILED DESCRIPTION OF THE PREFERRED EMBODIMENTS

Hereinafter, with reference to the accompanying drawings, the detailed description will be made of the embodiments according to the present invention.

[First Embodiment]

Figure 1:
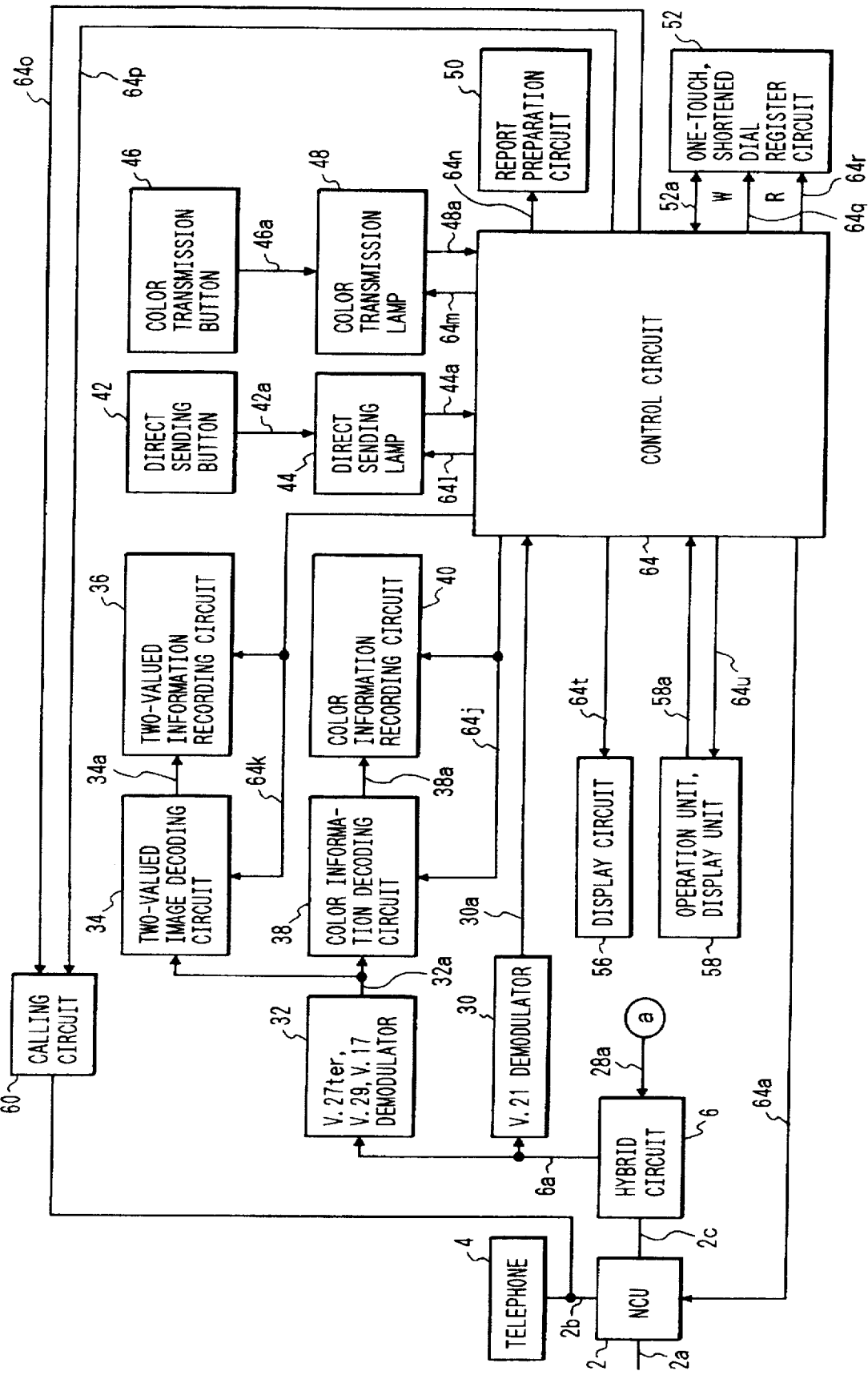
FIG. 1 is a block diagram showing the structure of a facsimile apparatus according to an embodiment of the present invention.
Figure 2:
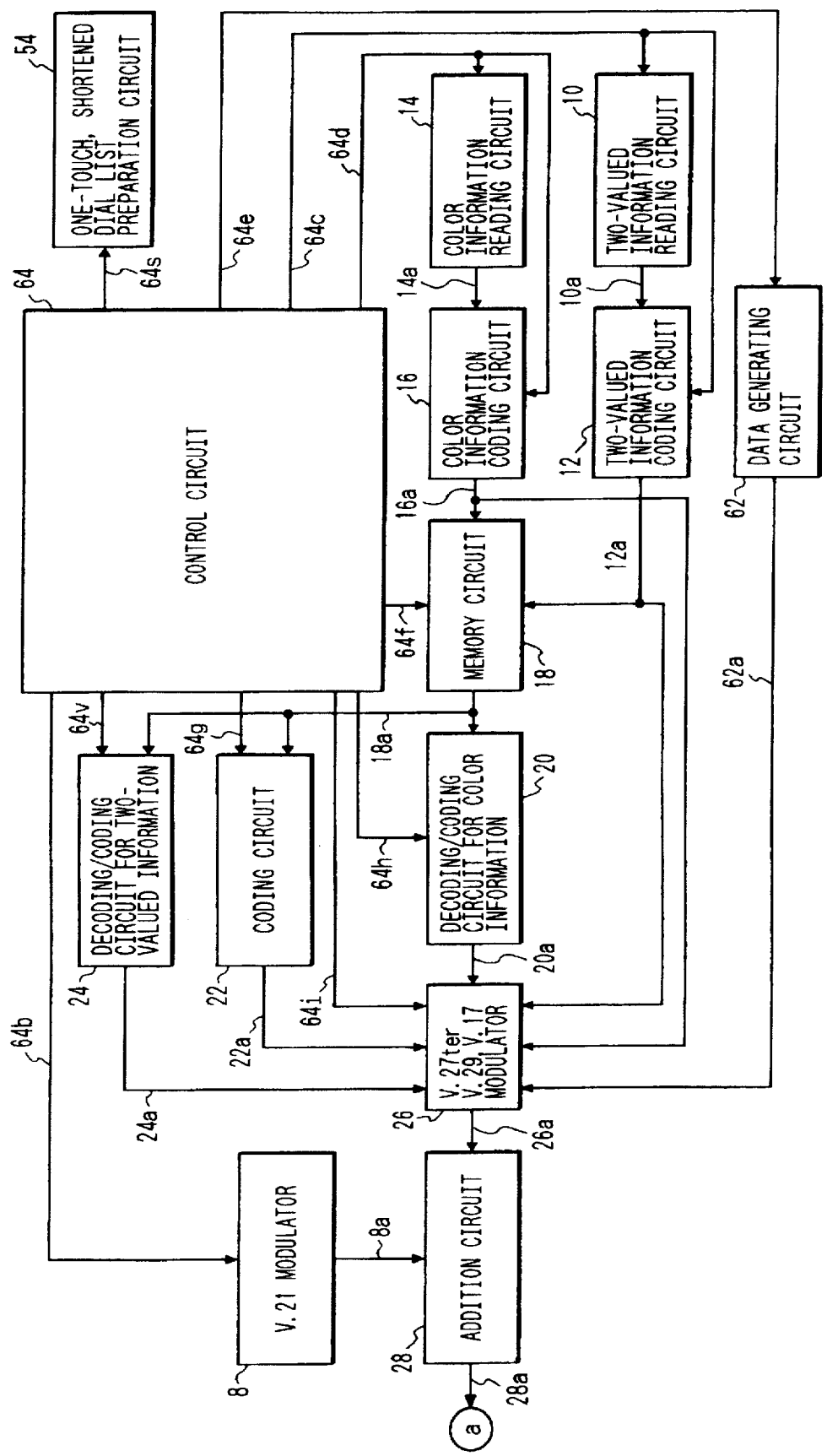
FIG. 2 is a block diagram showing the structure of a facsimile apparatus according to an embodiment of the present invention.

FIG. 1 and FIG. 2 are block diagrams showing the entire structure of a facsimile apparatus according to a first embodiment.

In FIG. 1 and FIG. 2, an NCU (Network control Unit) 2 is connected to the circuit of a network in order to utilize a telephone network (not shown) for the data communication and others. The unit controls the connection to the telephone network, the switching to the data communication passages, and the loop maintenance. The NCU 2 receives signals from a signal line 64a, and connects the telephone circuit (signal line 2a) to a telephone set 4 side if the signal received represents the logical level "0", that is, the signal line 2a is connected to the signal line 2b. Also, if the signal level of the signal line 64a represents the logical level "1", the telephone circuit is connected to the facsimile apparatus side, that is, the signal line 2a is connected to the signal line 2c. In this respect, the telephone circuit is usually connected to the telephone set side.

A hybrid circuit 6 separates the signals of the sending system from those of the receiving system. The sending signals from the signal line 28a are sent out to the telephone circuit through the NCU 2 via the signal line 2c. Also, the signals from a communicating destination are output to the signal line 6a through the NCU 2 via the signal line 2c. A modulator 8 receives the procedural signals from the signal line 64b to modulate them on the basis of the known CCITT Recommendation V.21 thereby to output the modulated data to the signal line 8a.

A reading circuit 10 is a circuit to read two-valued information. In other words, when a signal having the signal level "1" is output to the signal line 64c, this circuit reads from a source document (original) to be sent the image signals for one-line portion in the main scanning direction sequentially to form the signal lines which represent the two-valued black and white. This circuit comprises a photographing element such as CCD (Charge Coupled Device) and optical systems, for example. Then, the signal lines which have been binarized black and white are output to a signal line 10a. On the other hand, if a signal having the signal level "0" is output to the signal line 64c, the reading circuit 10 is not actuated.

A coding circuit 12 receives the two-valued information data read and output to the signal line 10a when the signal having the signal level "1" is output to the signal line 64c, and outputs the data which are MH (Modified Huffman) coded or MR (Modified Read) coded to the signal line 12a. Here, the coding circuit 12 is not actuated, either, when a signal having the signal level "0" is output to the signal line 64c. A color information reading circuit 14 reads from a source document to be sent the image signals for one-line portion in the main scanning direction sequentially when a signal having the signal level "1" is output to a signal line 64d thereby to form the signal lines representing color information. Then, this color information is output to a signal line 14a. When a signal having the signal level "0" is output to the signal line 64d, the color information reading circuit 14 is not actuated, either.

Then, a color information coding circuit 16 receives the color information data which are read and output from the signal line 14a when a signal having the signal level "1" is output to the signal line 64d, and outputs the color coded data to the signal line 16a. Here, if a signal having the signal level "0" is output to the signal line 64d, the color information coding circuit 16 is not actuated, either.

A memory circuit 18 receives signals from the signal line 12a or signal line 16a by the control exercised by a control circuit 64 through a signal line 64f, and stores them in the memory circuit. Likewise, this circuit outputs the information thus stored in the memory circuit to a signal line 18a by the control exercised by the control circuit 64.

A color information decoding/coding circuit 20 receives signals output from the signal line 18a by the control exercised by the control circuit 64 through a signal line 64h in order to decode the color information as required by converting and coding the size density thereby to output the signals which agree with the conditions on the receiving side to a signal line 20a.

A coding circuit 22 is a circuit whereby to decode a color information, convert it to a two-valued information, and code the two-valued information. This circuit receives the signal output to the signal line 18a in accordance with the control signal from a signal line 64g, and decodes the color information, converts it to the two-valued information, converts the size density as required, and again decodes the two-valued information thereby to output the signal which will agree with the conditions of a facsimile apparatus on the receiving side to a signal line 22a.

A two-valued information decoding/coding circuit 24 receives signals output to the signal line 18a in accordance with the control signal from a signal line 64v, and decodes the two-valued information as required, converts and codes the size and density, to output the signal which will agree with the conditions of a facsimile apparatus on the receiving side to a signal line 24a.

A modulator 26 executes demodulations on the basis of the known CCITT Recommendation V.27 ter (differential phase modulation), V.29 (orthogonal modulation) or V.17. This modulator 26 receives signals from the signal line 20a when a signal "0" is output to a signal line 64i. Thereafter, when signals "1", "2", "3", "4", and "5" are output to the signal line 64i likewise, the modulator receives signals from the signal lines 22a, 24a, 16a, 12a, and 62a for modulation and outputs the modulated data to the signal line 26a. Also, an addition circuit 28 receives signals from the signal line 8a and signal line 26a and outputs the result of the addition of these signals to a signal line 28a.

A dedemodulator 30 executes demodulations on the basis of the known CCITT Recommendation V.21. In other words, receiving signals from the signal line 6a, the dedemodulator demodulates them on the basis of the V.21 and outputs the demodulated data to a signal line 30a. Also, a demodulator 32 is the one which executes demodulations on the basis of the known CCITT Recommendation V.27 ter (differential phase modulation), V.29 (orthoGonal modulation) or V.17. Then, the demodulator 32 receives signals from the signal line 6a for demodulation and outputs the data thus demodulated to a signal line 32a.

A decoding circuit 34 receives signals from the signal line 32a and outputs the two-valued information which are MH (Modified Huffman) decoded or MR (Modified Read) decoded to a signal line 34a. Also, the decoding circuit 34 is not actuated when a signal having the signal level "0" is output to a signal line 64k.

Also, a recording circuit 36 receives the two-valued information from the signal line 34a sequentially when a signal having the signal level "1" is output to the signal line 64k and records the two-valued information for each one-line portion. This recording circuit 36 is not actuated, either, when a signal having the signal level "0" is output to the signal line 64k.

A decoding circuit 38 receives signals from the signal line 32a when a signal having the signal level "1" is output to a signal line 64j, and outputs the data on the decoded color information to a signal line 38a. This circuit is not actuated, either, when a signal having the signal level "0" is output to the signal line 64j.

A recording circuit 40 receives color information output to the signal line 38a sequentially when a signal having the signal level "1" is output to the signal line 64j and records the color information. This circuit is not actuated, either, when a signal having the signal level "0" is output to the signal line 64j.

A direct sending button 42 is a button used for executing a direct sending. When this button is depressed, a depressed pulse is generated in a signal line 42a. Also, when a clear pass is generated in a signal line 64l, a direct sending lamp 44 is illuminated, thus repeating the light on →light off →light on per generation of the depressed pulse in the signal line 42a. When the direct sending lamp 44 is turned off, a signal having the signal level "0" is output to a signal line 44a. When the direction sending lamp 44 is turned on, a signal having the signal level "1" is output to the signal line 44a.

A color transmission selection button 46 is a button used when a color transmission is executed. When this button is depressed, a depressed pulse is generated in a signal line 46a. Also, a color transmission selection lamp 48 is turned off when a clear pass is generated in a signal line 64 m, thus repeating the light on →light off →light on per generation of the depressed pulse in the signal line 64a. Also, when the color transmission selection lamp 48 is turned off, a signal having the signal level "0" is output to the signal line 48a. When the color transmission selection lamp 48 is turned on, a signal having the signal level "1" is output to the signal line 48a.

A report preparation circuit 50 receives information output to a signal line 64n and makes reports on communication results and management.

A one-touch and shortened dial register circuit 52 is a circuit to register whether the destination at each dial is equipped with a color receiving function or not. For each storage in this circuit 52, a one-touch or shortened dial signal (01 to 36 for the one-touch, for example; in this case, any one of the numbers from 01 to 36 or ,00 to *99 for the shortened dial; in this case, any one of the numbers from *00 to *99) should be output to a signal line 52a. Then, write pulses are generated in a signal line 64q after a space, a telephone number (0337582111, for example) corresponding to a one-touch or shortened dial, a space, and the availability of the color receiving function at the destination of this dial is output. (Here, it is assumed that 0 stands for unregistered; 1, the color receiving function available; and 2, color receiving function unavailable.) Then, the telephone number of the destination, and the availability of the color receiving function at this number are registered corresponding to the one-touch dial or shortened dial.

Also, in reading the information stored in this circuit 52, reading pulses are generated in a signal line 64r after a one-touch dial (either one of 00 to 36) or a shortened dial (either one of *00 to *99) is output to a signal line 52a. In this way, the registered telephone number and color function availability corresponding to the designated one-touch dial or shortened dial are output to the signal line 52a. In this respect, a one-touch and shortened dial list preparation circuit 54 receives signals output to a signal line 64s and prepares the one-touch and shortened dial list.

A display circuit 56 is a circuit to indicate that the destination is not equipped with the color receiving function when a signal having the signal level "1" is output to a signal line 64t. Here, this circuit 56 does not indicate anything when a signal having the signal level "0" is output to the signal line 64t. A display unit 58 in the operation unit is a circuit to output the depressed information to a signal line 58a as its operation and also display signals from a signal 64u when such signals are received.

A calling circuit 60 receives data output to a signal line 64o when a calling instruction pulse is generated in a signal line 64p and sends out selected signals to a signal line 2b. Also, a data generating circuit 62 is a circuit to output a message to a signal line 62a by the control through a signal line 64e when a data output instruction is output, indicating that a color information is to be sent out by a designated coding method in a designated size.

A control circuit 64 reads a color information and stores it in a memory when a memory sending is executed in a state that the color information transmission is selected. Then, after the storage in the memory, a call is sent to a designated destination to which the memory sending is to be executed in order to transmit the color information if the receiver at the destination is equipped with the color receiving function. If the receiver is not equipped with any color receiving function, the control circuit converts the color information into a two-valued information for its transmission. Also, if a multiple sending is executed in a state that a color information transmission is selected, the control circuit reads the color information, stores it in the memory, and sends out a call to the designated destination for such multiple sending after the storage in the memory. At this juncture, if the receiver at the destination is equipped with a color receiving function, the color information will be transmitted, but if the receiver at the destination is not equipped with any color receiving function, the color information is converted into a two-valued information for transmission.

Also, if a direct sending is executed in a state that a color information transmission is selected, the control circuits read the color information if the receiver at the destination is equipped with a color receiving function for the color information transmission, but if the receiver at the destination is not equipped with any color receiving function, it reads a two-valued information and transmits such two-valued information.

Also, the control circuit 64 stores and records the presence or absence of any color transmission as well as the execution of such color transmission in the reports on the communication results and management made by the report preparation circuit 50. Further, in a multiple sending, if a color transmission is selected, the control circuit stores the presence or absence of the execution of color transmission for each of the parties at the destinations of such multiple sending, and records this as a list of the multiple sending results.

Further, there is provided means for registering whether the receiver at the destination is equipped with the color receiving function or not in accordance with each of the one-touch and shortened dials, and when a telephone number is registered with a one-touch or shortened dial, the aforesaid means for registering whether the color receiving function is available or not is cleared. Then, after whether any transmission to the destination at a one-touch or shortened dial is selected or not is ascertained, such a telephone number is registered with the aforesaid means for registering such availability of the color receiving function. Also, when the one-touch and shortened dial list is selected, whether the color receiving function is available or not is also recorded on a part of the list.

Subsequently, the detailed description will be made of the control procedures in a facsimile apparatus according to the present embodiment.

FIG. 3 to FIG. 19 are flowcharts showing the control procedures of the control circuit 64 constituting a facsimile apparatus according to the first embodiment shown in the diagrams of FIG. 1 and FIG. 2.

Figure 3:
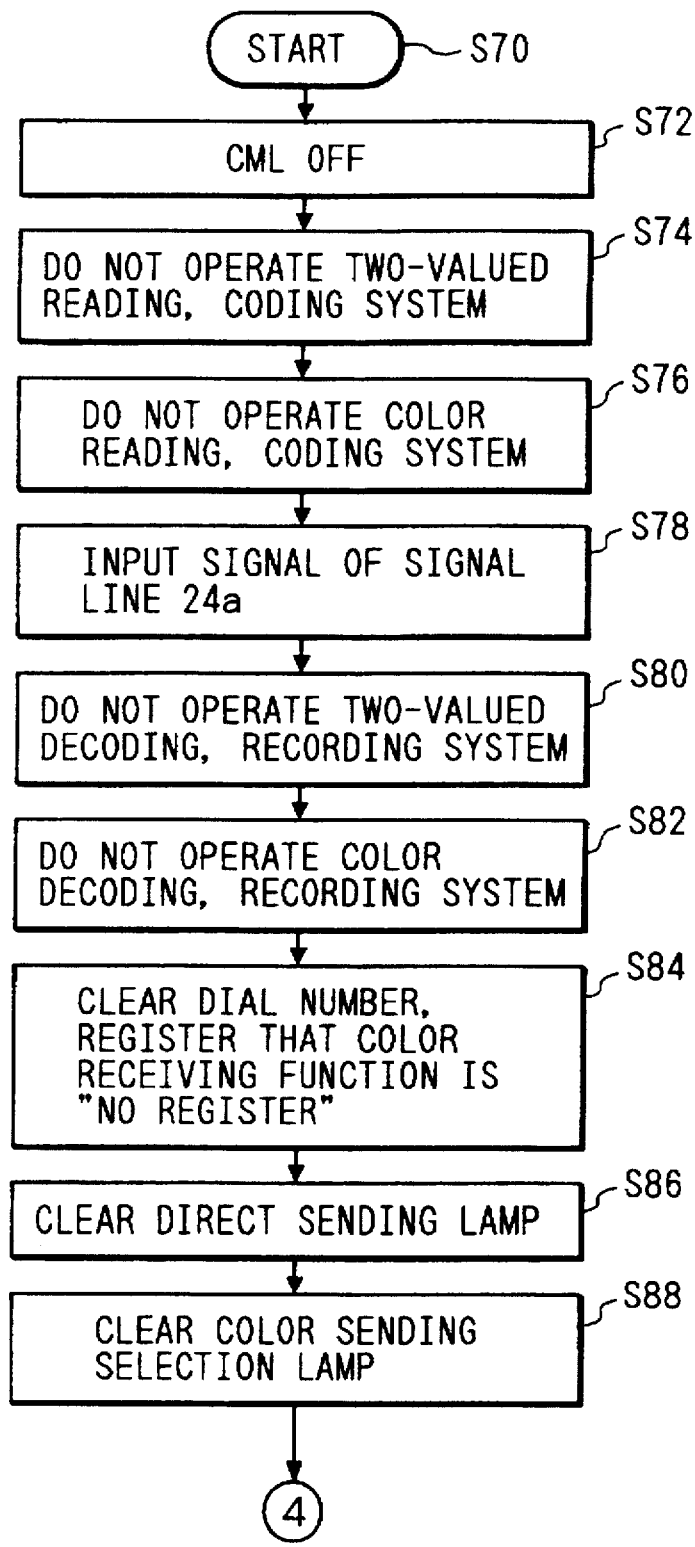
FIG. 3 to FIG. 19 are flowcharts showing the control procedures in a control circuit constituting a facsimile apparatus according to a first embodiment of the present invention.

In FIG. 3, the control circuit 64 outputs a signal having the signal level "0" to the signal line 64 in step S72 to turn off the CML. In step S74, the control circuit outputs a signal having the signal level "0" to the signal line 64c to set the two-valued information reading circuit 10 and the two-valued information coding circuit so that these circuits are not actuated. Then, in step S76, a signal having the signal level "0" is output to the signal line 64d to set the color information reading circuit 14 and the color information coding circuit 16 so that these circuits are not actuated.

In step S78, a signal "2" is output to the signal line 64i. The modulator 26 of the V.27 ter, V.29, and V.17 is set to receive signals from the signal line 24a, and in step S80, a signal having the signal level "0" is output to the signal line 64k to set the two-valued information decoding circuit 34 and the two-valued information recording circuit 36 so that these circuits are not actuated.

In the following step S82, a signal having the signal level "0" is output to the signal line 64j to set the color information decoding circuit 38 and the color information recording circuit 40 so that these circuits are not actuated. Also, in step S84, the one-touch and shortened dial register circuit 52 including the presence or absence of the color receiving function is cleared. Here, the color receiving function at each of the other parties is registered as "unregistered".

In step S86, a clear pass is generated in the signal line 64l to turn off the direct sending lamp 44. In step S88, a clear pass is generated in the signal line 64 m to turn off the color transmission selection lamp 48.

Figure 4:
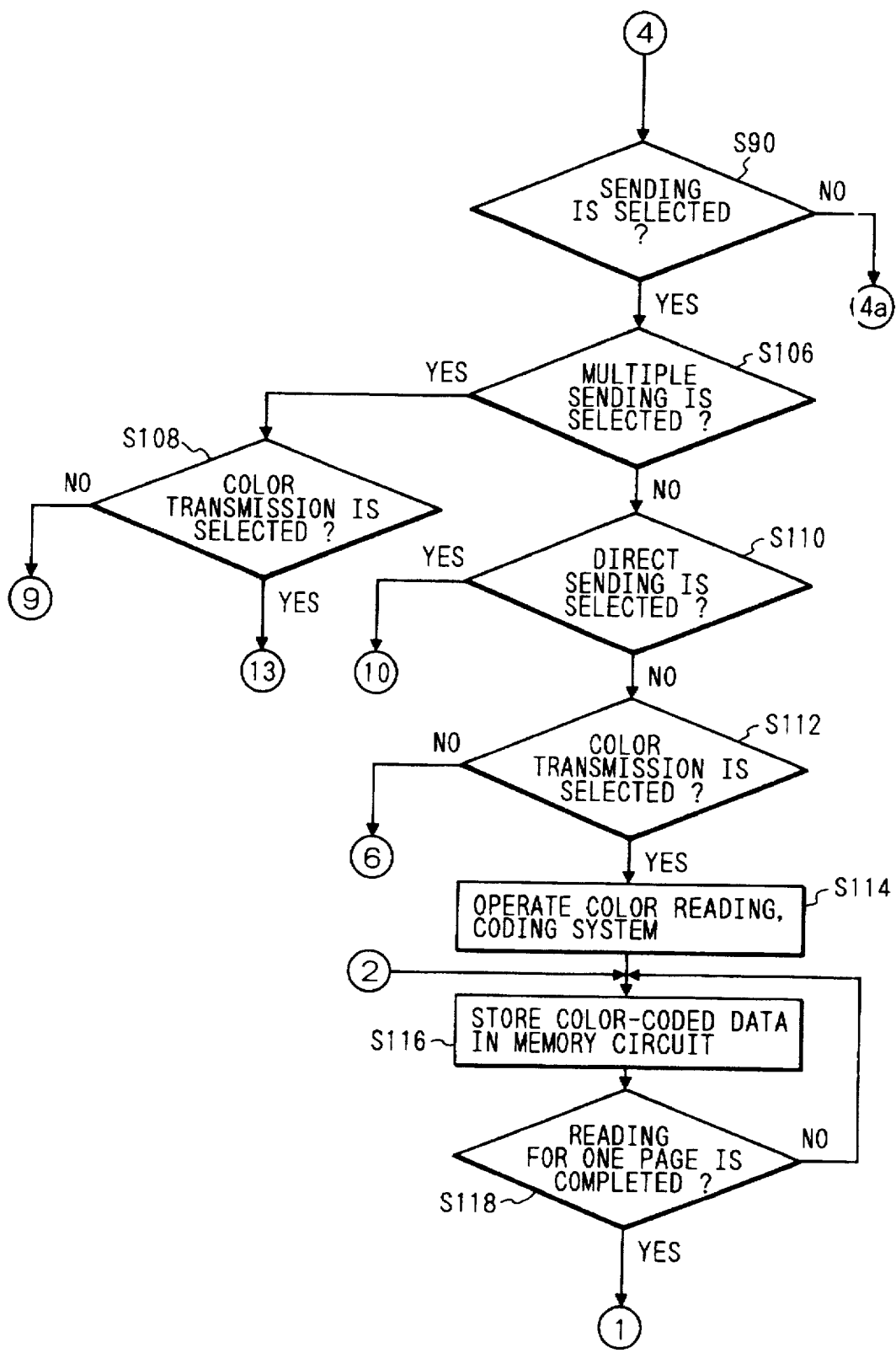
Figure 5:
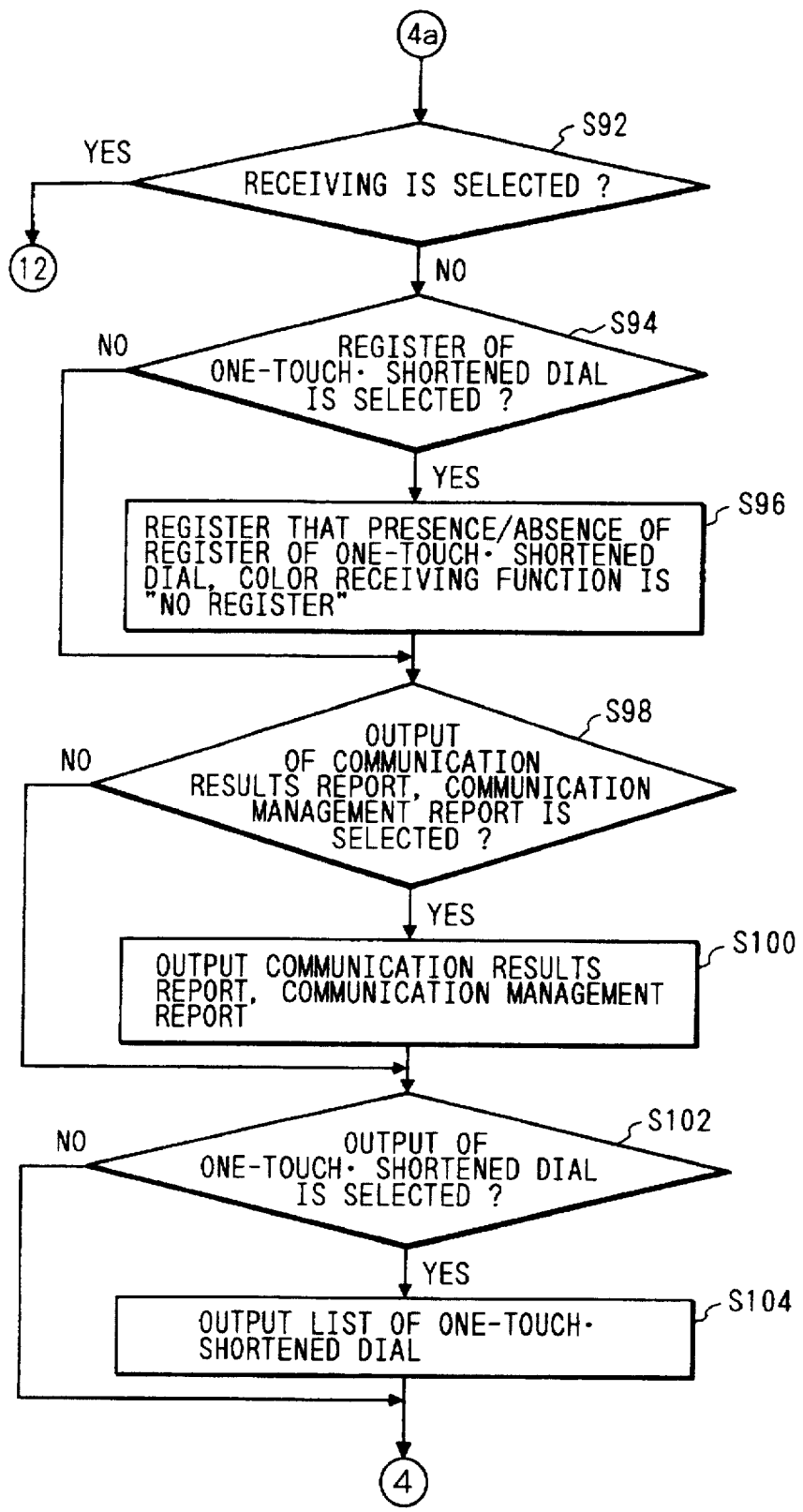

In step S90 shown in FIG. 4, whether any sending is selected or not is examined. If a sending is selected, the process will proceed to step S106. If no sending is selected, the process will proceed to step S92. Also, in the step S92 shown in FIG. 5, whether any reception is selected or not is examined. If a reception is selected, the process will proceed to step S268. If no reception is selected, the process will proceed to step S94.

In the step S94, the control circuit 64 receives signals from the signal line 58a to judge whether the registeration of any one-touch and shortened dial is selected or not. If such registeration is selected, the process will proceed to step S96 to make both the designated one-touch and shortened dial registeration with the register circuit 52 and the presence or absence of the color receiving function on the side of the registered party "unregistered". Also, if no one-touch dial or shortened dial registeration is selected, the process will proceed to step S98.

In the step S98, whether the communication result report and communication management report are selected or not is examined. If the output is selected, the process will proceed to step S100 to output the presence or absence of the color transmission selection (this selection being only at the time of sending), the communication result report including the presence or absence of the color transmission execution, and the communication management report to the report preparation circuit 50. On the other hand, if the output of the communication result report and communication management is not selected in the step S98, the process will proceed to step S102.

In the step S102, whether the one-touch and shortened dial output is selected or not is judged. If the output is selected, the process will proceed to step S104 to output to the list preparation circuit 54 a one-touch and shortened dial list including information of whether the party registered at the one-touch and shortened dial is equipped with the color receiving function or not. Also, in the step S102, if no one-touch and shortened dial output is selected, the process will proceed to step S90.

Meanwhile, in step S106, whether any multiple sending is selected or not is examined. If a multiple sending is selected, the process will proceed to step S108. If no multiple sending is selected, the process will proceed to step S110.

Figure 14:
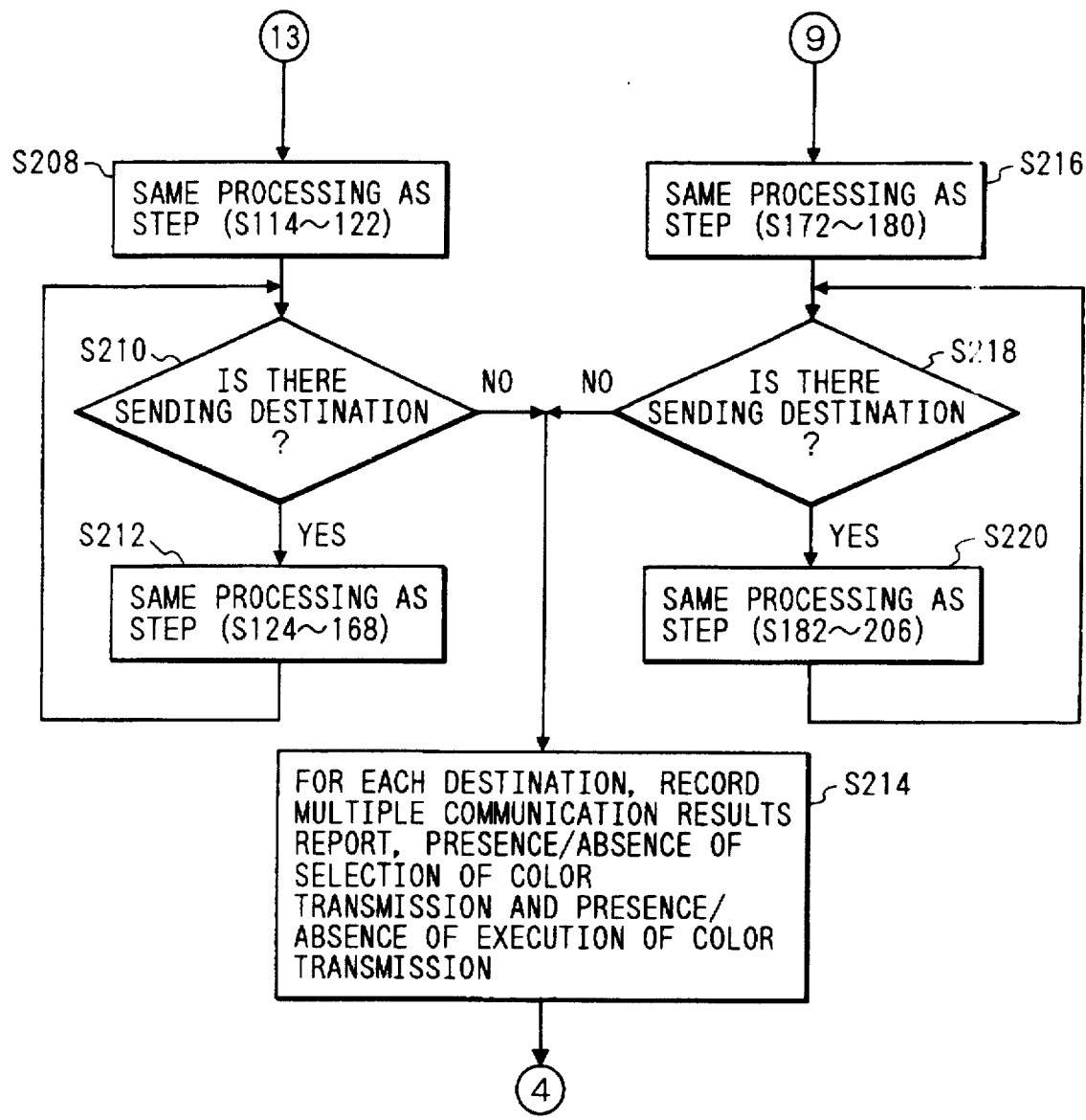

In the step S108, the control circuit 64 receives signals from the signal line 48a to judge whether any color transmission is selected or not. If a color transmission is selected, the process will proceed to step S208 (FIG. 14). If no color transmission is selected, the process will proceed to step S216 (FIG. 14).

Figure 15:
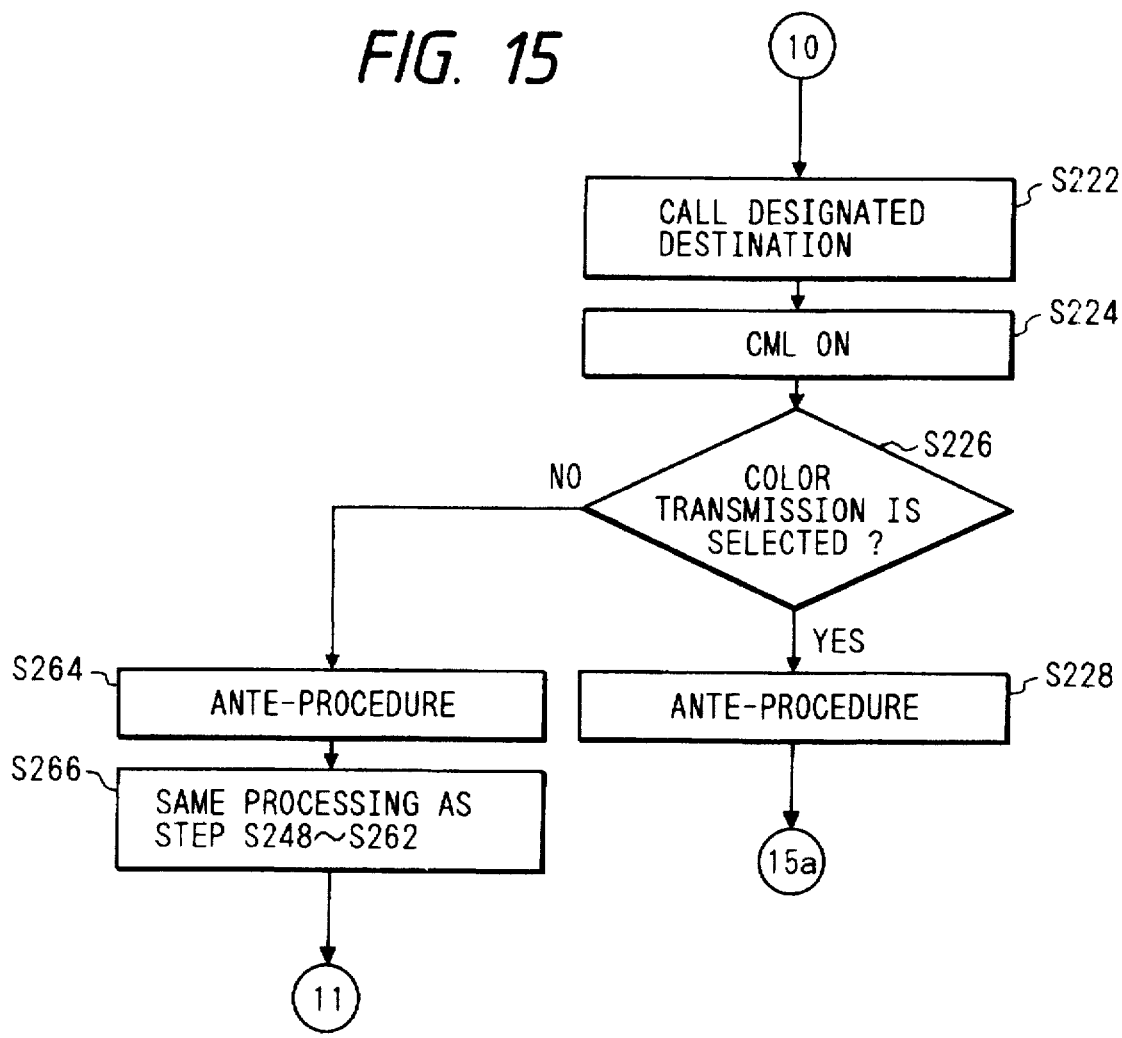

Then, in step S110, signals from the signal line 44a is received to judge whether any direct sending is selected or not is examined. If a direct sending is selected, the process will proceed to step S222 (FIG. 15). If no direct sending is selected, the process will proceed to step S112.

Figure 11:
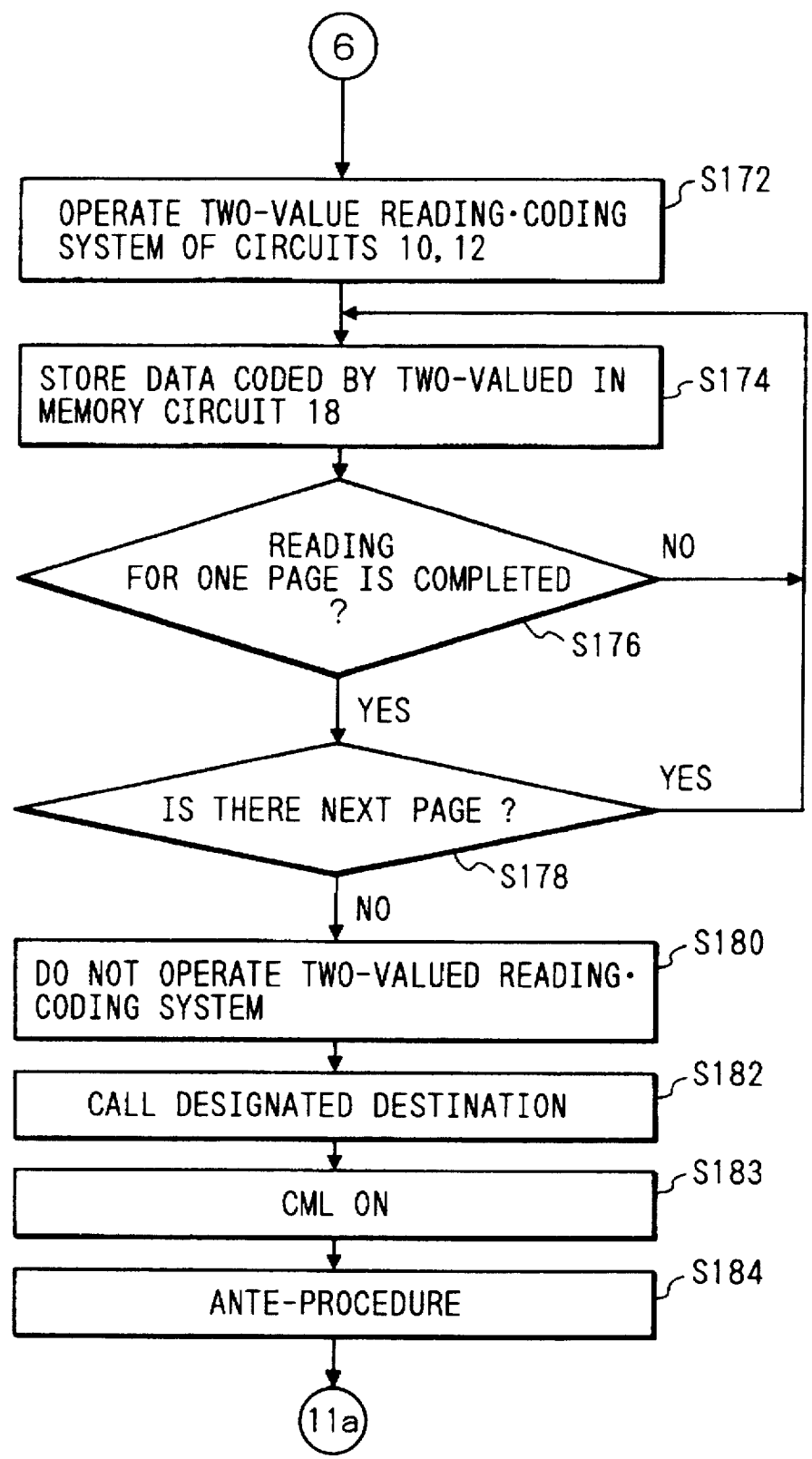

In the step S112, signals from the signal line 48a are received to judge whether any color transmission is selected or not. If a color transmission is selected, the process will proceed to step S114. If no color transmission is selected, the process will proceed to step S172 (FIG. 11). In other words, in the step S114, the operation of the color information reading circuit 14 and the color information coding circuit 16 is set by outputting a signal having the signal level "1" to the signal line 64d. Also, in the next step S116, the color coded data output to the signal line 16a is stored in the memory circuit 18 through the signal line 64f.

Figure 6:
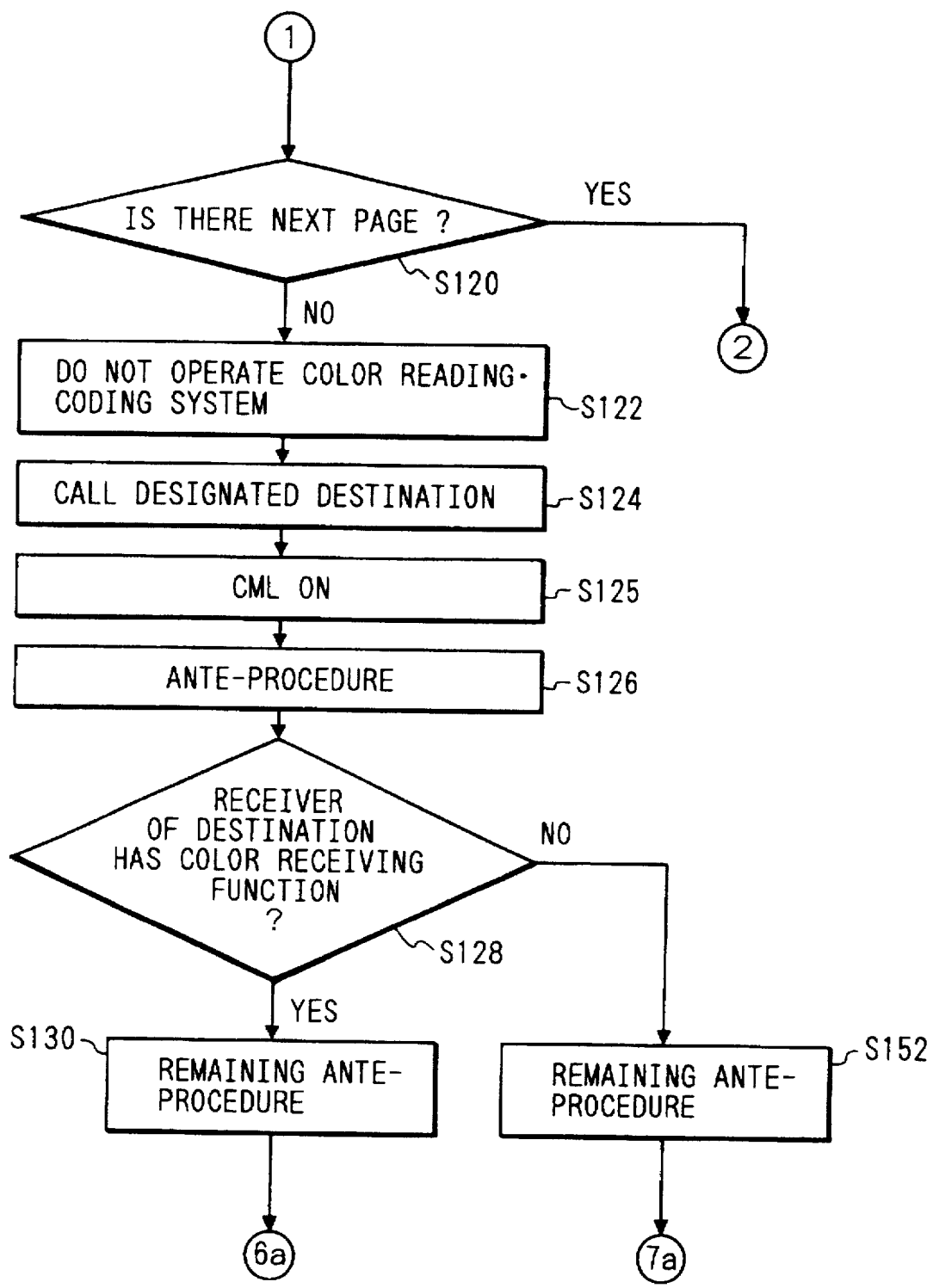

Then, in step S118, whether the one-page portion has been read or not is examined. When the one-page reading is terminated, the process will proceed to step S120 (FIG. 6). If the one-page reading is not terminated, the process will return to the step S116.

In the step S120 in FIG. 6, whether any page to be read next is present or not is examined. If the next page exists, the process will return to the step S116. If no page will follow next, the process will proceed to step S122.

In the step S122, the control circuit 64 outputs a signal having the signal level "0" to the signal line 64d to set the color information reading circuit 14 and the color information coding circuit 16 so that these circuits are not actuated. In the following step S124, the control circuit outputs the telephone number at the designated destination to the signal line 64o and then, generates a calling instruction pulse in the signal line 64p to call the designated destination. Thus, in step S125, a signal having the signal level "1" is output to the signal line 64a to turn on the CML.

In step S126, an anteprocedure is represented, and in step S128, whether the receiver at the destination is equipped with the color receiving function or not is judged. If the receiver at the destination is equipped with the color receiving function, the process will proceed to step S130. Thereafter, the color information stored in the memory circuit 18 is sent in the size and density converted as required. On the other hand, if the receiver at the destination is not equipped with the color receiving function, the process will proceed to step S152. Thereafter, the color information stored in the memory circuit 18 is decoded, and this data is converted into a two-valued information. Further, this two-valued information is sent in the size and density converted as required. In this respect, the step S130 represents the remaining anteprocedures.

Figure 7:
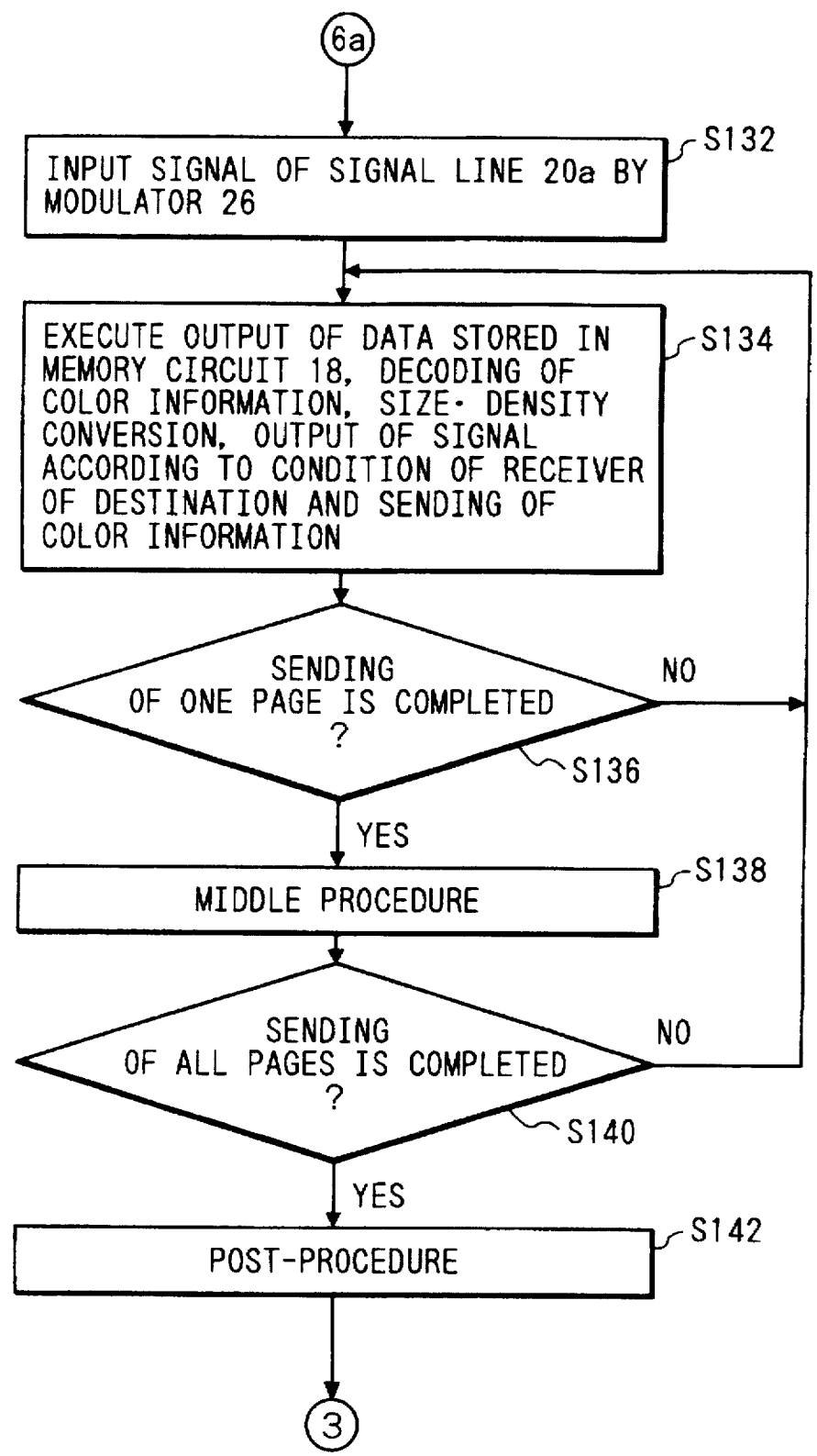

In step S132 in FIG. 7, the control circuit 64 outputs a signal having the signal level "0" to the signal line 64i. The modulator 26 of V.27 ter, V.29, and V.17 receives signals from the signal line 20a. In the next step S134, the data stored in the memory circuit 18 are output by the signal line 64f to the signal line 18a. The decoding/coding circuit 20 receives by the control of the signal line 64h signals output to the signal line 18a to decode the color information as required, and again code them by converting the size and density thereby to output to the signal line 20a the signals which will agree with the condition of the receiver at the destination. Thus, the color information is sent.

In step S136, whether the one-page portion has been sent or not is judged. If the one page sending is terminated, the process will proceed to step S138, but if the one page sending is not terminated, the process will return to the step S134. The step S138 represents a transit procedure. In step S140, whether the entire page has been sent or not is judged. If the entire page has been sent, the process will proceed to step S142. If the entire page has not been sent as yet, the process will return to the step S134. In this respect, the step S142 represents the remaining post procedures.

Figure 9:
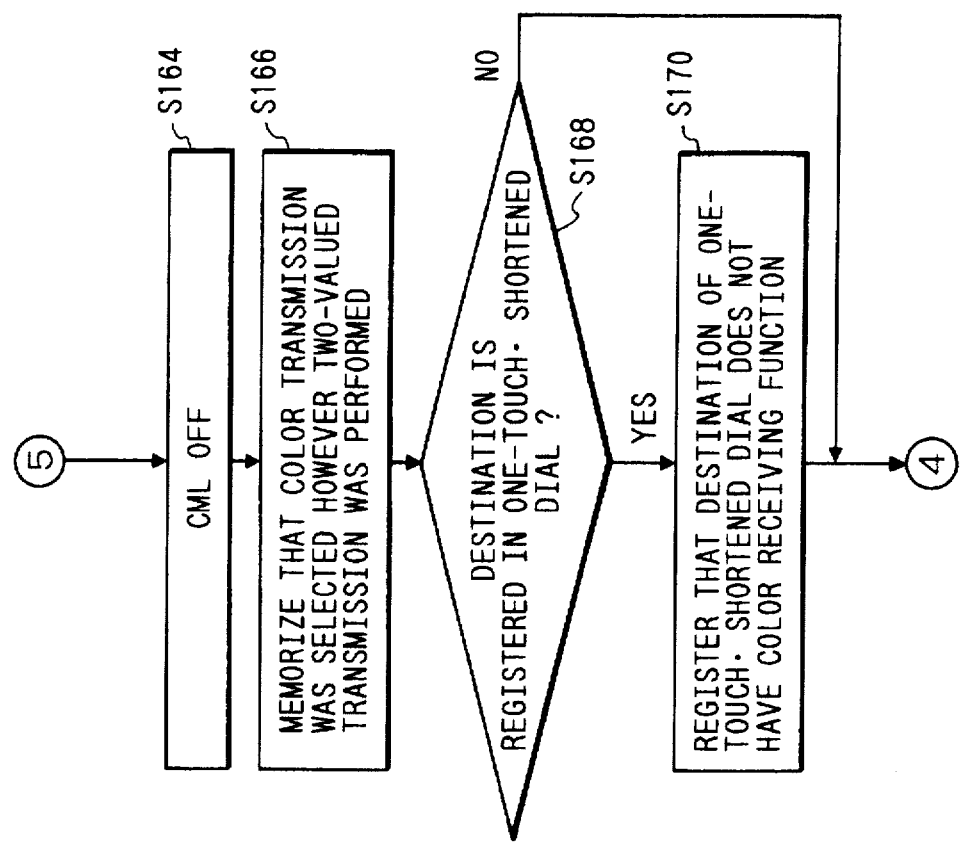

In step S144 shown in FIG. 9, the control circuit 64 outputs a signal having the signal level "0" to the signal line 64a to turn off the CML. In the following step S146, it is stored for the communication result and management reports that a color transmission has been selected and executed by the current sending. Then, in step S148, whether the destination for the current sending is registered at the one-touch and shortened dial or not is examined. When the registered destination is selected, the process will proceed to step S150, and if not, the process will return to the step S90. In the step S150, the information is registered with the register circuit 52 that the destination registered at the one-touch and shortened dial for the color transmission is equipped with the color receiving function.

Figure 8:
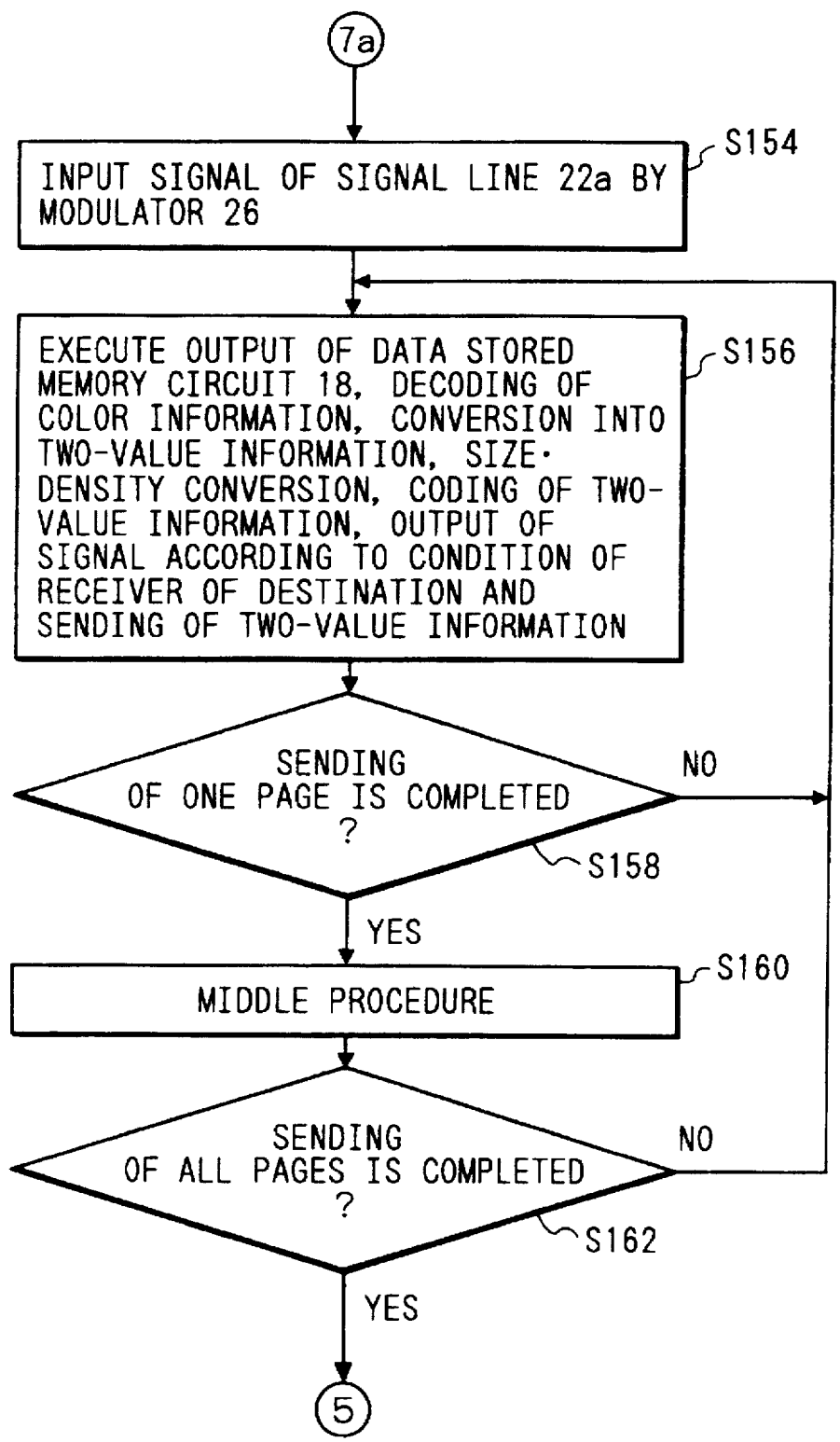

In step S154 in FIG. 8, the control circuit 64 outputs a signal "1" to the signal line 64i to set the modulator 26 of the V.27 ter, V.29, and V.17 for the reception of signals from the signal line 22a. Then, in step S156, the data stored in the memory circuit 18 are output by the signal line 64f to the signal line 18a. The coding circuit 22 receives by the control of the signal line 64g signals output to the signal line 18a to decode the color information and convert such information into a two-valued information, and then, code the two-valued information again to output to the signal line 22a the signal which will agree with the condition of the receiver at the destination for sending the two-valued information.

In step S158, whether the one-page sending is terminated or not is examined. If the one-page sending is terminated, the process will proceed to step S160, but if not, the process will return to the step S156. In this respect, the step S160 represents the transit procedures.

Figure 10:
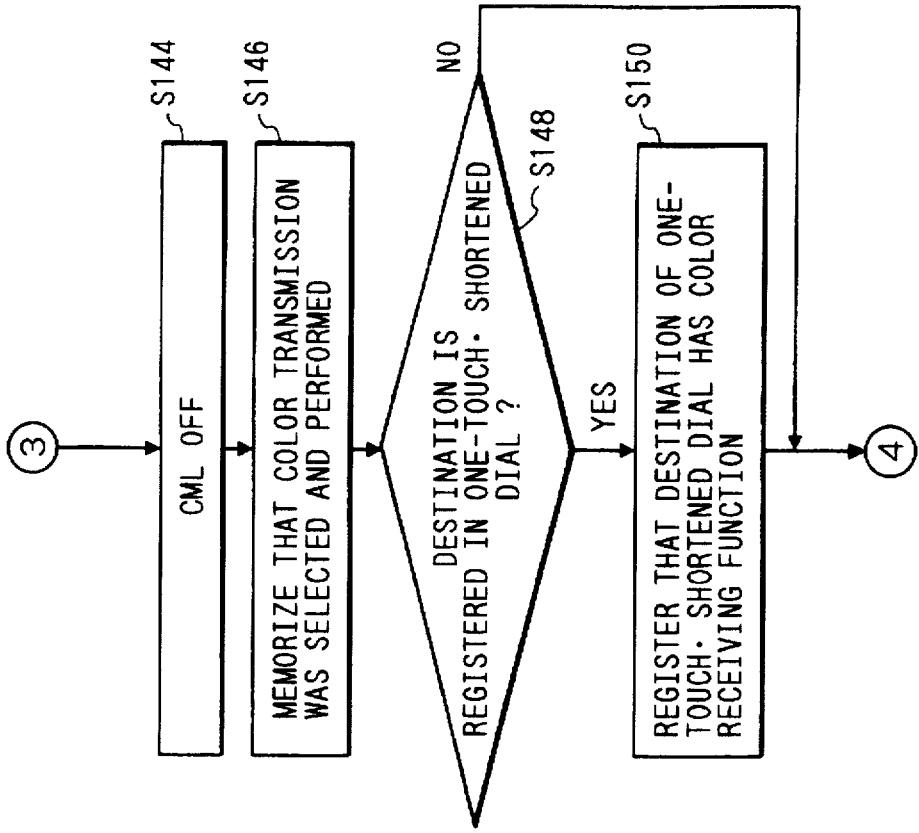

In step S162, whether the entire page has been sent or not is judged. If the sending of the entire is terminated, the process will proceed to step S164 (FIG. 10). If not, the process will return to the step S156.

In the step S164 in FIG. 10, the control circuit 64 outputs a signal having the signal level "0" to the signal line 64a to turn off the CML. Then, in step S166, it is recorded that although a color transmission is selected for the current sending, the two-valued transmission has been executed. In the following step S168, whether the destination for sending is registered at the one-touch and shortened dial or not is examined. If such destination is registered, the process will proceed to step S170. If not, the process will return to the step S90.

In the step S170, the information is registered with the register circuit 52 that the one-touch and shortened dial destination for sending is not equipped with the color receiving function.

In step S172 in FIG. 11, the control circuit 64 outputs a signal having the signal level "1" to the signal line 64c to set the two-valued information reading circuit 10 and the two-valued information coding circuit 12 so that these circuits are actuated. In the next step S174, the control circuit stores in the memory circuit 18 the two-valued coded data output to the signal line 12a through the signal line 64f.

Then, in step S176, whether a page has been read through or not is determined. If the reading of the page is terminated, the process will proceed to step S178. If the page has not been read as yet, the process will return to the step S174.

In the step S178, whether any pages exists for the next reading or not is determined. If there is any for the next reading, the process will return to the step S174, but if no page exists for the next reading, the process will proceed to step S180. In this step S180, 10 the control circuit 64 outputs a signal having the signal level "0" to the signal line 64c to set the two-valued information reading circuit 10 and the two-valued information coding circuit 12 so that these circuits are not actuated. Then, in step S182, outputs the telephone number of the designated destination to the signal line 64o and generated a calling instruction pulse in the signal line 64p to call the designated destination. In the following step S183, the control circuit outputs a signal having the signal level "1" to the signal line 64a to turn on the CML. In the respect, the next step S184 will represent the anteprocedure.

Figure 12:
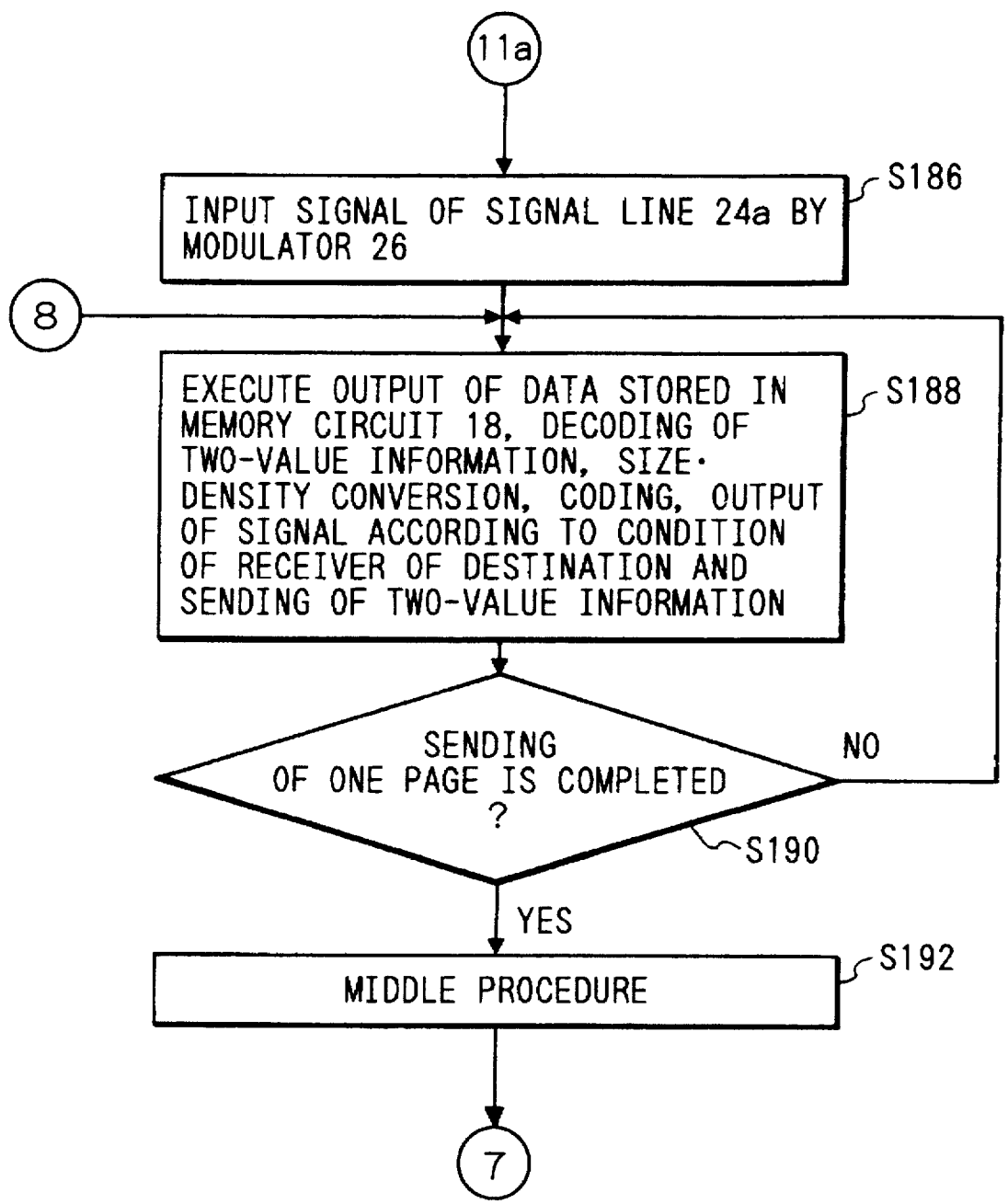

In step S186 shown in FIG. 12, the control circuit 64 outputs a signal "2" to the signal line 64i. The demodulator 26 of the V.27 ter, V.29, and V.17 is set to receive signals from the signal line 24a. In the following step S188, the data stored in the memory 18 is output to the signal line 18a by the signal line 64f, and the recording/coding circuit 24 receives by the control of the signal line 64v the signals output to the signal line 18a to decode the two-valued information as required for the conversion of the size and density. Thus, the information is again coded to output to the signal line 24a the signal which will agree with the receiver at the destination for sending the two-valued information.

In the next step S190, whether one page sending is terminated or not is determined. If the one page sending is terminated, the process will proceed to step S192, but if the one page sending is yet to be terminated, the process will return to the step S188. In this respect, the step S192 represents the transit procedure.

Figure 13:
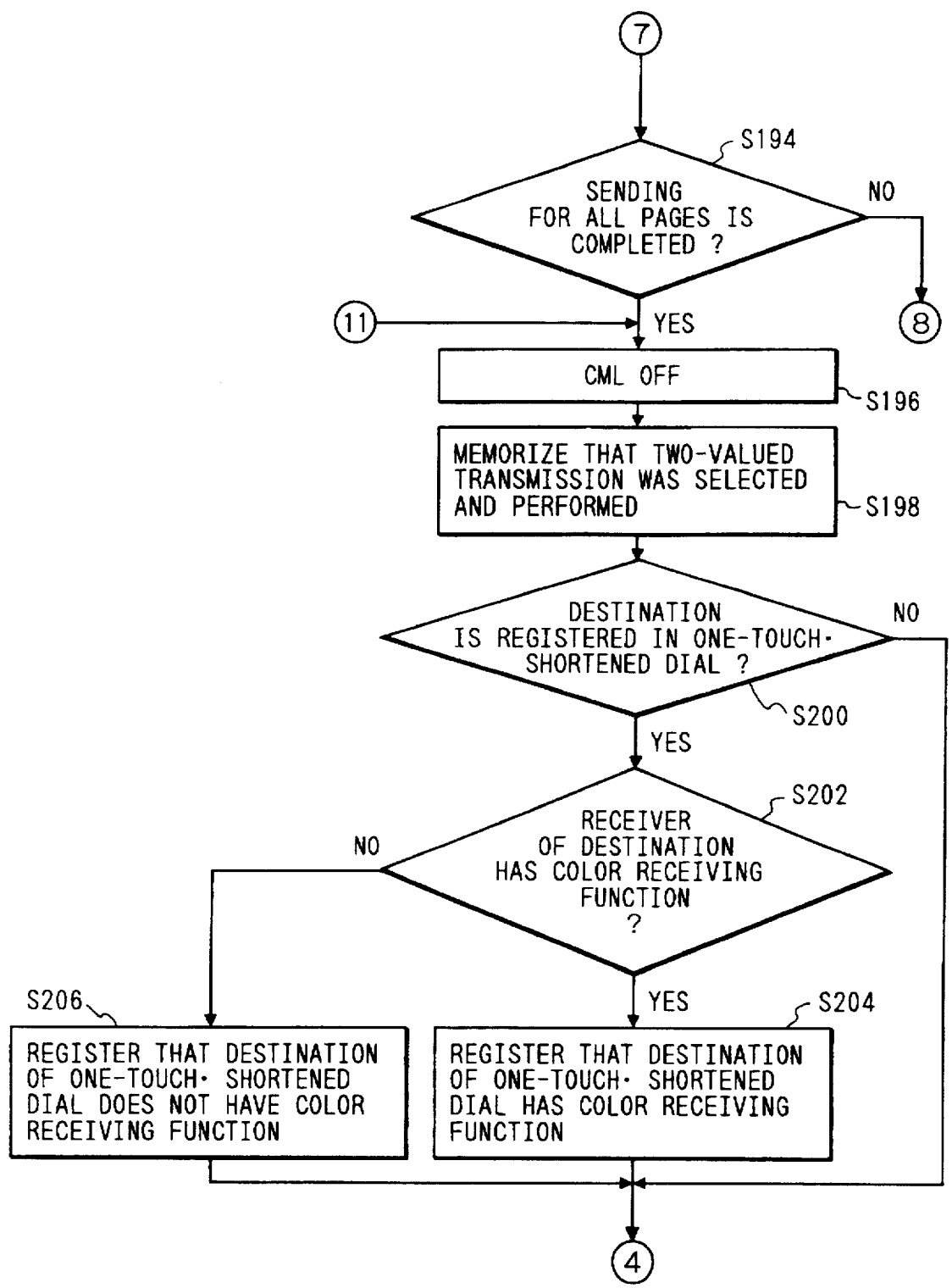

In step S194 shown in FIG. 13, the control circuit 64 judges whether the sending of the entire pages is terminated or not. If the sending of the entire pages is terminated, the process will proceed to step S196. If the sending of the entire pages is yet to be terminated, the process will return to the step S188.

In the step S196, a signal having the signal level "0" is output to the signal line 64a to turn off the CML. In the next step S198, the information is stored for the communication result and management reports that a two-valued transmission has been selected for the current sending and the two-valued transmission is executed. In the following step S200, whether the destination for sending is registered at the one-touch and shortened dial or not is determined. If the destination is registered, the process will proceed to step S202. If not registered, the process will return to the step S90.

In the step S202, a judgment is made in accordance with the anteprocedures, and whether the receiver at 10 the destination is equipped with the color receiving function or not is determined. Then, if the receiver at the destination is equipped with the color receiving function, the process will proceed to step S204. If the receiver at the destination is not equipped with the color receiving function, the process will proceed to step S206.

In the step S204, the information is registered with the register circuit 52 that the destination at the one-touch and shortened dial is equipped with the color receiving function. Also, in the step S206, the information is registered with the register circuit 52 that the destination at the one-touch and shortened dial is not equipped with the color receiving function.

If the judgment in the above-mentioned step S108 is affirmative, the process will proceed to step S208 shown in FIG. 14. Here, the same processes are executed beginning at the step S114 to the step S122 to code the color information for the storage in the memory circuit 18.

Also, in step S210, whether sending to all the multiple destinations has been terminated or not is examined. If the sending to all the multiple destinations is yet to be executed, the process will proceed to step S212. Here, however, if it is ascertained that the sending to all the destinations is terminated, the process will proceed to step S214.

In the step S212, the same processes beginning at the above-mentioned step S124 to the step S168 are executed to send the color information if the destination is equipped with the color receiving function, or to convert the color information into a two-valued information for sending it if the destination is not equipped with the color receiving function. In this respect, no process will return to the step S90 when these steps are completed. Also, in step S124, the multiple communication result report, the presence and absence of the color transmission selection, and the presence and absence of the execution of any color transmission are registered at each of the destinations and are recorded.

In step S216, the same processes beginning at the above-mentioned step S172 to the step S180 are executed to code the two-valued information for the storage in the memory circuit 18. Also, in step S218, whether any multiple sending destinations still exist or not is examined. If any still exists, the process will proceed to step S220. If not, the process will return to the step S214. Then, in the step S220, the same processes beginning at the above-mentioned step S182 to the step S206 are executed to send the two-valued information. In this respect, too, no process will return to the step S90 after the completion of these steps.

In step S222 shown in FIG. 15, the control circuit 64 outputs the telephone number at the designated destination to the signal line 64o and then, generated a calling instruction pulse in the signal line 64p to call the designated destination. In the next step S224, a signal having the signal level "1" is output to the signal line 64a and turn on the CML.

In step S226, the control circuit receives signals from the signal line 48a to judge whether any color transmission is selected or not. If a color transmission is selected, the process will proceed to step S228. If no color transmission is selected, the process will proceed to step S264. In this respect, the step S228 and the step S264 represent the anteprocedure. In the step S266, a two-valued information is sent by the same processes beginning at a step S248 to a step S262 which will be described later.

Figure 16:
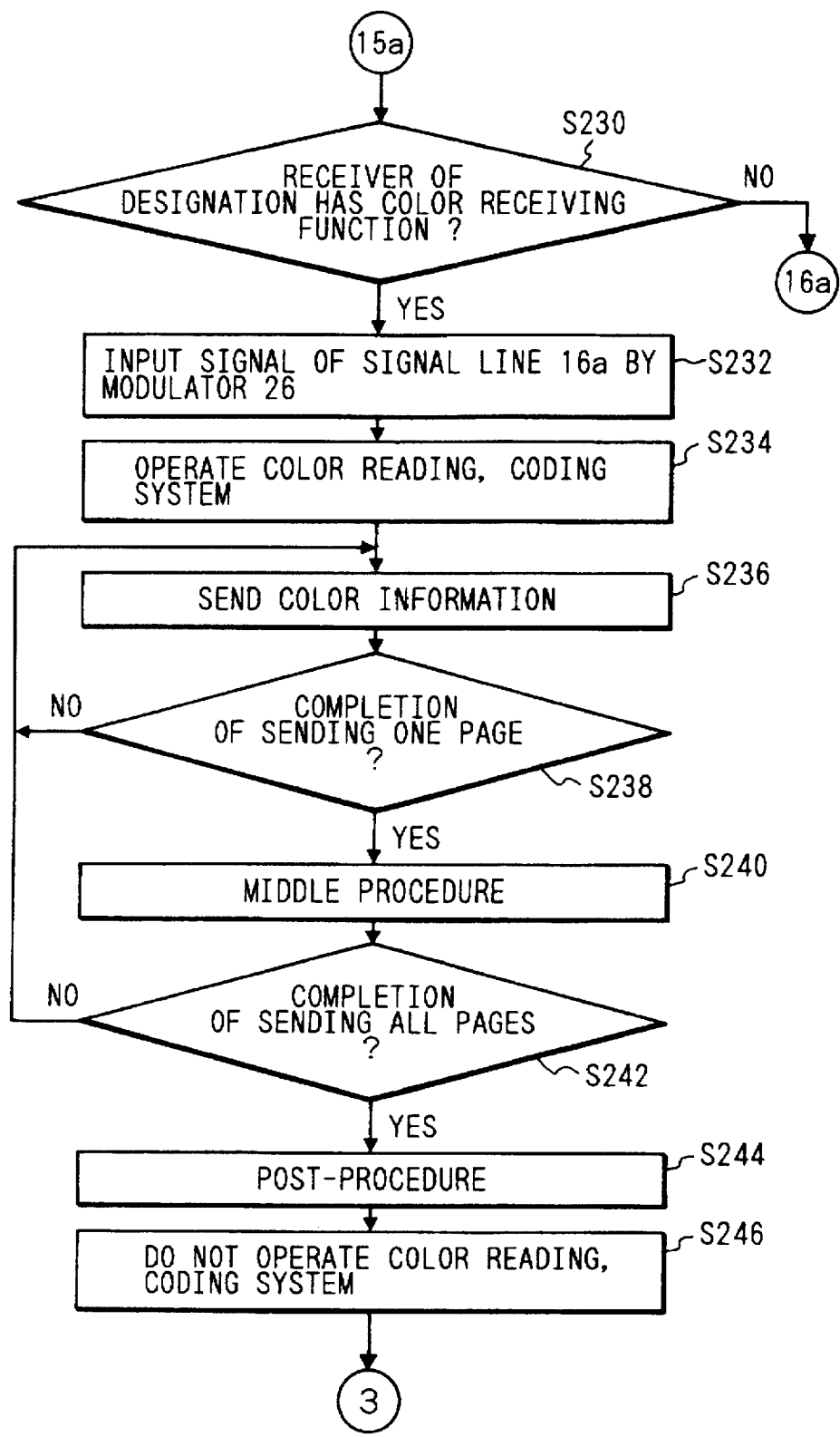

In step S230 shown in FIG. 16, the control circuit 64 judges whether the receiver at the destination is equipped with the color receiving function or not. If the receiver at the destination is equipped with the color receiving function, the process will proceed to step S232, but if the receiver at the destination is not equipped with the color receiving function, the process will proceed to step S248 shown in FIG. 17.

In step S232 shown in FIG. 16, the control circuit 64 outputs a signal "3" to the signal line 64i to set the demodulator 26 of the V.27 ter, V.29 and V.17 so that signals are received from the signal line 16a. Also, in step S234, a signal having the signal level "1" is output to the signal line 64d to set the color information reading circuit 14 and the color information coding circuit 16 so that these circuits are activated. In step S236, the color information is sent. In the following step S238, whether one page sending is terminated or not is judged. If the one page sending is terminated, the process will proceed to step S240. If the one page sending is yet to be terminated, the process will return to the step S236.

Also, the step S240 represents the transit procedures. In the next step S242, whether sending of the entire pages is terminated or not is judged. Here, if the sending of the entire pages is terminated, the process will proceed to step S244. If the sending of the entire pages is yet to be terminated, the process will return to the step S236. Then, in the step S244, the postprocedure is executed. In the step S236, a signal having the signal level "0" is output to the signal line 64d to set the color information reading circuit 14 and the color information coding circuit 16 so that these circuits are not actuated.

Figure 17:
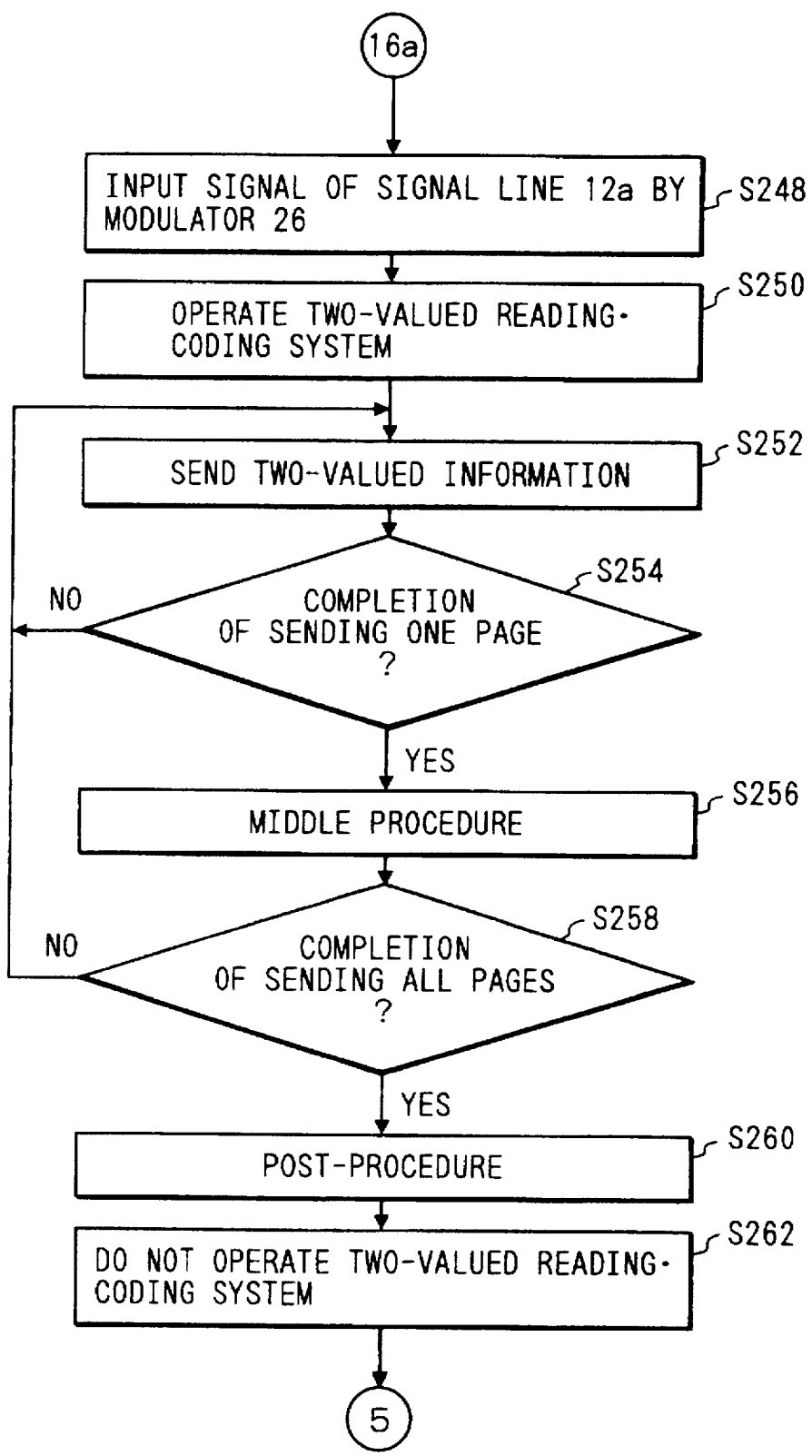

On the Other hand, in step S248 shown in FIG. 17, the control circuit 64 outputs a signal "4" to the signal line 64i to set the modulator 26 of the V.27 ter, V.29, and V.17 so that signals from the signal line 12a are received. Then, in step S250, a signal having the signal level "1" is output to the signal line 64c to set the two-valued reading circuit 10 and the two-valued coding circuit 12 so that these circuits are actuated.

Also, step S252 represents the two-valued information sending. In the next step S254, whether one page sending is terminated or not is judged. Here, if the one page sending is terminated, the process will proceed to step S256. However, if the one page is yet to be terminated, the process will return to the step S252.

In the next step S256, the transit procedures are represented. In the following step S258, whether the entire pages have sent or not is judged. Then, the process will proceed to step S260 if the entire pages have been sent, but if the entire pages have not been sent as yet, the process will return to the step S252. Also, step S260 represents the postprocedure. The control circuit 64 outputs a signal having the signal level "0" to the signal line 64c in step S262 to set the two-valued information reading circuit 10 and the two-valued information coding circuit so that these circuits are not actuated.

Figure 18:
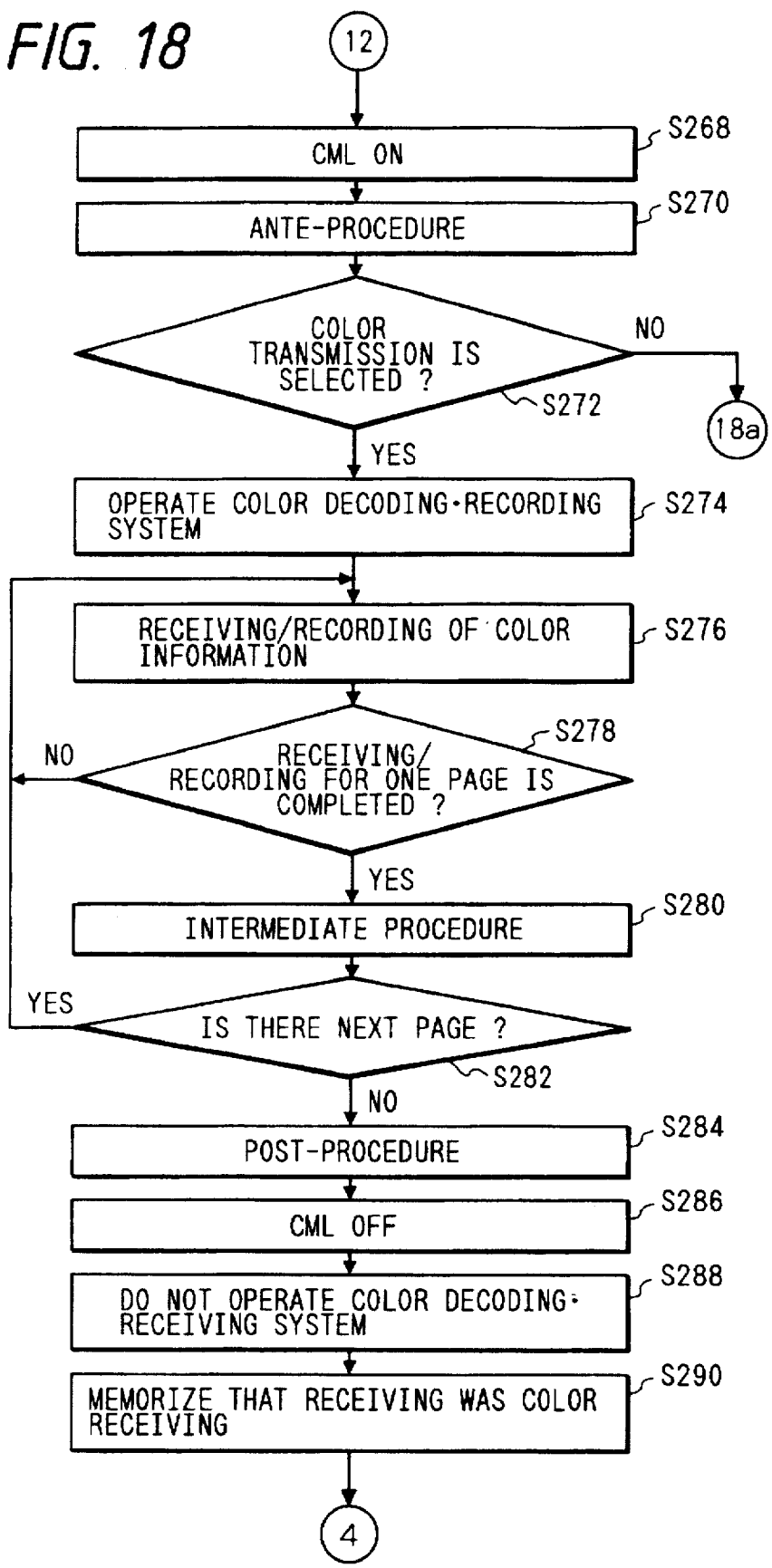

In step S268 shown in FIG. 18, the control circuit 64 outputs a signal having the signal level "1" to the signal line 64a to turn on the CML. In step S270, the anteprocedure is executed. Here, it is notified that the receiver at the destination is equipped with the color receiving function. Then, in step S272, signals from the signal line 48a are received to determine whether any color transmission has been selected or not is examined. If a color transmission is selected, the process will proceed to step S274. If any color transmission is not selected, the process will proceed to step S292.

In the step S274, a signal having the signal level "1" is output to the signal line 65j to set the color information decoding circuit 38 and the color information recording circuit 40 so that these circuits are actuated. Also, in step S276, the color information is received and recorded. Then, in step S278, whether one page sending and recording are terminated or not is examined. If these are yet to be terminated, the process will return to the step S276. If terminated, the step S280 which is a transit procedure will be executed.

In step S282, whether any page exists for the next receiving and recording or not is determined. If the next page exists, the process will return to the step S276. If no page exists to follow, the process will proceed to step S284. This step S284 represents postprocedure.

In the next step S286, the control circuit 64 outputs a signal having the signal level "0" to the signal line 64a to turn off the CML. Then, in the following step S288, a signal having the signal level "0" is output to the signal line 64j to set the color information decoding circuit 38 and the color information recording circuit 40 so that these circuits are actuated. Also, in step S290, it is stored for the communication result and management reports that the current reception has been a color receiving.

Figure 19:
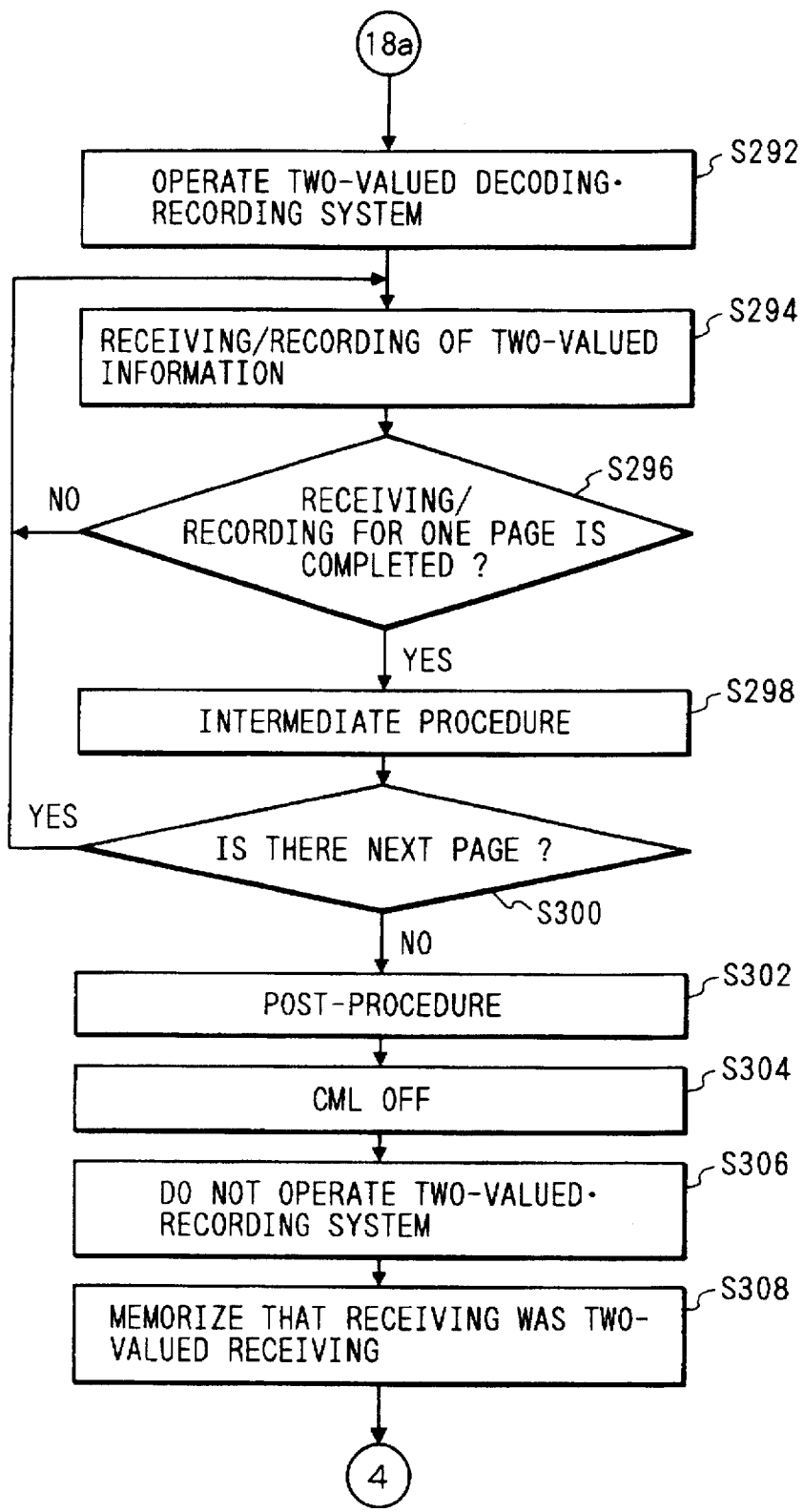

On the other hand, in step S292 shown in FIG. 19, the control circuit 64 outputs a signal having the signal level "1" to the signal line 64k to set the two-valued information decoding circuit 34 and the two-valued information recording circuit 36 so that these circuits are actuated. In step S294, the two-valued information is received and recorded. In step S296, whether the one page reception and recording are terminated or not is judged. Here, if it is judged that the reception and recording are terminated, the process will proceed to step S298. If not terminated yet, the process will return to the step S294. In this respect, the step S298 represents the middle procedure.

In step S300, whether the next page exists or not is determined. If any page exists for the next, the process will return to the step S294, but if no page exists for the next, the process will proceed to step S304. This step S304 represents the postprocedure.

In the step S304, a signal having the signal level "0" is output to the signal line 64a to turn off the CML. In the next step S306, a signal having the signal level "0" is output to the signal line 64k to set the two-valued information decoding circuit 34 and the two-valued information recording circuit 36 so that these circuits are actuated. Then, in step S308, it is stored for the communication result and management reports that the current reception has been a two-valued receiving.

FIG. 20 is a view showing a communication result report in a facsimile apparatus according to the present embodiment. FIG. 21 is a view showing a specific example of a communication management report. Both reports are characterized in that the selection of a color transmission and the presence and absence of the color transmission execution are specifically stated unlike a conventional report of the kind.

Also, FIG. 22 is a view showing a one-touch dial list of a facsimile apparatus according to the present embodiment. This one-touch dial list is characterized in that there is a statement to indicate whether the destination is equipped with the color receiving function or not among other statements.

As described above, according to the present embodiment, whether a facsimile apparatus at the destination is equipped with the color receiving function or not is judged when a color image transmission is selected. Thus, even when there is a mixture of the facsimile apparatus capable of executing a color transmission and the one capable of executing only a two-valued information at the destination, it is possible to execute an appropriate image communication effectively. Particularly, when a color transmission is selected, it is possible to communicate with the destination in accordance with the availability of the color receiving function of its receiver irrespective of the mode of communication to be executed such as a memory sending, multiple sending, or direct sending.

Also, it is possible to ascertain the frequency of the color transmission executions, and the executed or unexecuted communication in color when any color transmission is selected by recording the presence and absence of color transmission, and the presence and absence of the execution of color transmission in the communication result report as well as in the communication management report.

Furthermore, in accordance with the one-touch and shortened dials, it is ascertained that the receiver at a particular destination is equipped with the color receiving function, and the result is recorded in the telephone number list accordingly. Hence, there is an advantage that by referring to the list of telephone numbers the sender is able to know whether an intended color transmission is executable or not for such a particular destination.

<Description of an Example of a Variety>

The description will be made of an example of a variety of the above-mentioned first embodiment. A facsimile apparatus according to this example of the variety is of the same structure as the one according to the above-mentioned embodiment. Here, therefore, the structural description will be omitted.

As a variety of the above-mentioned embodiment, it may be possible to make an arrangement in the sending by means of the one-touch or shortened dial depression that before stating the communication, the operator should be informed of the unavailability of the color receiving function at the destination if a color transmission is selected.

Figure 23:
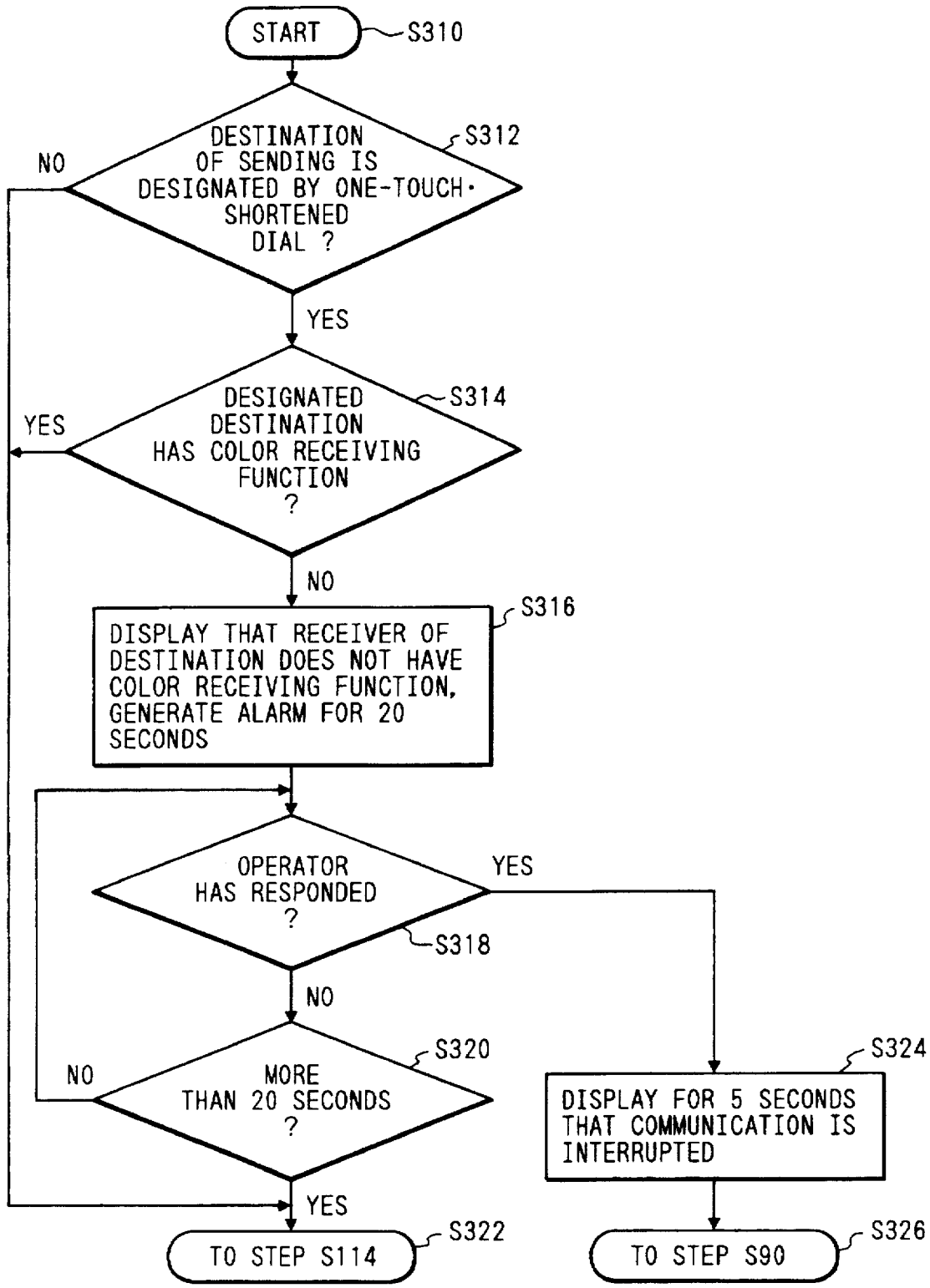
FIG. 23 to FIG. 27 are flowcharts showing the control procedures according to a variation of the first embodiment.
Figure 24:
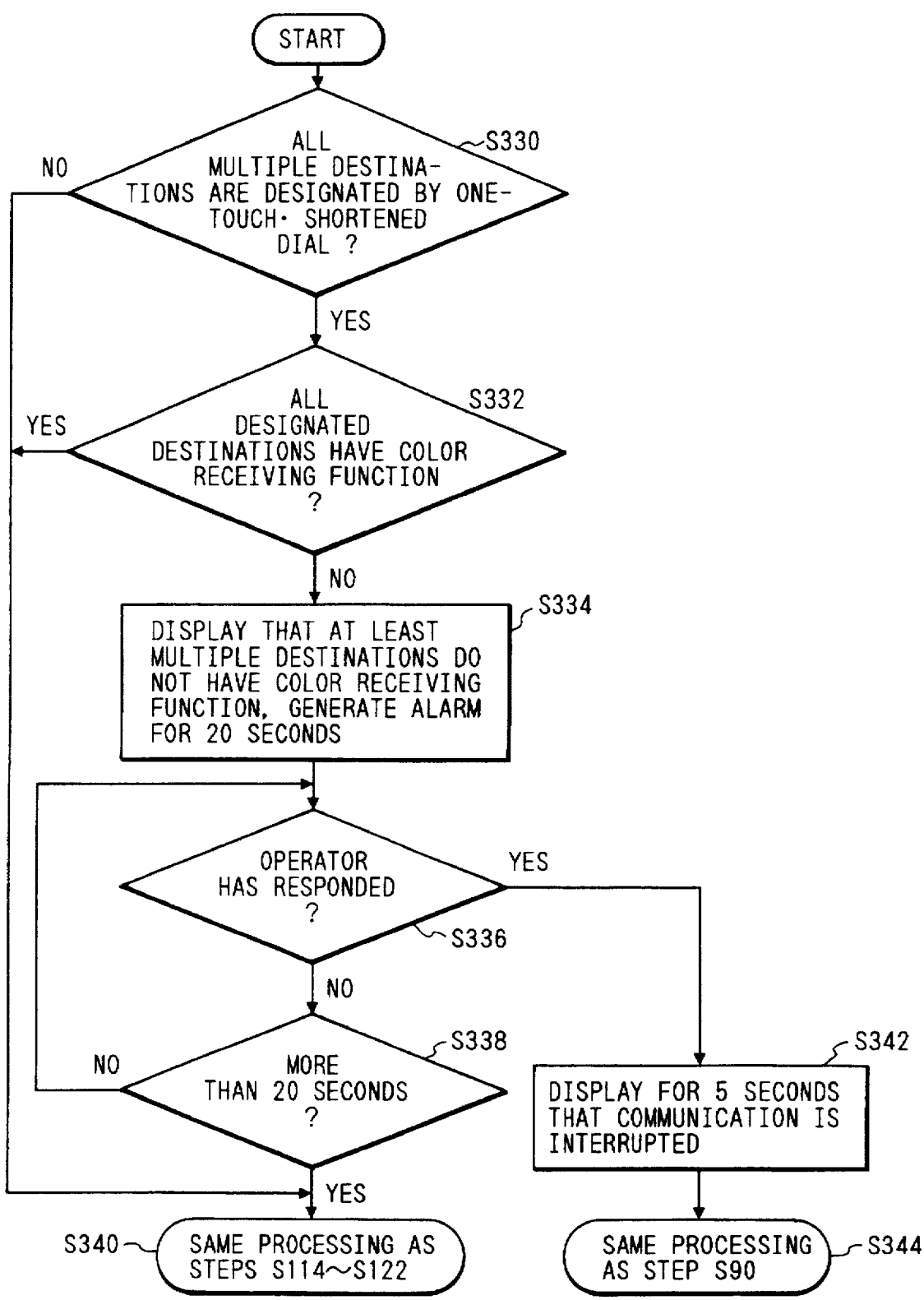
Figure 25:
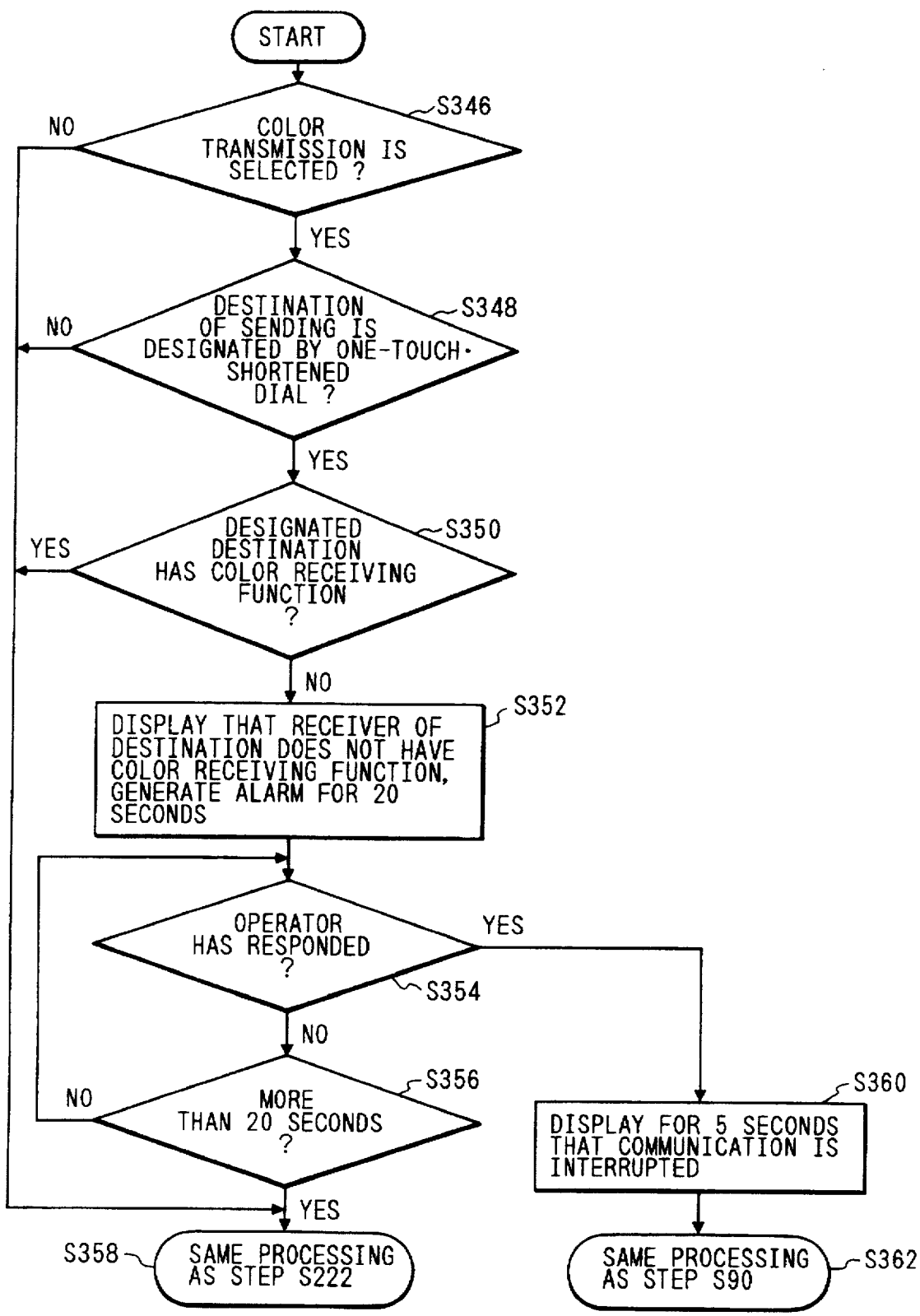

FIG. 23 to FIG. 25 are flowcharts regarding this example of the variety. FIG. 23 shows an example of control when a color transmission is selected for the memory sending; FIG. 24, a color transmission is selected for the multiple sending; and FIG. 25, a color transmission is selected for the direct sending.

Here, the description will be made of another processing example when the judgment is affirmative (YES) in the step S112 in the flowchart shown in FIG. 4 among the processes executed for a facsimile apparatus according to the above-mentioned first embodiment.

In other words, in step S312 shown in FIG. 23, if it is determined that a destination is specified by means of the one-touch or shortened dial, the process will proceed to step S314. If the destination is not specified by means of the one-touch or shortened dial, the process will proceed to step S322.

In step S314, whether the specified destination is equipped with the color receiving function or not is determined in accordance with the information registered in the register circuit 52. If the color receiving function is not available at the destination, the process will proceed to step S316. However, if it is found that the color receiving function is available at such destination, the process will proceed to step S322. In this step S316, the control circuit 64 outputs a signal having the signal level "1" to the signal line 64t, and displays an indication that the destination is not equipped with the color receiving function together with an alarm to be sounded for 20 seconds.

Then, in step S318, signals from the signal line 58a are received to judge whether or not the operator has already responded by depressing a button to "suspend communication" or the like. Here, if the operator has already responded, the process will proceed to step S324. If the operator has not responded yet, the process will proceed to step S320. In this step S320, whether the alarm sounding time, 20 seconds, has elapsed or not is judged, and the process will return to the step S318 if the 20 seconds have not elapsed as yet. If the 20 seconds have already elapsed, the process will proceed to step S322. In this respect, the step S322 is identical to the step S114 in FIG. 4 for the above-mentioned embodiment.

Also, in the step S318, if the judgment is affirmative (YES), the signal line 64u is controlled in step S324 to display an indication to "suspend the communication" for five seconds. In the next step S326, a process will be executed in the same manner as the one in the step S90 shown in FIG. 4 for the above-mentioned embodiment.

FIG. 24 is a view showing a case where a color transmission is selected for a multiple sending as described above. Here, in the flowchart shown in FIG. 14 for the above-mentioned embodiment, the process in the step S208 will be modified as given below.

In other words, in step S330, whether all the destinations of the multiple sending are specified by the one-touch or shortened dials or not is judged. Here, if the all the destinations of the multiple sending are specified by the one-touch or shortened dials, the process will proceed to step S322. If all the destinations of the multiple sending are not specified by the one-touch or shortened dials, the process will proceed to step S340.

In the step S332, the availability of the color receiving function at the specified destinations is ascertained in accordance with the information registered with the register circuit 52. If there is any destination which is not equipped with the color receiving function among them, the process will proceed to step S334. However, if all the specified destinations are equipped with the color receiving function, the process will proceed to step S340. In the step S344, an indication that there is the destination which is not equipped with the color receiving function among those of the multiple sending is displayed together with such an alarm for 20 seconds.

Also, in step S336, the control circuit 64 receives signals from the signal line 58a to judge whether or not the operator has already responded by depressing a button to "suspend the communication" or the like, for example. When the operator has responded, the process will proceed to step S342. If the operator has not responded yet, the process will proceed to step S338. In other words, in the step S338, whether the alarming time, 20 seconds, has elapsed or not is determined. If the 20 seconds have not elapsed yet, the process will return to the step S336. If the 20 seconds have already elapsed, the process will proceed to step S340. In this respect, this step S340 executes the same control as the one in the steps from S114 to S122 shown in FIG. 4 and FIG. 6 for the above-mentioned embodiment.

In step S342, the display of an indication to "suspend the communication" is executed for five seconds by the control of the signal line 64u, and in step S344, the process identical to the step S90 in FIG. 4 for the above-mentioned embodiment will be executed.

FIG. 25 shows the process in a case where a color transmission is selected for a direct sending as a variation.

In other words, if the judgement in the step S110 in the flowchart shown in FIG. 4 is affirmative (YES) in the above-mentioned embodiment, the following process is added between such process and the one in the step S222:

In step S346 shown in FIG. 25, the control circuit 64 receives signals from the signal line 48a to judge whether any color transmission is selected or not. If a color transmission is selected, the process will proceed to step S348. If no color transmission is selected, the process will proceed to step S358.

In the step S348, whether any destination is specified by the one-touch or shortened dial or not is judged. If a destination is specified by the out-touch or shortened dial, the process will proceed to step S350. However, if no destination is selected by the one-touch or shortened dial, the process will proceed to step S358.

Also, in the step S350, whether the specified destination is equipped with the color receiving function or not is determined in accordance with the information registered with the register circuit 52. If no color receiving function is available at such destination, the process will proceed to step S352. If the color receiving function is available, the process will proceed to step S358. In the step S352 of these steps, the control circuit 64 outputs a signal having the signal level "1" to the signal line 64t, and displays an indication to the effect that the destination is not equipped with the color receiving function together with an alarm for 20 seconds.

In the following step S354, signals from the signal line 58a are received to determine whether or not the operator has already responded by depressing a button to "suspend the communication" or the like, for example. Here, if the operator has already responded, the process will proceed to step S360. If the operator has not responded as yet, the process will proceed to step S356. In this step S356, whether the above-mentioned 20 seconds have already elapsed or not is examined. If the 20 seconds have not elapsed yet, the process will proceed to step S354, but if the 20 seconds have already elapsed, the process will proceed to step S358. In this respect, the step S358 executes the same process as the one in the step S222 shown in FIG. 15 for the above-mentioned embodiment.

On the other hand, in step S360, the control circuit 64 displays an indication to "suspend the communication" for five seconds by the control of the signal line 64u, and in the next step S362, the same process will be executed as the one in the step S90 shown in FIG. 4 for the above-mentioned embodiment.

As described above, in the present variety, when a color transmission is selected for a destination called by the one-touch or shortened dial, the operator will be informed of the unavailability of the color receiving function prior to the communication if such destination is not equipped with this particular function. Therefore, it is possible to provide a user with a facsimile apparatus which is more useful.

Also, in such a case that a color transmission is selected on the sending side, the receiving side is not equipped with the color receiving function, and therefore, the image data is transmitted as a two-valued information, the receiving side will be informed of this event. Hence, there is an advantage that the user on the receiving side is able to know easily that although the output image is a monochrome one, the information thus received from the sending side is a color information.

In this respect, according to the present variety, an arrangement is made so that the communication will continue unless the operator specifies the suspension of the communication when a color transmission is selected, but the receiver at the destination is not equipped with the color receiving function. However, it may be possible to arrange so that the communication will be suspended unless the operator specifies the continuation of the communication when a color transmission is selected, but the receiver at the destination is not equipped with the color receiving function.

Also, in the multiple sending, whether all the destinations are equipped with the color receiving function or not is examined, but it may be possible to arrange so that the color transmission will be executed only to the destinations which are equipped with the color receiving function. Then, to the destinations which are not equipped with any color receiving function, a report on the result of the multiple sending is issued to inform to the effect that the transmission is not executed because of the unavailability of the color receiving function on that particular destination.

Further, the color receiving function is considered with respect to the one-touch or shortened dialing, but it may be possible to register the availability of the color receiving function at such a destination called by operating the ten keys while the number of communications are specified. Here, the destination which should be registered may be decided upon the frequency of the communication, or it may be possible to store such destinations by giving priority to the availability or unavailability of the color receiving function on the destinations. Also, for the one-touch or shortened dialing, only the registration of telephone numbers is taken into account, but it may be possible to register abbreviated titles or some other information.

Moreover, one communication is executed in a mode which is specified at the outset (either the color transmission mode or the two-valued transmission mode), but it may be possible to arrange so that the color transmission and two-valued transmission are selective partway of the communication. Also, it is considered that in receiving whether the communication result report, communication management report, and the color transmission are executed or not should be recorded. However, when a communication is selected, it may be possible to notify in the anteprocedure an information of whether the sending side is equipped with the color transmitting function or not in addition to the information whether or not any color transmission is to be executed, and to additionally record the information of whether the sending side is equipped with the color transmitting function or not in the communication result and management reports at the time of receiving.

Also, in such a case where a color information transmission is selected, but the receiver at the destination is not equipped with the color receiving function, a sending side executes a two-valued information transmission from the sending side to the receiving side. In this case, it may be possible to notify to the effect that the two-valued information thus transmitted has been for a color information which could have been executed otherwise.

Figure 26:
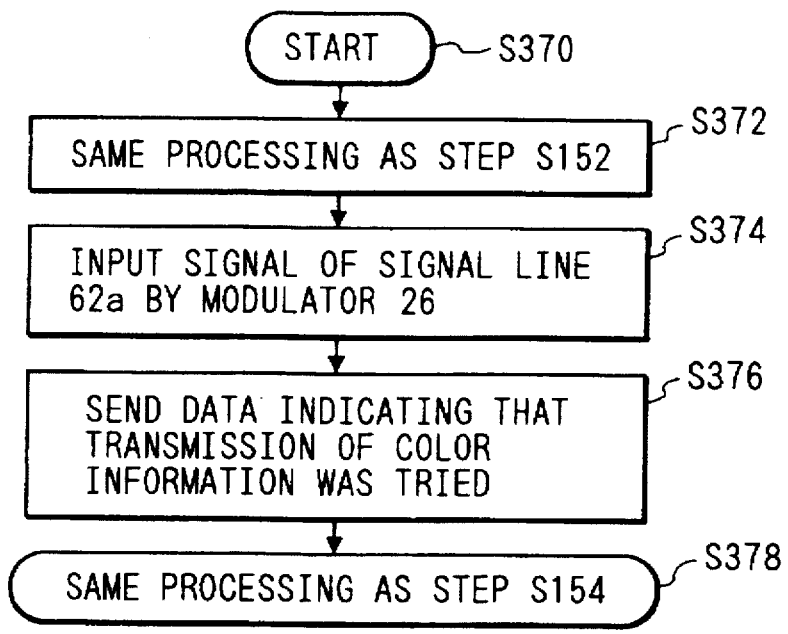
Figure 27:
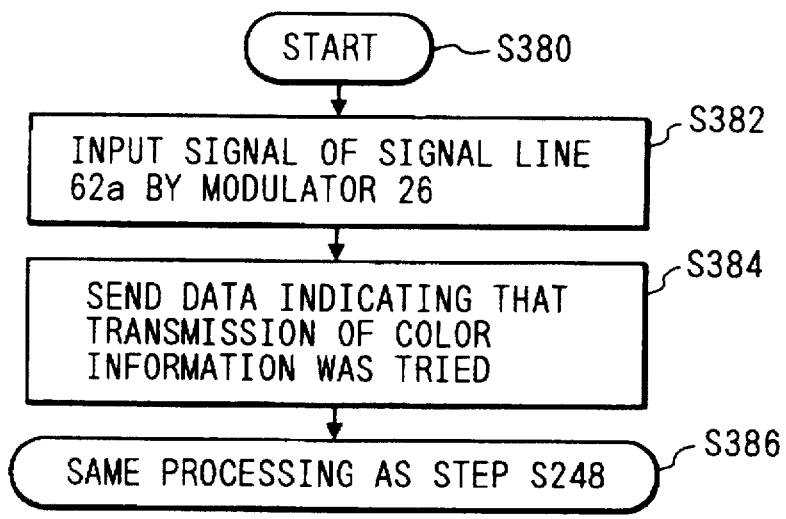

FIG. 26 and FIG. 27 are flowcharts showing the steps required for notifying an intended transmission of a color information as described above. The flowchart shown in FIG. 26 is for the control of the memory sending and the multiple sending, and the flowchart shown in FIG. 27 is for the control of the direct sending.

The flowchart shown in FIG. 26 represents a process to follow the one executed when the judgment is negative (NO) in the step S128 shown in FIG. 6 for the above-mentioned embodiment. In step S372 in FIG. 26, the remaining anteprocedure, that is, the same process as in the step S152 in FIG. 6 for the above-mentioned embodiment, is executed. In step S374, a signal "S" is output to the signal line 64i to set the modulator 26 of the V.27 ter, V.29, and V.17 for receiving signals from the signal line 62a.

In step S376, the data which indicates that the transmission of a color information is intended is sent by controlling the signal line 64e. Then, in step S378, it is represented to execute a process in the same way as in the step S154 shown in FIG. 8 for the above-mentioned embodiment.

Also, it is represented that the process in step S380 of the flowchart shown in FIG. 27 is identical to the process following the negative judgment (NO) in the step S230 shown in FIG. 16 for the above-mentioned embodiment.

In step S382 shown in FIG. 27, a signal "S" is output to the signal line 64i to set the modulator 26 of the V.27 ter, V.29, and V.17 for receiving signals from the signal line 62a. In the following step S384, the data to indicate that the transmission of a color information is intended is sent by controlling the signal line 64e. Also, it is represented that step S386 executes the same process as in the step S248 shown in FIG. 17 for the above-mentioned embodiment.

Also, it may be possible to notify the receiver at a destination of the intended color transmission by a protocol instead of sending out a message.

[Second Embodiment]

Figure 28:
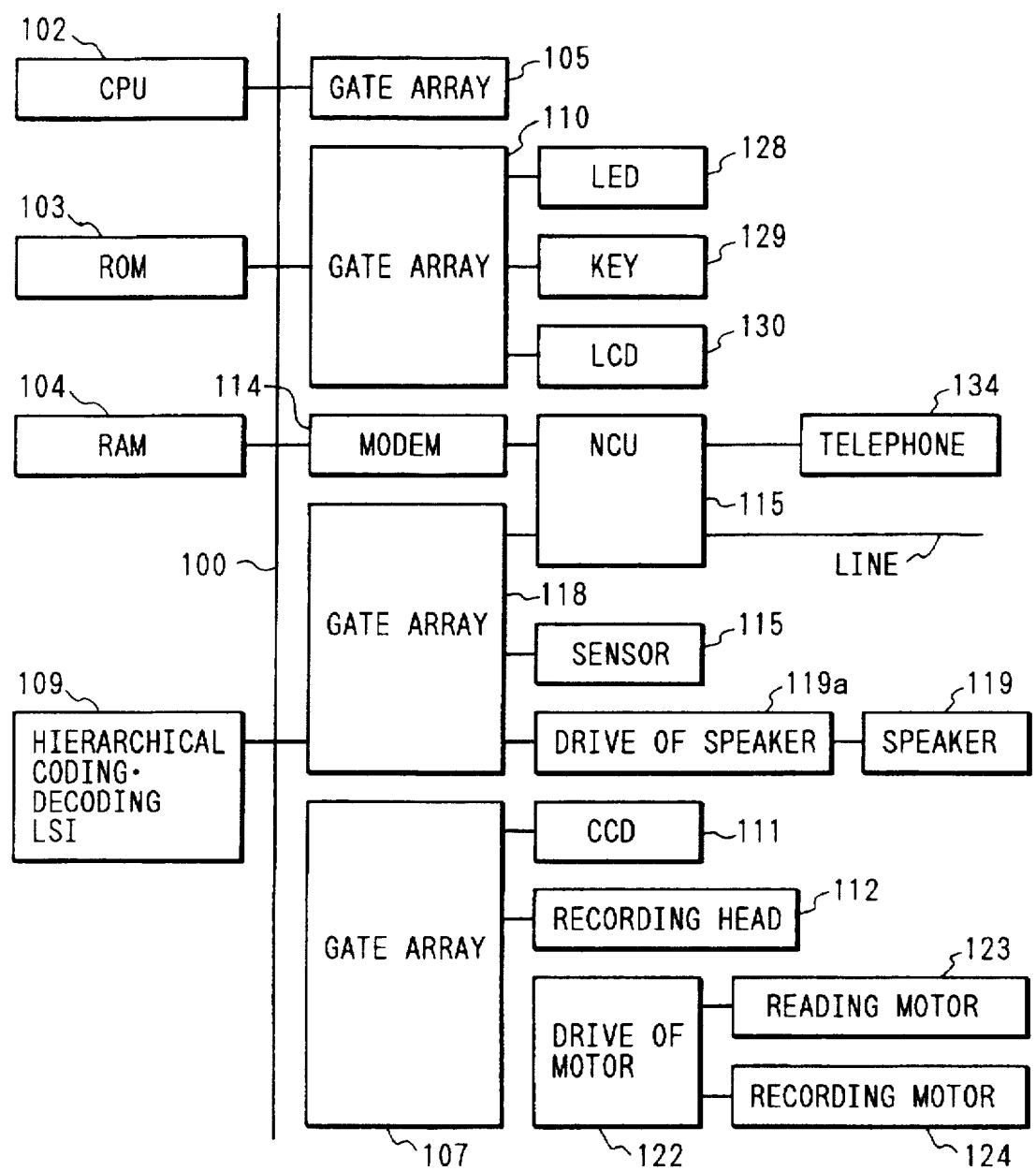
FIG. 28 is a block diagram showing the structure of a facsimile apparatus according to a second embodiment of the present invention.

Hereinafter, the description will be made of a second embodiment according to the present invention. FIG. 28 is a block diagram showing the structure of a facsimile apparatus according to the second embodiment. In FIG. 28, a CPU 102 is a central control unit which is connected to a ROM 103 and a RAM 104 through a bus 100. Thus, the CPU controls the entire systems of the apparatus in accordance with the program stored in the ROM 103. Also, the RAM 104 is used as the work area for the CPU 102.

The image on a source document is read mainly by a CCD line sensor 111 and a reading motor 123. The image recording of an reception image and copied image is executed by a recording head 112 and a recording motor 124. Also, a modem 114 performs the modulation/demodulation of image data and control procedural data, which is connected to the circuit through an NCU 115. This NCU 115 holds the loop current of the circuit and executes the circuit exchange for a telephone set 134.

Subsequently, the detailed description will be made of a transit communication control according to the present embodiment.

Figure 29:
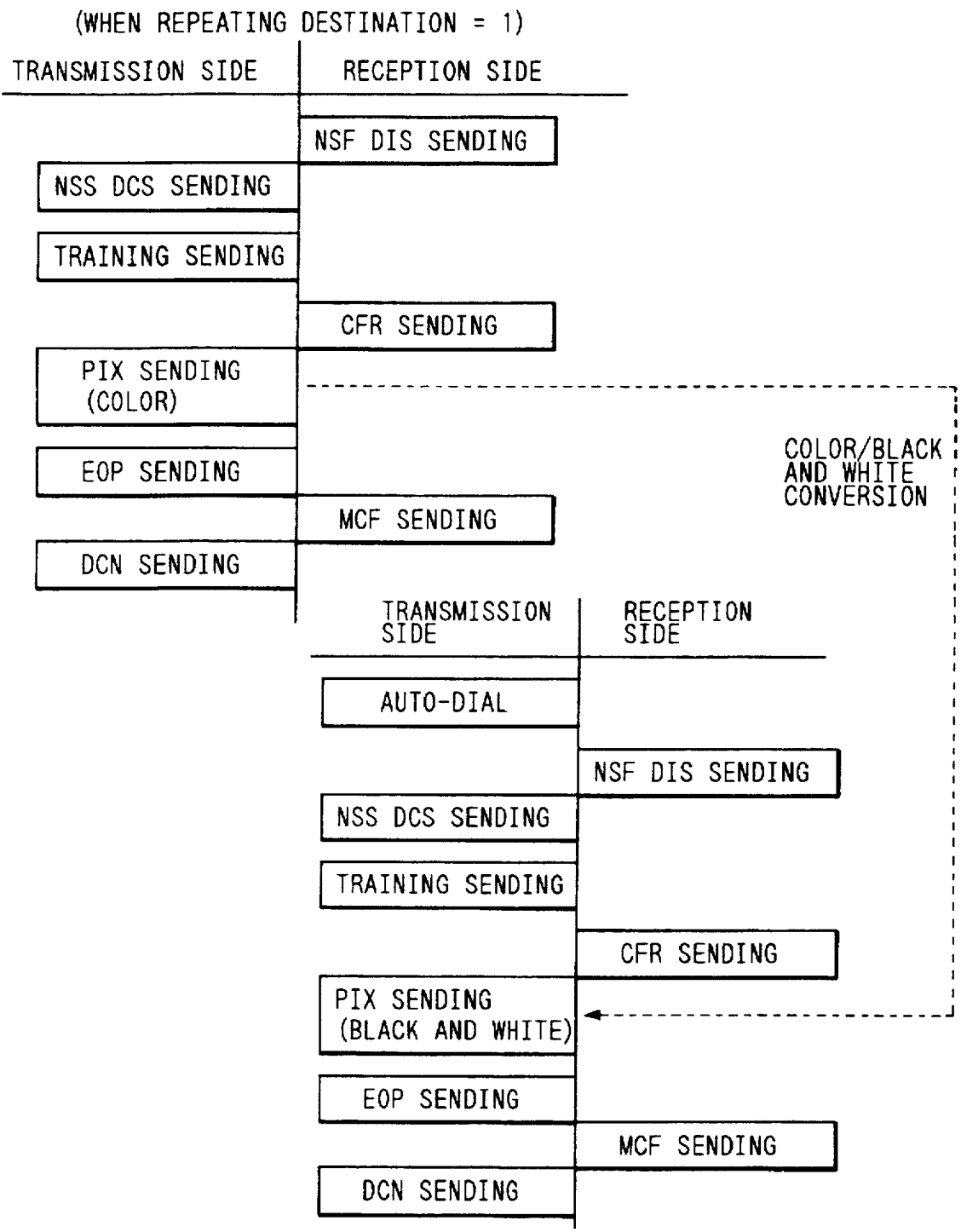
FIG. 29 is a view showing the transit sending procedures for the facsimile apparatus according to the second embodiment.

FIG. 29 is a view showing the procedures of a transit communication for a facsimile apparatus according to the present invention. FIG. 30 is a flowchart showing the outline of the transit communication for this apparatus.

As shown in FIG. 30, the transit communication for this apparatus consists of the receiving and recording process (step S1010) of a color image from a facsimile apparatus which requests a transit sending; a process (step S1020) of the color/monochrome conversion of the received color image which is executed by the facsimile apparatus carrying out the transit communication; and a process (step S1030) of sending to the transit destination the image which has been converted by an automatic dialing to the transit destination.

Here, in the transit communication procedures shown in FIG. 29, the transit destination is represented as one place only, but the number of the destination can be singular or plural. Also, among a plurality of facsimile apparatuses at destinations, there may be a mix up of those capable of handling a color reception and those incapable of handling any color reception. Therefore, in the step S1020 of the flowchart shown in FIG. 30, the received color image is not eliminated, but stored in a memory even when the received color image is converted into a monochromic image.

Figure 32:
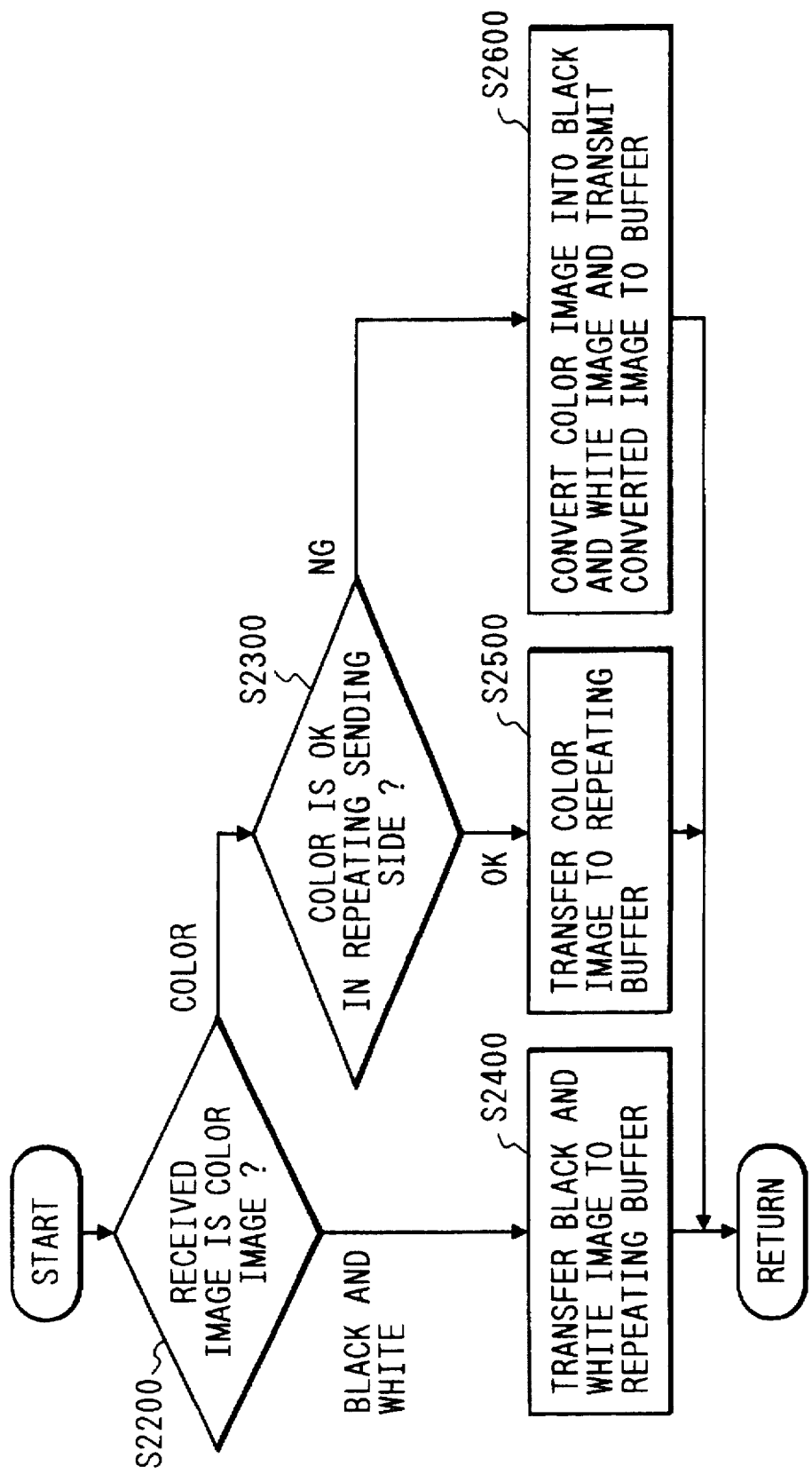
FIG. 32 is a detailed flowchart showing the step S1200 shown in FIG. 31.

FIG. 31 is the detailed flowchart for the step S1020 shown in FIG. 30. In FIG. 31, various parameters are initialized in step S1100 (a page counter being set to one, for example), and in step S1200, a color image of one-page portion is converted into a monochromic image in accordance with the facsimile apparatus at the destination as shown in FIG. 32. In the next step S1300, the page counter is incremented by one, and in step S1400, whether the conversion of the entire pages is terminated or not is determined on the basis of the values of this page counter.

Also, FIG. 32 is the detailed flowchart for the step S1200 shown in FIG. 31. In FIG. 32, whether the received image is in color or not is determined in step S2200. If the image is monochromic, the process will proceed to step S2400 to store it in the image memory area for a transit communication (transit buffer). On the other hand, if the received image is in color, whether the transit destination is equipped with a color reception or not is judged in step S2300.

If this destination is capable of receiving the color transmission, the process will proceed to step S2500 to transfer the received color image to the transit buffer. However, if the destination is incapable of receiving any color transmission, the color image is converted into a monochromic image and transferred to the transit buffer in step S2600.

Figure 33:
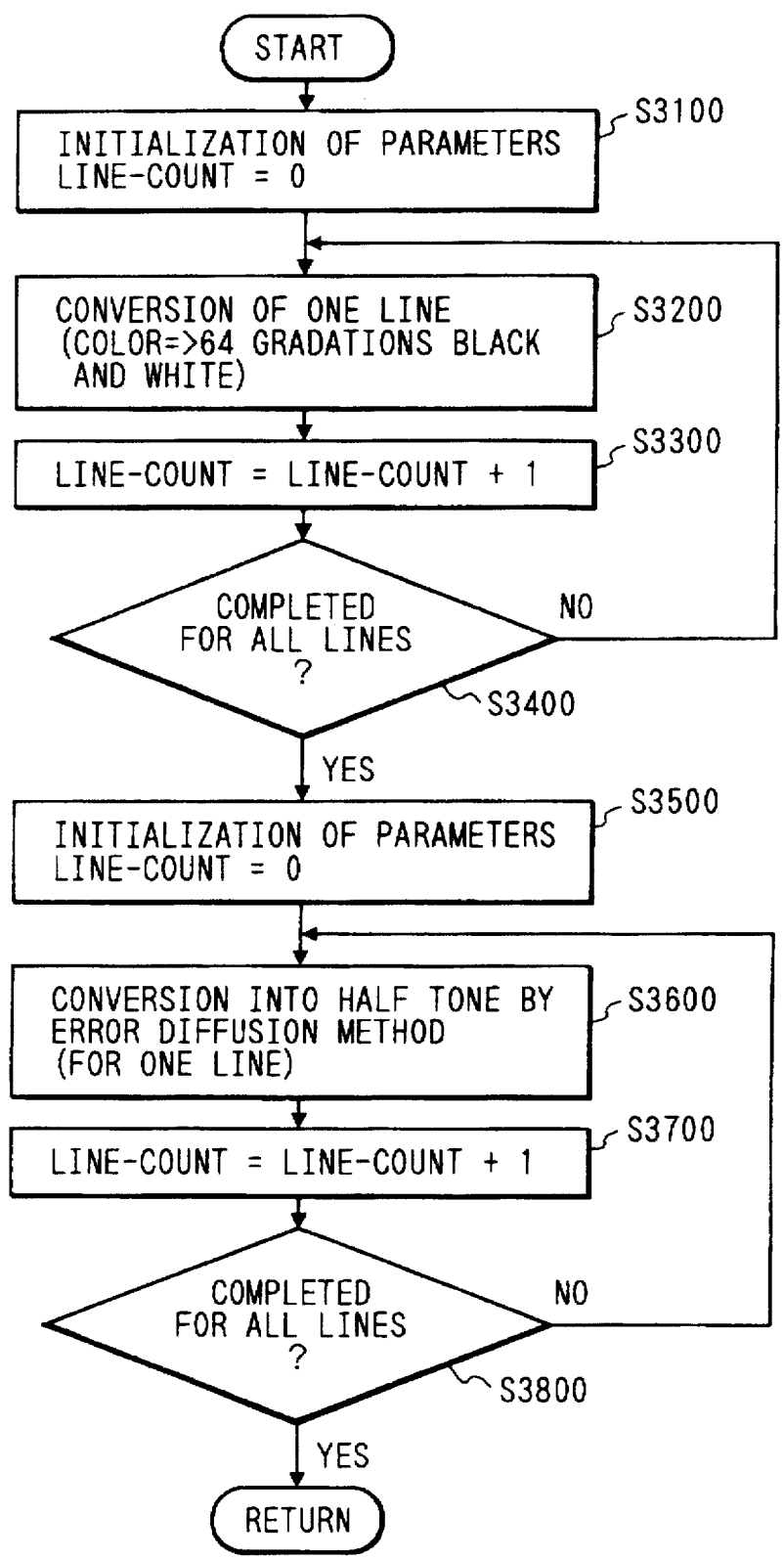
FIG. 33 is a detailed flowchart showing the step S2600 shown in FIG. 32.

Regarding the above-mentioned step S2600, its detailed process will be described as follows:

FIG. 33 is the detailed flowchart for the step S2600 shown in FIG. 32. In step S3100 shown in FIG. 33, various parameters are initialized, including the zero setting of the line counter or the like, for example. In step S3200, the color line for one-page portion is converted into a monochromic image of 64 gradations. Then, in step S3300, the line counter is incremented by one to perform the line counting. In step S3400, whether the conversion of the entire lines is terminated or not is determined in accordance with the values of the line counter. If the result is affirmative (YES), it is interpreted that the color data of the one-page portion have been converted into the image of the 64 gradations. Thus, the process will proceed to step S3500.

In the step S3500, the parameter for the next step is set (the line counter=0). In the following steps S3600, S3700, and S3800, the conversion to the intermediate tonality is executed by an error diffusion method.

Figures 34, 35:
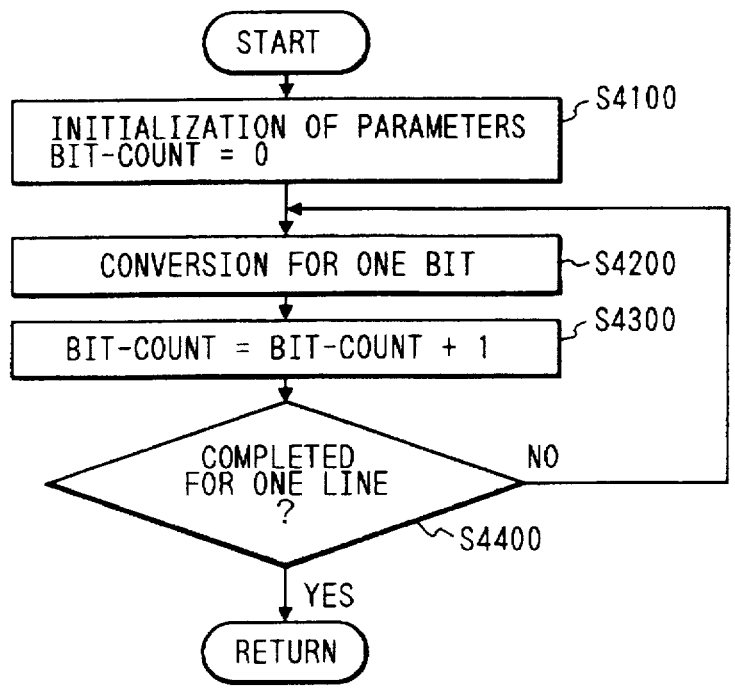
FIG. 34 is a detailed flowchart showing the step S3200 shown in FIG. 33.
FIG. 35 is a view showing a conversion table used for converting color data into monochrome data of 64 gradations.

FIG. 34 is the detailed flowchart for the step S3200 shown in FIG. 33. In FIG. 34, the parameters are initialized in step S4100 (the bit counter being set at zero, for example). In step S4200, the color pixel data of one bit portion are converted into a monochromic data of 64 gradations.

Then, in the next step S4300, the bit counter is incremented, and whether the color data of the one-line portion have been converted into the monochromic data of 64 gradations or not is judged in the following step S4400.

FIG. 35 is a conversion table for converting a color data into a monochromic data of 64 gradations. Here, on the assumption that the color data of one pixel portion is represented by the total of three bytes for R, G, and B and the monochromic data of the 64 gradations is represented by one byte as shown in FIG. 35, the 64 kinds of 64-gradation monochromic data are assigned to the color data of 256× 256×256. In the actual conversion, the monochromic data of 64 gradations corresponding to the color data is obtained from the table shown in FIG. 35. A color data of R=0, G=0, and B=0 corresponds to the monochromic data=0, and represents "white" as the actual color.

As described above, according to the present embodiment, the reception of a color image is possible. There is also an advantage that a color image can be transmitted as a transit sending to the facsimile apparatus which handles only a monochromic image by providing a color/monochromic converting function for a facsimile apparatus which is capable of executing a transit sending, thus converting the color image to the monochromic image by the color/monochromic converting function.

In this respect, the present invention is applicable to both a system comprising a plurality of equipment and a system comprising one equipment.

As set forth above, according to the present embodiment, there is an effect that it is possible to execute an appropriate communication even when there is a mix up of the facsimile apparatus capable of handling the color transmission and the one capable of handling the transmission of only two-valued information because the transmission is executed in accordance with the judgment on the availability of the color receiving function of the receiver on the destination.

Also, it is possible to know easily the frequency of color transmission by recording the presence and absence of color transmissions and those of the color transmission executions in the reports on the communication results and management.

Also, there is an effect that the receiving side is able to recognize that the received information is derived from a color information by informing the receiving side from the sending side of this event when the color image is sent as a two-valued information.

Furthermore, in a facsimile apparatus capable of executing a transit sending, it is possible to transmit a color image with the judgment on the availability of color receiving function at the transit destination without giving up the execution of such transit sending.

Figure 36B:
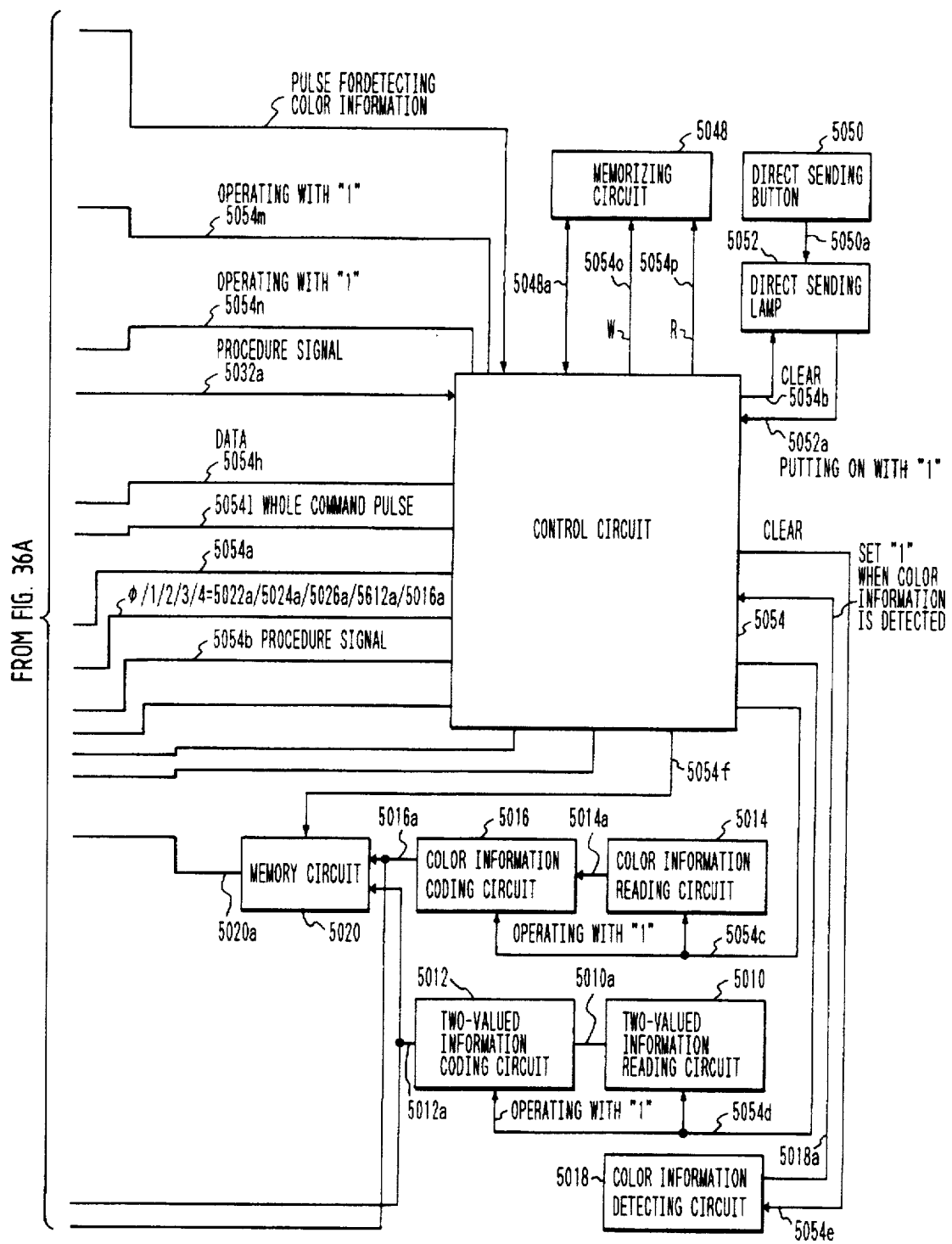

FIGS. 36A and 36B are block diagrams showing another embodiment of a facsimile apparatus according to the present invention.

In FIGS. 36A and 36B, a reference numeral 5002 designates a network control unit (NCU) which is connected to the terminal of the circuit in order to use a telephone network for data communication and the like, and arranged to control the connection of the telephone exchange network, switching over of the data communication passages, and loop maintenance. A signal line 5002a is a telephone line. The NCU 5002 receives a signal from a signal line 5054a, and if the level of this signal is "0" , the telephone line is connected to the telephone set side, that is, the signal line 5002a is connected to a signal line 5002b. Also, a signal is received from a signal line 5054a, and if the level of this signal is "L", the telephone line is connected to the facsimile apparatus side, that is, the signal line 5002a is connected to a signal line 5002c. In a usual state, the telephone line is connected to the telephone set side.

A reference numeral 5004 designates a telephone set.

A reference numeral 5006 designates a hybrid circuit which separates the signals of the sending system from those of the receiving system. The sending signals from the signal line 5030a are sent out to the telephone circuit through the NCU 5002 via the signal line 5002c. Also, the signals from a communicating destination are output to the signal line 5006a through the NCU 5002 via the signal line 5002c.

A reference numeral 5008 designates a modulator to perform modulations on the basis of the known CCITT Recommendation V.21. The modulator 5008 receives the procedural signals from the signal lines 5054b for modulation and outputs the modulated data to the signal line 5008a. There is no need for such a modulator when a digital transmission is executed.

A reference numeral 5010 designates a circuit for reading two-valued information to read image signals sequentially from a sending source document in the main scanning direction when a signal having the signal level of "1" is outputs to a signal line 5054d; thus forming the signal array which represents a two-valued black and white. The two-valued black and white signal array formed by a photographing element such as CCD (Charge Coupled Device) and an optical system is output to a signal line 5010a. The signal line 5010 is not actuated at all when a signal having the signal level "0" is not output to the signal line 5054d.

A reference numeral 5012 designates a circuit which receives the two-valued information data read and output to the signal line 5054d when the signal having the signal level "1" is output to the signal line 5010a, and outputs the data which are MH (Modified Huffman) coded or MR (Modified Read) coded to the signal line 5012a. Here, this circuit 5012 is not actuated at all when a signal having the signal level "0" is output to the signal line 5054d.

A reference numeral 5014 designates a color information reading circuit which reads from a sending source document sequentially the image signals for one line portion in the main scanning direction when a signal having the signal level "1" is output to a signal line 5054c; thus forming the signal lines which represent color information. Then, this color information is Output to a signal line 5014a. When a signal having the signal level "0" is output to the signal line 5054c, this circuit 5014 is not actuated at all. In this respect, according to the present embodiment, a photoelectric converting element for reading uses a color sensor having reading elements arranged at the points R, G, B in that order, for example, and the two-valued information reading circuit 5010 reads out only six components of such a sensor as this.

A reference numeral 5016 designates a circuit which receives the data read on color information output to the signal line 5014a when a signal having the signal level "1" is output to the signal line 5054c, and outputs the color coded data to the signal line 5016a. If a signal having the signal level "0" is output to the signal line 5054c, this circuit 5016 is not actuated at all.

A reference numeral 5018 designates a color information detecting circuit which outputs a signal having the signal level "0" to a signal line 5018a when a clear pulse is generated in a signal line 5054e, and outputs a signal having the signal level "1" to a signal line 5018a when detecting a color information in the information which have been read. A detection such as this discriminates the chromatic components from the output of the aforesaid color sensor by determining whether the difference between the maximum value and the minimum values of the R, G, B data is more than a given value or not, for example.

A reference numeral 5020 designates a memory circuit which receives the signals output to the signal line 5012a or signal line 5016a by the control of a signal line 5054f and stores them in the memory circuit. Also, this circuit outputs the information thus stored in the memory circuit to a signal line 5020a by the control of the signal line 5054f.

A reference numeral 5022 designates a color information decoding/coding circuit which receives signals output to a signal line 5020a by the control of a signal line 5054g, and outputs to the signal line 5022a the signal which agrees with the conditions of the receiver at the destination by decoding the color information as required, converting and coding the size, and again coding it. For a coding as this, it may be possible to adopt a compressing method called ADCT, a method called JPEG, or other color binalization method.

A reference numeral 5024 designates a circuit for decoding a color information, converting it to a two-valued information, and coding the two-valued information. This circuit receives the signal output to the signal line 5020a by the control of a signal line 5054h, and decodes the color information, converts it to the two-valued information, converts the size density as required, and again decodes the two-valued information thereby to output to a signal line 5024a the signal which will agree with the conditions of the receiver at the destination.

A reference numeral 5026 designates a two-valued information decoding/coding circuit which receives signals output to the signal line 5020a by the control of a signal line 5054i, and decodes the two-valued information as required, converts and codes the size and density, thereby to output to a signal line 5026a the signal which will agree with the conditions of the receiver at the destination.

A reference numeral 5028 designates a modulator which executes modulations on the basis of the known CCITT Recommendation V.27 ter (differential phase modulation), V.29 (orthogonal modulation) or V.17. The modulator 5028 receives signals from the signal line 5022a when a signal "0" is output to a signal line 5054j. Thereafter, when signals "1", "2", "3", and "4" are output to the signal line 5054o likewise, the modulator receives signals from the signal lines 5024a, 5026a, 5012a, and 5016a for modulation and outputs the modulated data to the signal line 5028a.

A reference numeral 5030 designates an addition circuit which receives signals from the signal line 5008a and signal line 5028a, and outputs the result of the addition to a signal line 5030a.

A reference numeral 5032 designates a demodulator which executes demodulations on the basis of the known CCITT Recommendation V.21. This demodulator 5032 received signals from the signal line 5006a, and demodulates them on the basis of the V.21 to output the demodulated data to a signal line 5032a.

A reference numeral 5034 designates a demodulator which executes demodulations on the basis of the known CCITT Recommendation V.27 ter (differential phase modulation), V.29 (orthogonal modulation) or V.17. Then, the demodulator 5034 receives signals from the signal line 5006a for demodulation and outputs the data thus demodulated to a signal line 5034a.

A reference numeral 5036 designates a circuit which receives signals from the signal line 5034a and outputs the two-valued information which are MH (Modified Huffman) decoded or MR (Modified Read) decoded to a signal line 5036a when a signal having the signal level "1" is output to a signal line 5054m. The circuit 5036 is not actuated at all when a signal having the signal level "0" is output to the signal line 5054m.

A reference numeral 5038 designates a recording circuit which receives the two-valued information from the signal line 5036a sequentially when a signal having the signal level "1" is output to the signal line 5054m, and records the two-valued information for each one-line portion. This circuit 5038 is not actuated at all when a signal having the signal level "0" is output to the signal line 5054m.

A reference numeral 5040 designates a circuit which receives signals from the signal line 5034a when a signal having the signal level "1" is output to a signal line 5054n, and outputs the data on the decoded color information to a signal line 5040a. This circuit 5054 is not actuated at all when a signal having the signal level "0" is output to the signal line 5054n.

A reference numeral 5042 designates a recording circuit which receives color information output to the signal line 5040a sequentially when a signal having the signal level "1" is output to the signal line 5054n and records the color information. This circuit 5042 is not actuated at all when a signal having the signal level "0" is output to the signal line 5054n.

A reference numeral 5044 designates a circuit which generates a pulse to indicate a color information in a signal line 5044a when receiving signals from a signal line 5034a and detecting an information which represents the color information.

A reference numeral 5046 designates a calling circuit which receives data output to a signal line 5054l when a calling instruction pulse is generated in the signal line 5054l, and sends out a selection signal to the signal line 5002b.

A reference numeral 5048 designates a storing circuit which for storing either a color information or a monochromic two-valued information corresponding to the page number used when a page number for a color page information is notified from the receiver in the destination either at the time of a memory sending or in an anteprocedure. When stored in the circuit 5048, a page number (01, for example) is output to a signal line 5048a; then a space; then zero for a color information or one for a two-valued information; and then, in continuation, the information regarding the next page number in the same format, and a write pulse is generated in a signal line 5054o. Hence, either the color information or the two-valued information will be recorded corresponding to the page number. Also, when reading the information stored in the circuit 5048, a reading pulse is generated in a signal line 5054p after a page number (03, for example) is output to the signal line 5048a. Hence, the information (zero for the color information and one for the two-valued information) registered corresponding to the page number is output to the signal line 5048a.

A reference numeral 5050 designates a direct sending button. When this button is depressed, a depressed pulse is generated in a signal line 5050a.

A reference numeral 5052 designate a direct sending lamp which is turned off when a clear pass is generated in a signal line 5054q, and repeats the light on →light off →light on per generation of the depressed pulse in the signal line 5050a. When the direct sending lamp 5052 is turned off, a signal having the signal level "0" is output to the signal line 5050a. When the direction sending lamp 5052 is turned on, a signal having the signal level "1" is output to the signal line 5052a.

At the time of receiving, the aforesaid storing circuit 5048 stores whether the notified page number and the color information is a monochromic two-valued information or not as described earlier, and at the time of sending, this circuit stores whether or not each of the sending pages is for a color information or for a monochromic two-valued information. The control circuit 5054 has in it a means for discriminating the output from a detecting circuit 5018 which detects a color information or a two-valued information per page, and when a direct sending is selected, the control circuit allows a color information to be transmitted for the page which is judged to contain a color information by the aforesaid detection circuit 5018 when the receiver at the destination is equipped with the color receiving function; or a two-valued information to be transmitted for the page which is judged by the aforesaid discriminating means to contain a two-valued information; and a two valued information to be transmitted for all the pages when the receiver at the destination is not equipped with the color receiving function. Also, when a memory sending is selected, a color information is coded for the page which is judged by the aforesaid detecting circuit 5018 to contain a color information and is stored in the memory circuit 5020; and a two-valued information is coded for the page which is judged by the aforesaid detecting circuit 5018 to contain a two-valued information and stored in the memory circuit 5020. Then, the specified destination is called. If the receiver at the destination is equipped with the color receiving function, a color information is transmitted as the color information, and a two-valued is transmitted as the two-valued information. If the receiver at the destination is not equipped with the color receiving function, the color information is converted into a two-valued information for a two-valued transmission, while a two-valued information is transmitted as the two-valued information. Here, the size and density conversion is executed for all of them as required. In this respect, when a color information is transmitted, an indication that the transmission is for a color information is additionally provided for the leading portion of each page information. In a facsimile apparatus capable of color transmission and color recording, the color page information is recorded by a color recording means while the two-valued page information is recorded by a two-valued means.

Figure 37B:
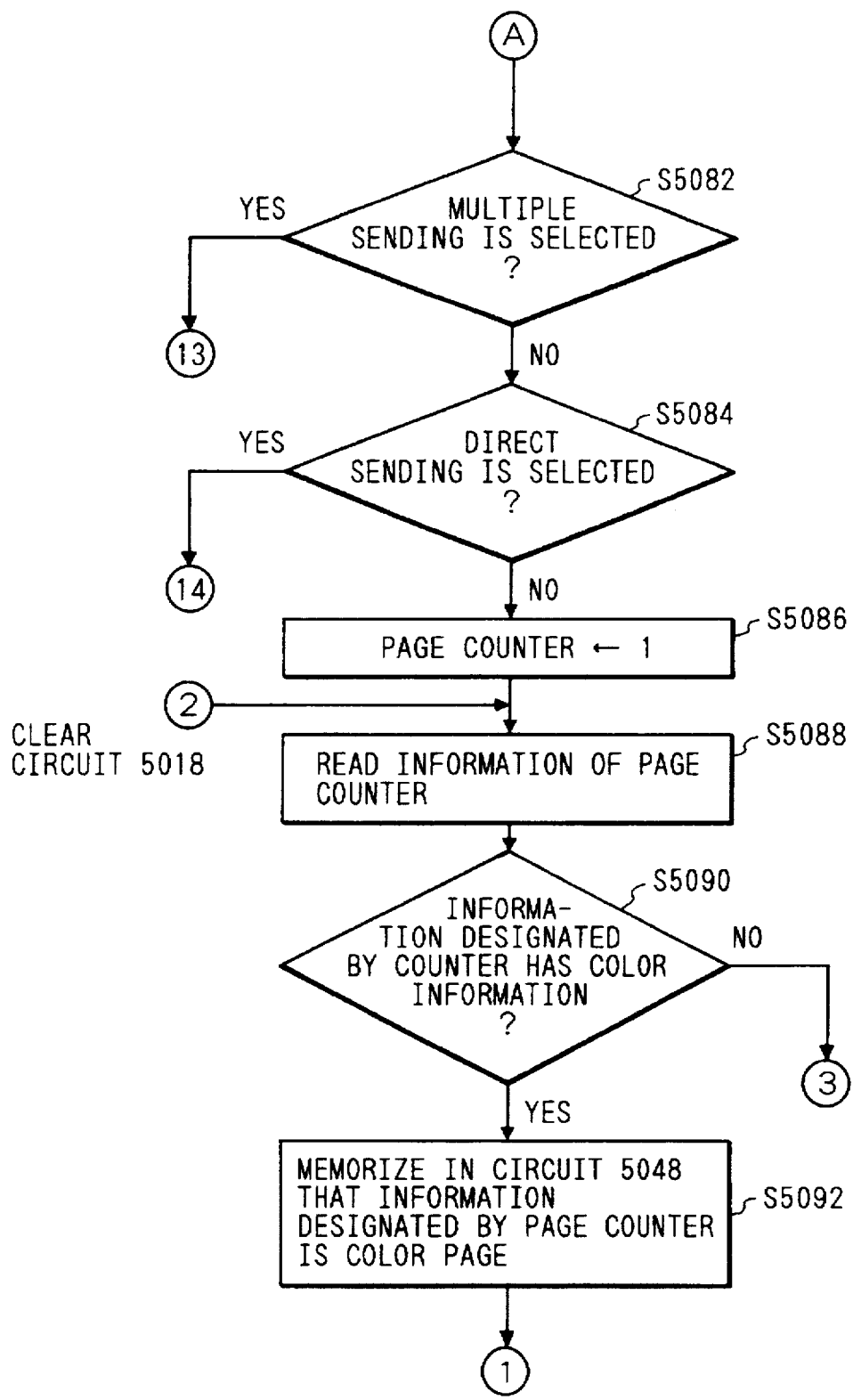
FIG. 37 which comprises FIGS. 37A and 37B to FIG. 43 and FIG. 44 which comprises

FIGS. 37A and 37B are flowcharts showing the control of the control circuit 5054 shown in FIGS. 36A and 36B.

In FIGS. 37A and 37B, step S5060 represents an initiation.

In step S5062, a signal having the signal level "0" is output to the signal line 5054a to turn off the CML.

In step S5064, a signal having the signal level "0" is output to the signal line 5054d set the two valued information reading circuit 5010 and the two-valued information coding circuit 5012 so that these circuits are not actuated.

In step S5066, a signal having the signal level "0" is output to the signal line 5054c to set the color information reading circuit 5014 and the color information coding circuit 5016 so that these circuits are not actuated.

In step S5068, a signal "2" is output to the signal line 5054j to set the modulator 5028 of the V27 ter, V29, and V17 to allow it to receive signals from the signal line 5026.

In step S5070, a signal having the signal level "0" is output to the signal line 5054m to set the two-valued information decoding circuit and the two-value recording circuit 5038 so that these circuits are not actuated.

In step S5072, a signal having the signal level "0" is output to the signal line 5054n to set the color information decoding circuit 5040 and the color information recording circuit 5042 so that these circuits are not actuated.

In step S5074, a clear pulse is generated in the signal line 5054q to turn off the direct sending lamp 5052.

In step S5076, whether any sending is selected or not is judged. If a sending is selected, the process will proceed to step S5082. If no sending is selected, the process will proceed to step S5078.

In the step S5078, whether any receiving is selected or not is judged. If a receiving is selected, the process will proceed to step S5228. If no receiving is selected, the process will proceed to step S5089 for the execution of some other processing.

In step S5082, whether any multiple sending is selected or not is judged. If a multiple sending is selected, the process will proceed to step S5174. If no multiple sending is selected, the process will proceed to step S5084.

In the step S5084, signals from the signal line 5852a are received. Whether any direct sending is selected or not is judged. If a direct sending is selected, the process will proceed to step S5181. If no direct sending is selected, the process will proceed to step S5086.

In the step S5086, the page counter is set at one.

In step S5088, a clear pulse is generated in the signal line 5054e. After the color information detecting circuit 5018 is cleared, a page information corresponding to the page counter will be read.

In step S5090, an information is received from the signal line 5018a. Whether the information designated by the page counter contains any color information or not is judged. If a color information is contained, the process will proceed to step S5092. If no color information is contained, the process will proceed to step S5120.

In the step S5092, the information designated by the page counter is stored in the circuit 5048 storing a color information or a two-valued information as a color page corresponding to the page number.

In step S5094, a signal having the signal level "1" is output to the signal line 5054c to set the color information reading circuit 5014 and the color information coding circuit 5016 so that these circuits are actuated.

In step S5096, the color coded data output to the signal line 5016a is stored in the memory circuit 5020 through the signal line 5054f as a page information of the page counter.

In step S5098, whether the one-page reading is terminated or not is judged. If the one-page reading is terminated, the process will proceed to step S5100. If the one-page reading is yet to be terminated, the process will proceed to step S5096.

In the step S5100, a signal having the signal level "0" is output to the signal line 5054c to set the color information reading circuit 5014 and the color information coding circuit 5016 so that these circuit are not actuated.

In step S5102, whether the next page exists or not is judged. If the next page exists, the process will proceed to step S5104. If no page exists next, the process will proceed to step S5106.

In the step S5104, the value of the page counter is incremented by one.

In step S5106, the telephone number of the designated destination is output to the signal line 5054h. Then, a calling instruction pulse is generated in the signal line 5541 to call the designated destination.

In step S5108, a signal having the signal level "1" is output to the signal line 5054a to turn on the CML.

Step S5110 represents the anteprocedures.

In step S5112, whether the receiver at the destination is equipped with the color receiving function or not is judged. If the color receiving function is equipped, the process will proceed to step S5114. If no color receiving function is equipped, the process will proceed to step S5150.

The step S5114 represents the remaining anteprocedure.

In step S5116, the page counter is incremented by one.

In step S5118, the information in the storing circuit 5048 to indicate a color information or a two-valued information is received corresponding to the page number. Whether the information corresponding to the page number contains a color information or not is judged. If any color information exists, the process will proceed to step S5128. If no color information exists, the process will proceed to step S5144.

In step S5120, a signal having the signal level "1" is output to the signal line 5054d to set the two-valued information reading circuit 5010 and the two-valued information coding circuit 5012 so that these circuits are actuated.

In step S5122, the two-valued coded data output to the signal line 5012a is stored in the memory circuit 5020 through the signal line 5054f as a page information of the page counter.

In step S5124, whether the one-page reading is terminated or not is judged. If the one-page reading is terminated, the process will proceed to step S5126. If the one-page reading is yet to be terminated, the process will proceed to step S5122.

In the step S5126, a signal having the signal level "0" is output to the signal line 5054d to set the two-valued information reading circuit 5010 and the two-valued information coding circuit 5012 so that these circuit are not actuated.

In step S5128, a signal having the signal level "0" is output to the signal line 5054j to set the modulator 5028 of V27 ter, V29, and V17 for receiving signals from the signal line 5022a.

In step S5130, a unique signal representing a color information at the leading portion of an image information is sent at first. (For example, an ECM mode, that is, if a data is HDLC formatted, the initial FCF is not necessarily at 06H, but it is set at 46H). Then, by the control of the signal line 5054f, the data stored in the memory circuit 5020 are output to the signal line 5020a, and by the control of the signal line 5054g, signals output to the signal line 5020a are received to decode the color information as required, convert the size and density, and again code it for outputting a signal which will agree with the condition of the receiver at the destination; thus sending the color information.

In step S5132, whether the one-page sending is terminated or not is judged. If the one-page sending is terminated, the process will proceed to step S5134. If the one-page sending is yet to be terminated, the process will proceed to step S5130.

The step S5134 represents the transit procedures.

In step S5136, whether the entire-page sending is terminated or not is judged. If the entire-page sending is terminated, the process will proceed to step S5140. If the entire-page sending is yet to be terminated, the process will proceed to step S5138.

In the step S5138, the value of the page counter is incremented by one.

The step S5140 represents the postprocedures.

In step S5142, a signal having the signal level "0" is output to the signal line S5054a to turn off the CML.

In step S5144, a signal "2" is output to the signal line 5054j to set the modulator 5028 of the V27 ter, V29, and V17 for receiving signals from the signal line 5026a.

In step S5146, a unique signal representing a color information at the leading portion of an image information is sent at first. (For example, an ECM mode, that is, if a data is HDLC formatted, all the FCF is set at 46H). Then, by the control of the signal line 5054f, the data stored in the memory circuit 5020 are output to the signal line 5020a, and by the control of the signal line 5054i, signals output to the signal line 5020a are received to decode the two-valued information as required, convert the size and density, and again code it for outputting a signal which will agree with the condition of the receiver at the destination; thus sending the two-valued information.

In step S5148, whether the one-page sending is terminated or not is judged. If the one-page sending is terminated, the process will proceed to step S5134. If the one-page sending is yet to be terminated, the process will proceed to step S5146

Step S5150 represents the remaining anteprocedure.

In step S5152, the page counter is incremented by one.

In step S5154, the information in the storing circuit 5048 to indicate a color information or a two-valued information is received corresponding to the page number. Whether the information corresponding to the page number contains a color information or not is judged. If any color information exists, the process will proceed to step S5156. If no color information exists, the process will proceed to step S5164.

In the step S5156, a signal having the signal level "1" is output to the signal line 5054j to set the modulator 5028 of V27 ter, V29, and V17 for receiving signals from the signal line 5024a.

In step S5158, a unique signal representing a color information at the leading portion of an image information is sent at first. (For example, an ECM mode, that is; if a data is HDLC formatted, all the FCF is set at 06H). Then, by the control of the signal line 5054f, the data stored in the memory circuit 5020 are output to the signal line 5020a, and by the control of the signal line 5054h, signals output to the signal line 5020a are received to decode the color information, convert this information into a two-valued information, convert the size and density as required, and again code the two-valued information for outputting to the signal line 5024a a signal which will agree with the condition of the receiver at the destination; thus sending the two-valued information.

In step S5160, whether the one-page sending is terminated or not is judged. If the one-page sending is terminated, the process will proceed to step S5162. If the one-page sending is yet to be terminated, the process will proceed to step S5158. The step S5162 represents the transit procedures.

Step S5164 represents the control in the steps from S5144 to S5148, in which a unique signal is added to the leading portion of the image information to indicate that the information is not colored one, but that a two-valued information is sent.

In step S5166, whether the entire-page sending is terminated or not is judged. If the entire-page sending is terminated, the process will proceed to step S5168. If the entire-page sending is yet to be terminated, the process will proceed to step S5172.

The step S5168 represents the postprocedures.

In step S5170, a signal having the signal level "0" is output to the signal line 5054a to turn off the CML.

In the step S5172, the page counter is incremented by one.

In step S5174, those processes in the steps S5086 to S5104, and S5120 to S5126 are represented. Here, if the judgment is negative (NO), the process will proceed to the step to follow. In other words, the sending information is stored in the memory circuit 5020.

In step S5176, whether any destination still remains or not is judged. If any destination still remains, the process will proceed to step S5178. If no more destination exists, the process will proceed to step S5076.

In the step S5178, those process in steps S5106 to S5172 where the step S5126 is eliminated from the step S5120. In other words, the calling is issued to a designated destination, and the information stored in the memory circuit 5020 is sent.

In step S5180, the telephone number of a designated destination is output to the signal line 5054h, and then, a calling instruction pulse is generated in the signal line 5054l to call the designated destination.

In step S5182, a signal having the signal level "1" is output to the signal line 5054a to turn on the CML.

Step S5184 represents the anteprocedures.

In step S5186, whether the receiver at the destination is equipped with the color receiving function or not is judged. If the color receiving function is equipped, the process will proceed to step S5188. If no color receiving function is equipped, the process will proceed to step S5220.

The step S5188 represents the remaining anteprocedure.

In step S5189, a clear pulse is generated in the signal line 5054e. After the color information detecting circuit 5018 is cleared, a page information corresponding to the page counter will be read.

In step S5190, an information is received from the signal line 5018a. Whether the information designated by the page counter contains any color information or not is judged. If a color information is contained, the process will proceed to step S5192. If no color information is contained, the process will proceed to step S5206.

In the step S5192, a signal "4" is output to the signal line 5054j to set the modulator 5028 of V27 ter, V29, and V17 for receiving signals from the signal line 5016a.

In step S5194, a signal having the signal level "1" is output to the signal line 5054c to set the color information reading circuit 5014 and the color information coding circuit 5016 so that these circuits are actuated.

In step S5196, a unique signal which indicates that the information is a colored one is sent to the leading portion of an image information at first. (For example, an ECM mode, that is, if the data is HDLC formatted, the initial FCF is not set only at 06H, but is set at 46H). Then, the color information is sent.

In step S5198, whether the one-page reading is terminated or not is judged. If the one-page reading is terminated, the process will proceed to step S5200. If the one-page reading is yet to be terminated, the process will proceed to step S5196.

In the step S5200, a signal having the signal level "0" is output to the signal line 5054c to set the color information reading circuit 5014 and the color information coding circuit 5016 so that these circuits are not actuated.

Step S5202 represents the transit procedures.

In step S5204, whether the next page exists or not is judged. If the next page exists, the process will proceed to step S5189. If no page exists next, the process will proceed to step S5216.

In step S5206, a signal "3" is output to the signal line 50540 to set the modulator 5028 of V27 ter, V29, and V17 for receiving signals from the signal line 5012a.

Figure 44B:
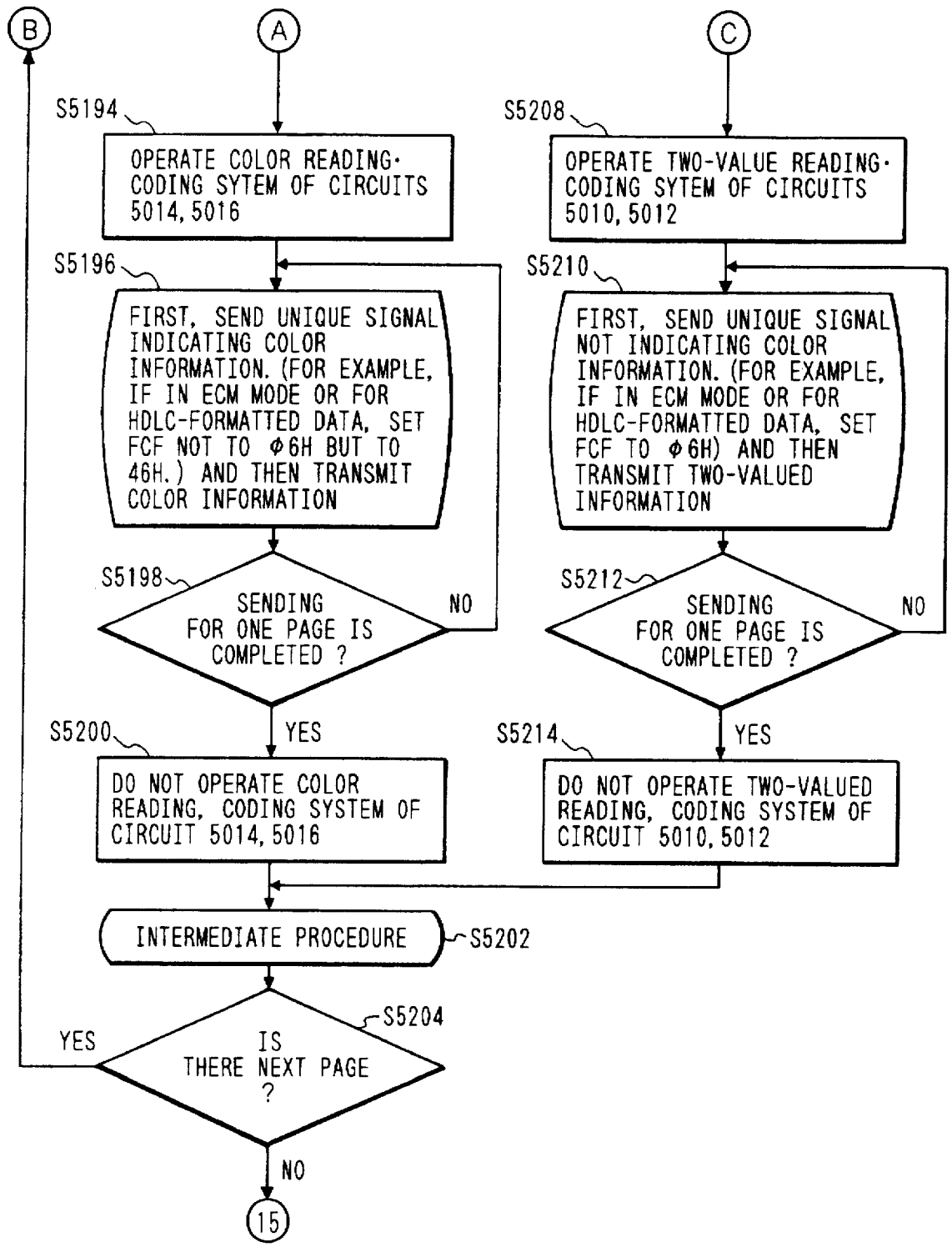

In the step S5208 shown in FIG. 44B, a signal having the signal level "1" is output to the signal line 5054d to set the color information reading circuit 5010 and the two-valued information coding circuit 5012 so that these circuits are actuated.

In step S5210, a unique signal which indicates that the information is not a colored one is sent to the leading portion of an image information at first. (For example, an ECM mode, that is, if the data is HDLC formatted, all the FCF is at 46H). Then, the two-valued information is sent.

In step S5212, whether the one-page reading is terminated or not is judged. If the one-page reading is terminated, the process will proceed to step S5214. If the one-page reading is yet to be terminated, the process will proceed to step 85210.

In the step S5214, a signal having the signal level "0" is output to the signal line 5054d to set the two-valued information reading circuit 5010 and the two-valued information coding circuit 5012 so that these circuits are not actuated.

Figure 45:
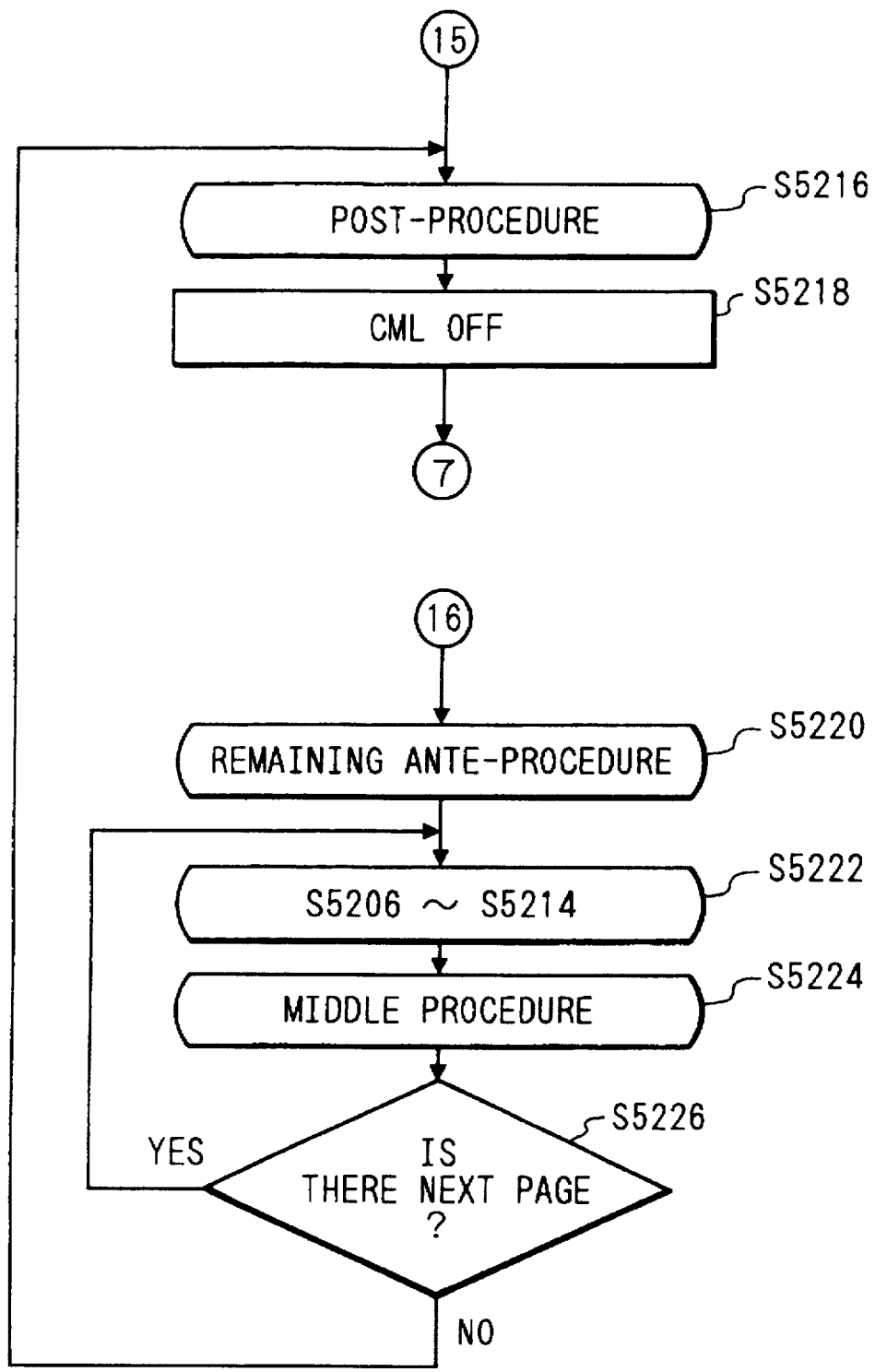

The step S5216 shown in FIG. 45 represents the postprocedures.

In step S5218, a signal having the signal level "0" is output to the signal line 85054a to turn off the CML.

Step S5220 represents the remaining anteprocedure.

Step S5222 represents the steps S5206 to S5214. In other words, the unique signal which indicates that the information is not the colored one is sent to the leading portion of the image information at first. Then, the two-valued information is sent.

Step S5224 represents the transit procedures.

In step S5226, whether the next page exists or not is judged. If the next page exists, the process will proceed to step S5222. If no page exists next, the process will proceed to step S5216.

Figure 46:
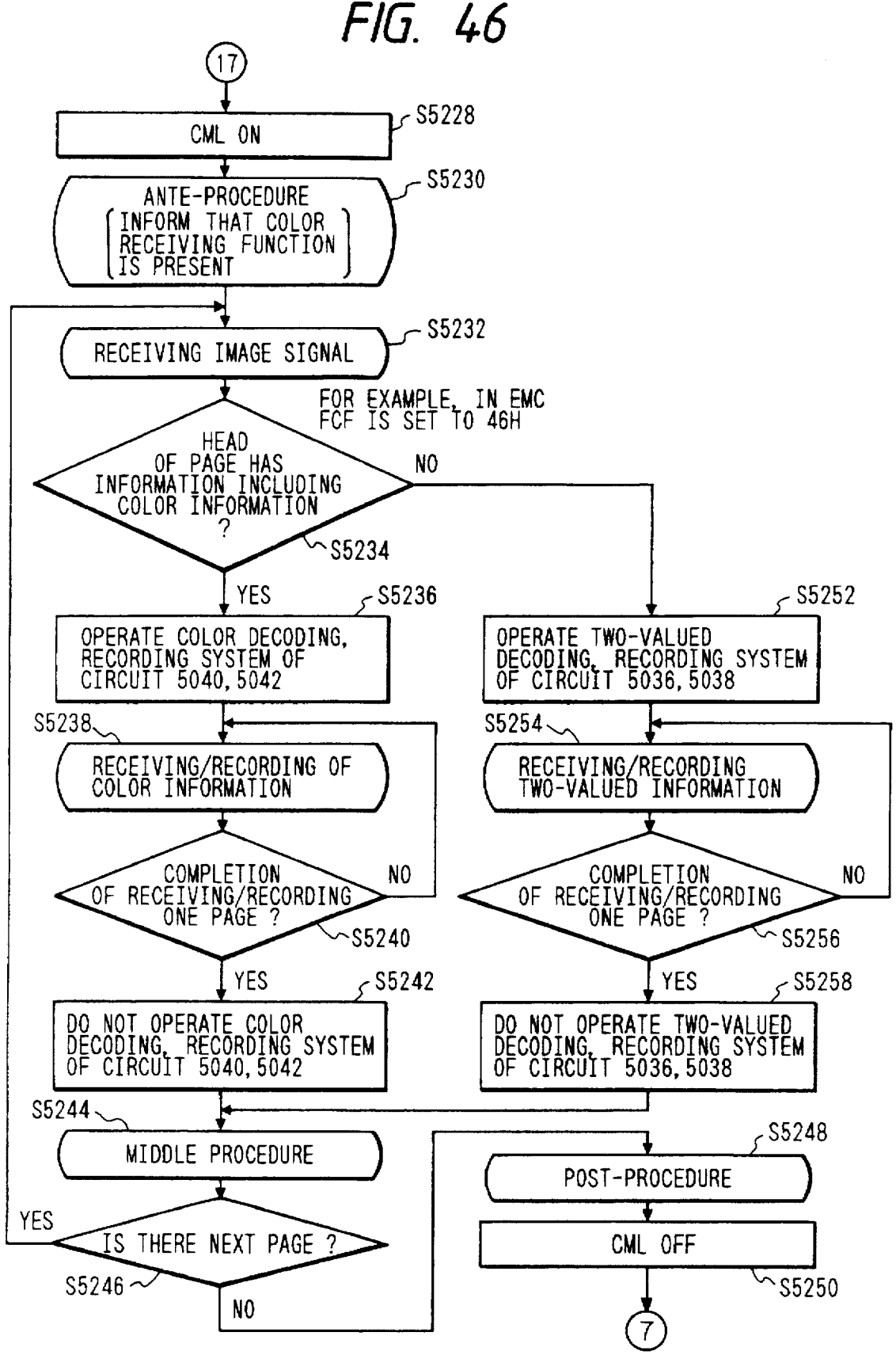

In the step S5228 shown in FIG. 46, a signal having the signal level "1" is output to the signal line 5054a to turn on the CML.

Step S5230 represents the anteprocedures. Here, it is notified that the receiver at the destination is equipped with the color receiving function.

In step S5232, it is represented that an image signal is received. Here, if, for example, an FCF is detected in an ECM mode, the process will proceed to step S5234.

In the step S5234, whether any information which indicates a color information is present at the leading portion of the page or not, that is, the initial FCF is 46H or 06H in the ECM mode, for example, is judged. If an information representing a color information exists (in the ECM mode, the initial FCF is 46H), the process will proceed to step S5236. If any color information is absent (in the ECM mode, the initial FCF is 06H), the process will proceed to step S5252.

In the step S5236, a signal having the signal level "1" is output to the signal line 5054n to set the color information decoding circuit 5040 and the color information recording circuit 5042 so that these circuits are actuated.

In step S5238, it is represented that a color information is received and recorded.

In step S5240, whether one-page receiving and recording are terminated or not is judged. If not terminated, the process will proceed, to step S5238. If terminated, the process will proceed to step S5242.

In the step S5242, a signal having the signal level "0" is output to the signal line 5054n to set the color information decoding circuit 5040 and the color information recording circuit 5042 so that these circuits are not actuated.

Step S5244 represents the transit procedures.

In step S5246, whether the next page exist or not is judged. If the next page exists, the process will proceed to step S5232. If no page exists next, the process will proceed to step S5248.

The step S5448 represents the postprocedures.

In step S5250, a signal having the signal level "0" is output to the signal line 5054a to turn off the CML.

In step S5252, a signal having the signal level "1" is output to the signal line 5054m to set the two-valued information decoding circuit 5036 and the two-valued information recording circuit 5038 so that these circuits are actuated.

In step S5254, it is represented that a two-valued information is received and recorded.

In step S5256, whether the one-page receiving and recording are terminated or not is judged. If not terminated, the process will proceed to step S5254. If terminated, the process will proceed to step S5258.

In the step S5258, a signal having the signal level "0" is output to the signal line 5054m to set the two-valued information decoding circuit 5036 and the two-valued information recording circuit 5038 so that these circuits are not actuated.

(Still Another Embodiment-2)

In the foregoing embodiment, it is considered that sending is executed with an indication of a color information which is additionally provided for the leading portion of each page information when a color information is sent. However, it may be possible to notify the receiver of the total page number as well as the page numbers of color page information in the anteprocedures when a memory communication or a multiple communication is executed.

Figure 47:
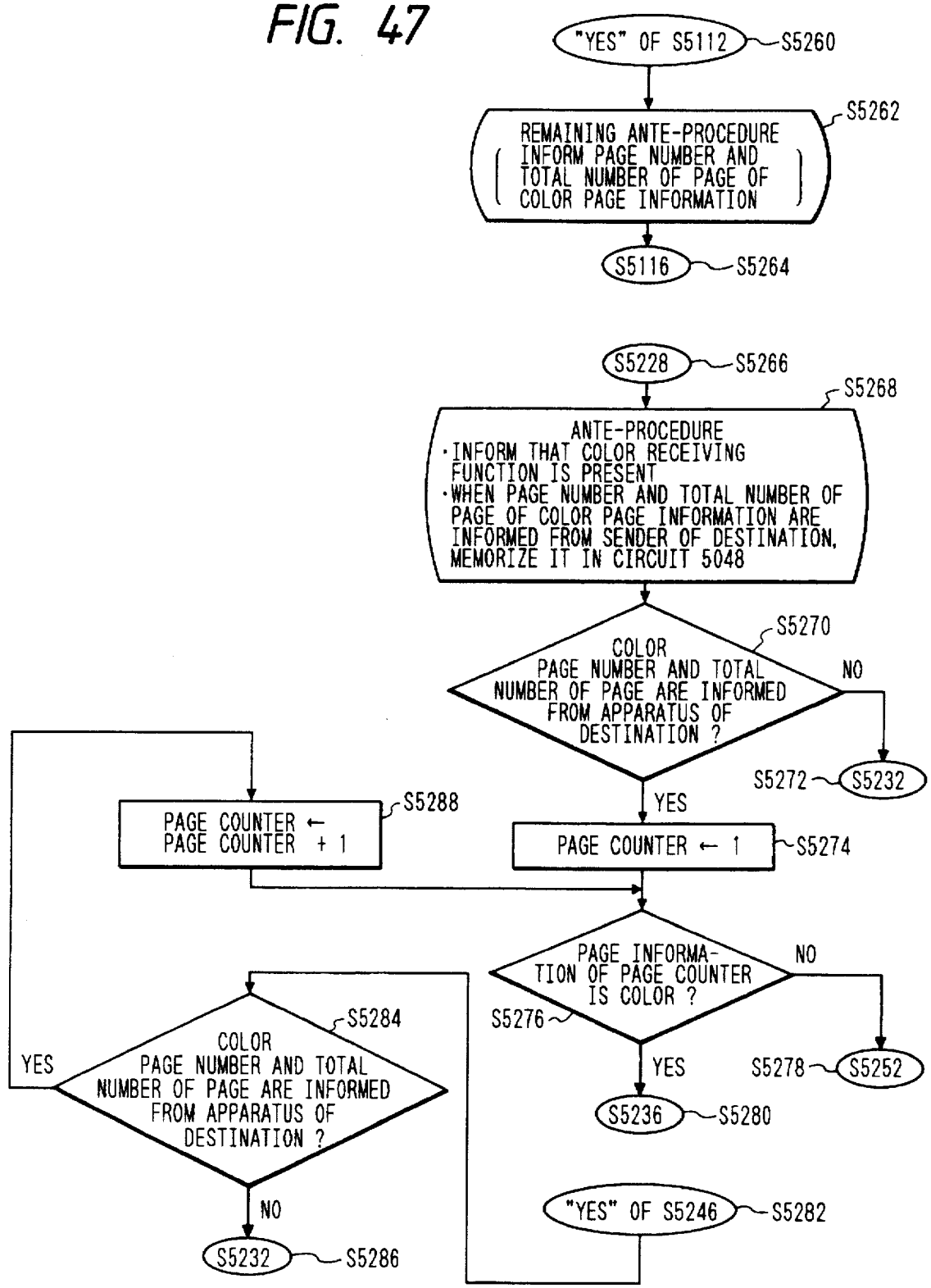

FIG. 47 is a view showing the part of the control which differs from those shown in FIG. 37A to FIG. 46.

Figure 38:
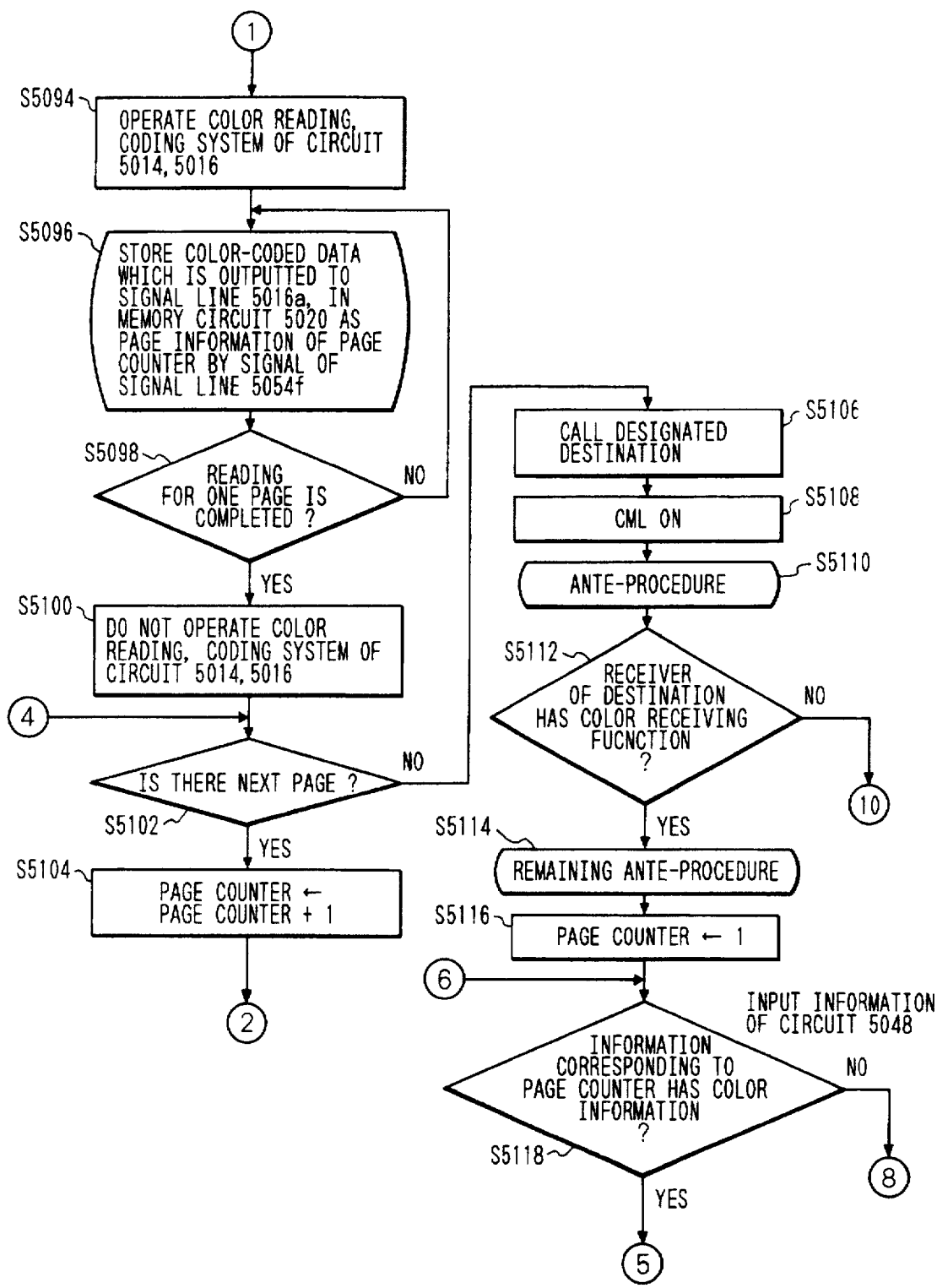
Figure 39:
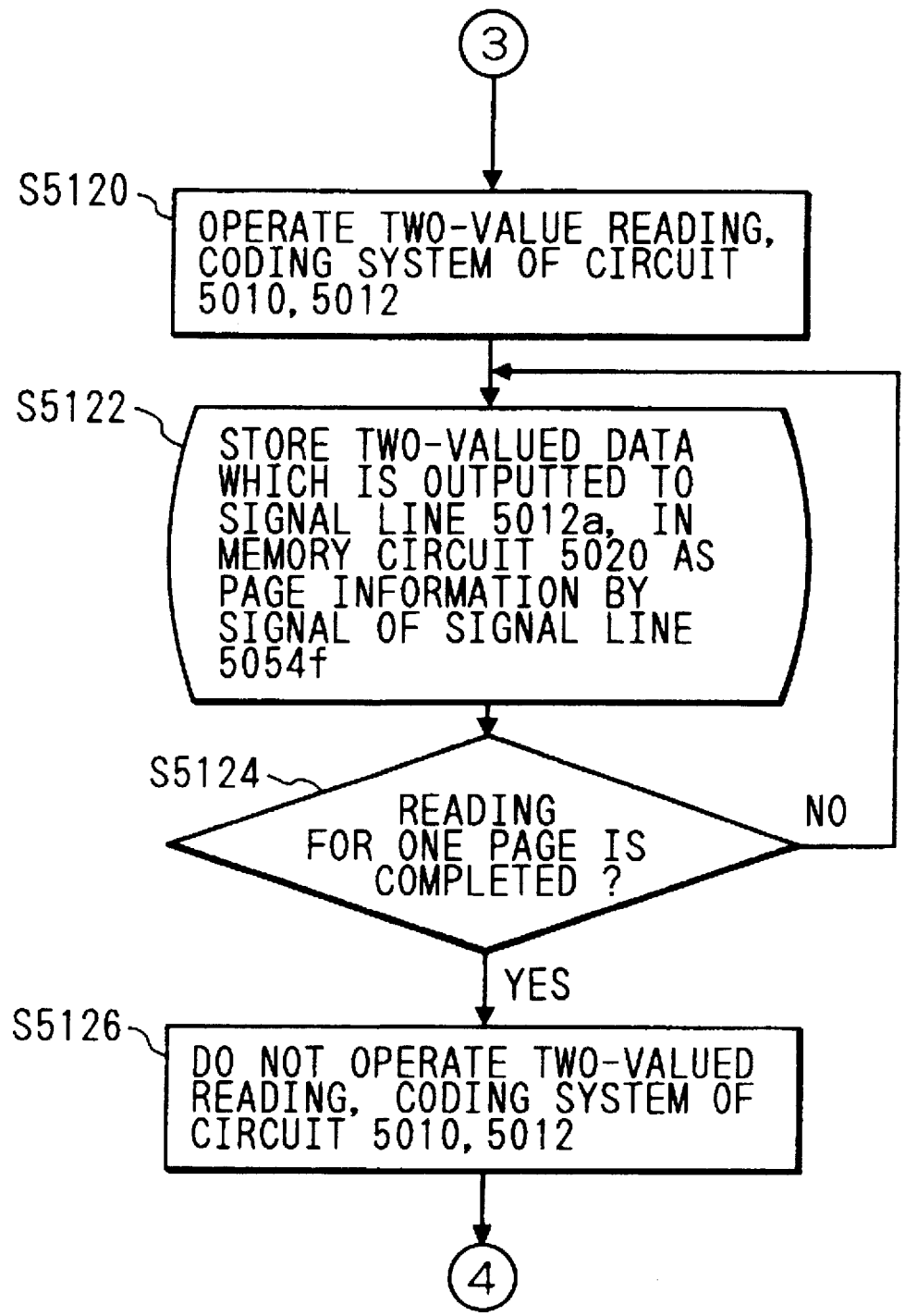
Figure 40:
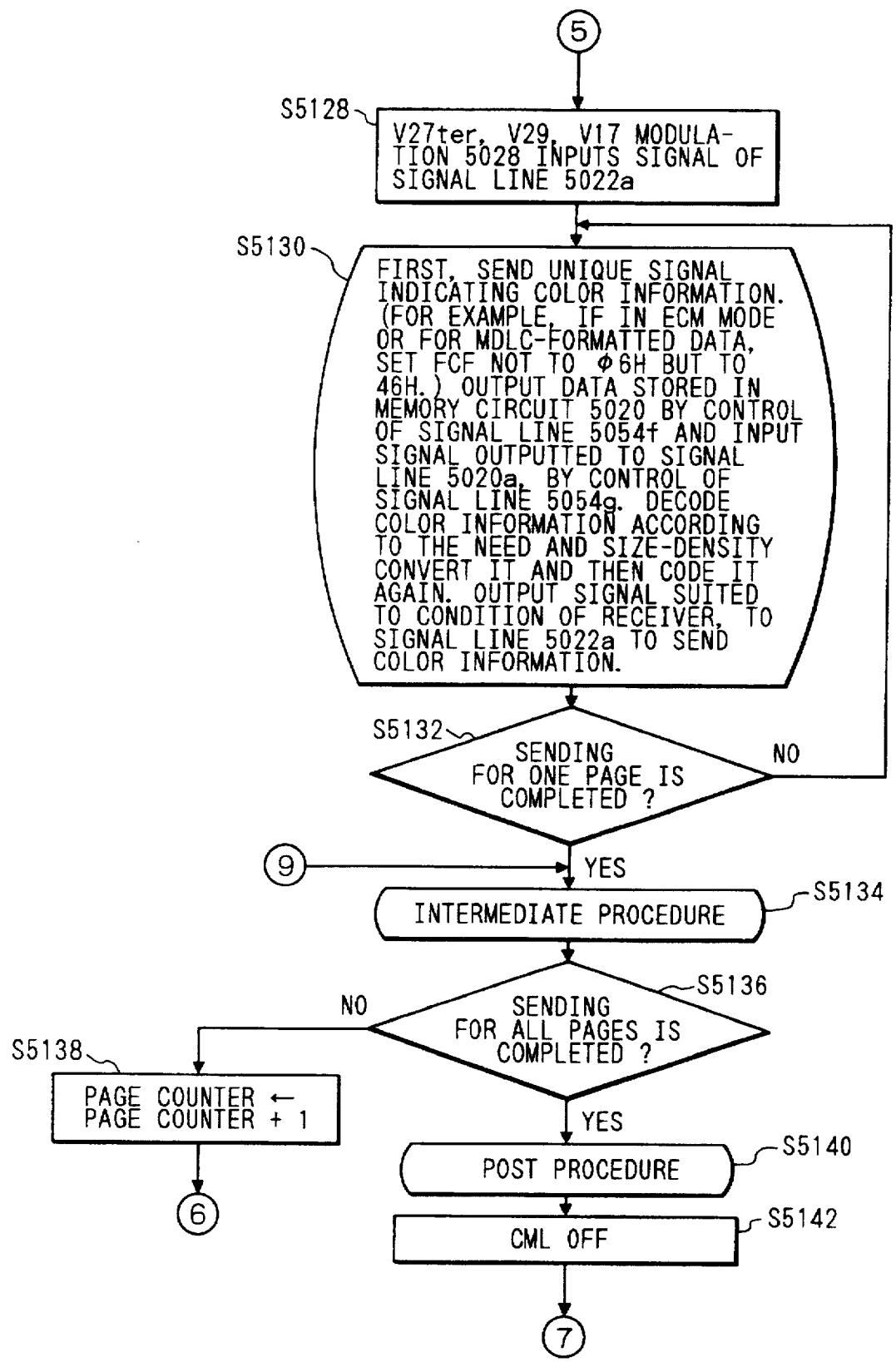
Figure 41:
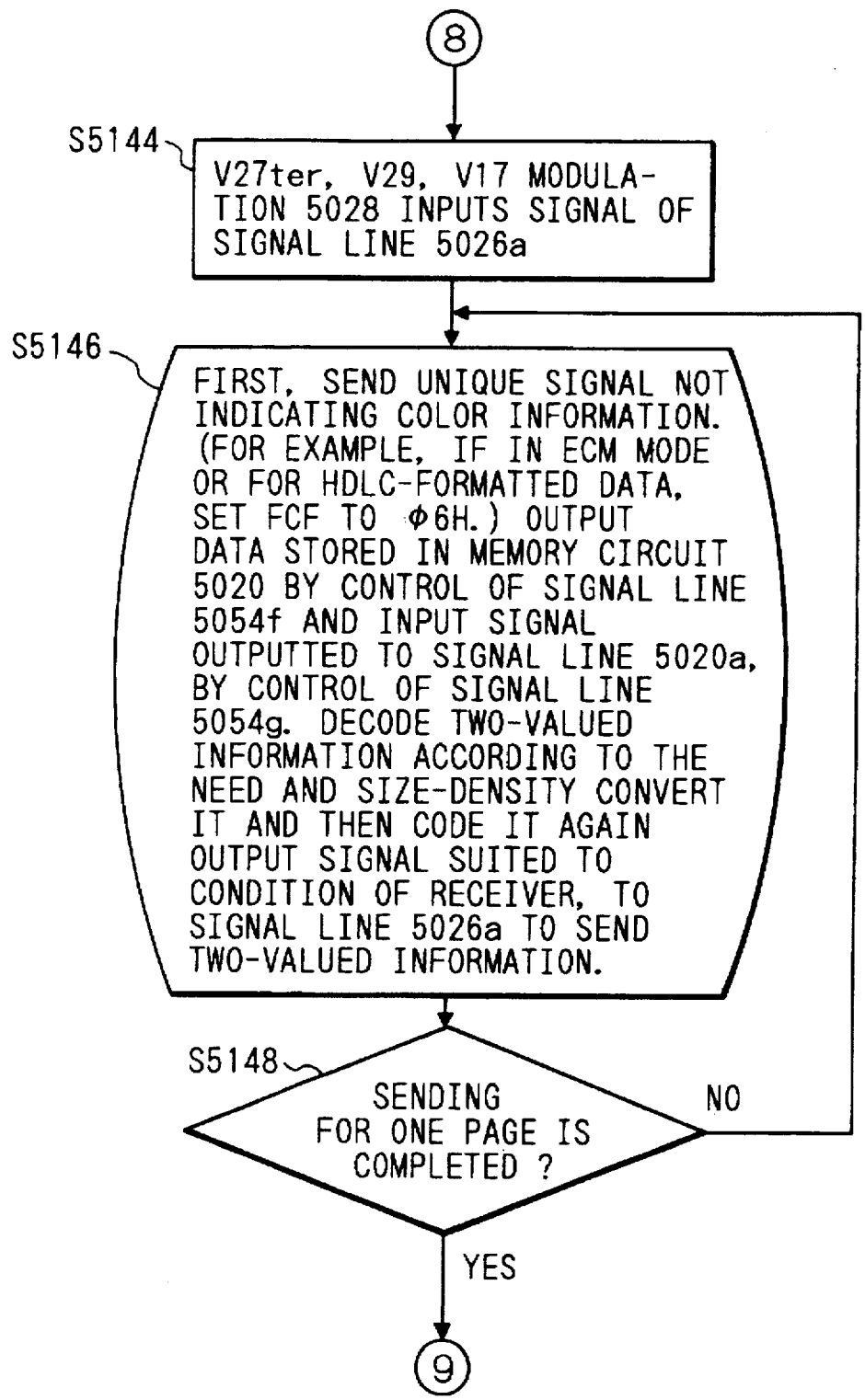
Figure 42:
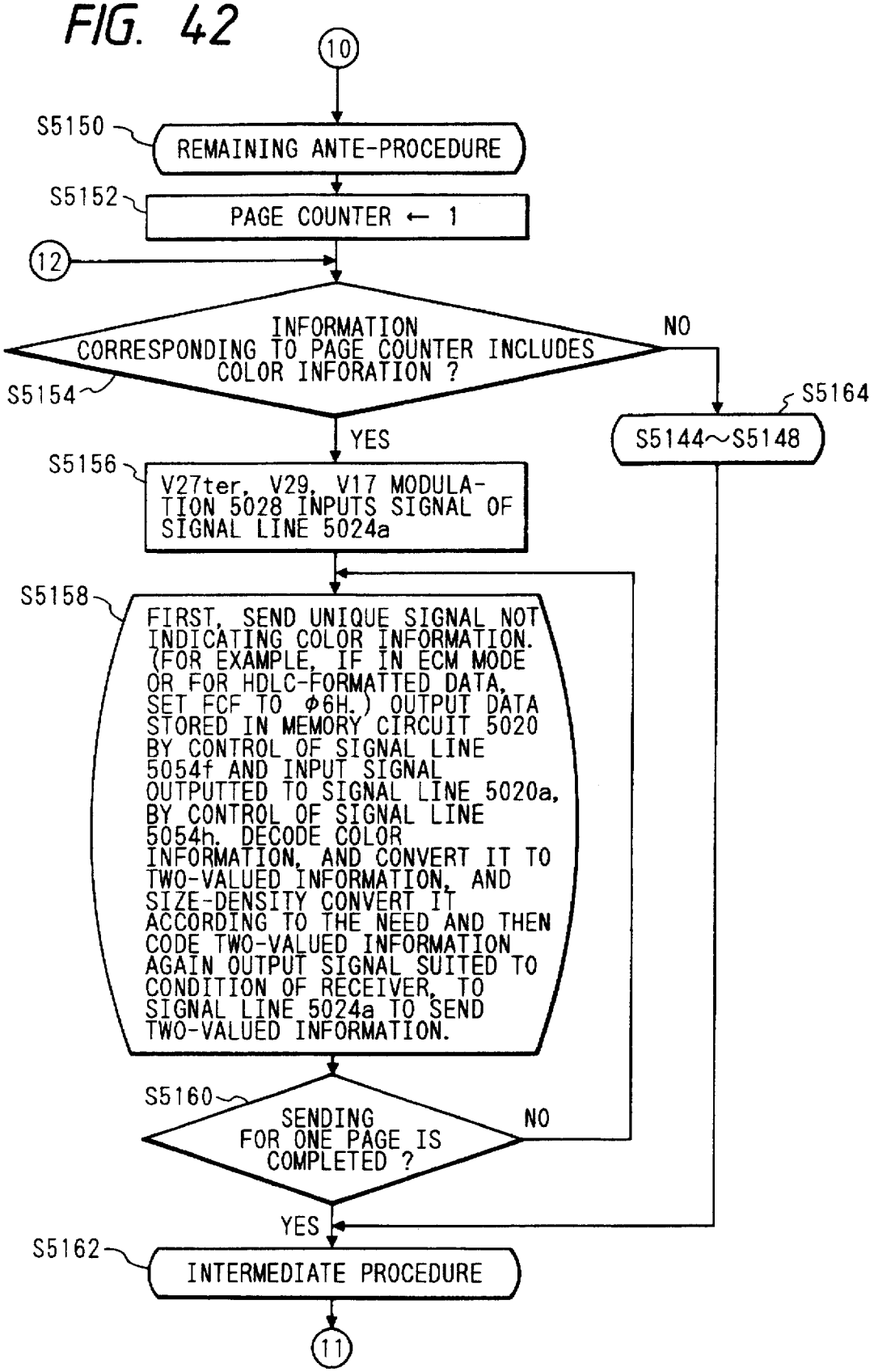

In FIG. 47, step S5260 represents the affirmative judgment (YES) in the step S5112 shown in FIG. 38.

Step S5262 represents the remaining anteprocedure. Here, the page numbers of the color page information and the total page number are notified to the receiver at the destination.

Step S5264 represents the step S5116 in FIG. 38.

Step S5266 represents the step S5228 in FIG. 46.

Step S5268 represents the anteprocedures. Here, the availability of the color receiving function is notified to the transmitter on the sending side. Also, when the page numbers of the color page information and the total page number are notified from the transmitter on the sending side, such notification is stored in the storing circuit 5048 for the color information or two-valued information in accordance with the page numbers.

In step S5270, whether the page numbers of the color page information and the total page number are notified or not is Judged. If notified, the process will proceed to step S5274. If not notified, the process will proceed to step S5272.

Step S5277 represent the step S5232 in FIG. 46.

In the step S5274, the page counter is incremented by one.

In step S5276, signals from the circuit 5048 for storing the color information or two-valued information are received in accordance with the page numbers, and whether the page information at the page counter is for color or not is judged. If the information is for color, the process will proceed to step S5280. If not for color, the process will proceed to step S5278.

The step S5278 represents the step S5252 in FIG. 46.

The step S5280 represents the step S5236 in FIG. 46.

Step S5282 represents the affirmative judgement (YES) in the step S5246 in FIG. 46.

In step S5284, whether the page numbers of the color page information and the total page number are notified from the transmitter on the sending side or not is judged. If notified, the process will proceed to step S5288. If not notified, the process will proceed to step S5286.

The step S5286 represents the step S5232 in FIG. 46.

In the step S5288, the page counter is incremented by one.

(Still Another Embodiment-3)

In the foregoing embodiment, it is considered that a unique signal which indicates a color information is additionally provided only for the leading portion of the image information in the case of a color information. However, this signal can be made a unique one which indicates the color information in every part of the image information. For example, in an ECM mode, an arrangement may be made so that all the FCF is set at 06H when a two-valued information is sent while all the FCF is set at 46H when a color information is sent.

(Still Another Embodiment-4)

For the memory sending and multiple sending in the foregoing embodiment, one communication is considered for the execution of an information to be sent. However, it may be possible to make an arrangement so that a plurality of communications are stored in the memory circuit. In this case, It is also necessary to make an arrangement so that the circuit 5048 can store a color information or a two-valued information corresponding to the page numbers of plural communications.

As described above, according to the present embodiment, there is provided means for discriminating a color information and a two-valued information in a facsimile apparatus capable of reading, transmitting and recording color information, and when a receiver at a destination is equipped with the color receiving function, a color information is transmitted for the page information which is discriminated by the aforesaid discriminating means as containing a color information, while transmitting a two-valued information for the page information which is discriminated by the aforesaid discriminating means as containing a two-valued information; if the receiver is not equipped with the color receiving function, a two-valued information is transmitted for all the page information.

Here, when any color information is transmitted, an indication of color information is additionally provided for the leading portion of each page information.

Also, when a memory sending or a multiple sending is executed, the total page number and page numbers of the color page information are notified to a receiver in the anteprocedures.

Furthermore, in a facsimile apparatus capable of color receiving and color recording, the color page information is recorded by a color recording means while the two-valued page information is recorded by a two-valued means.

In this way, even if a color information and a two-valued information are mixedly present, the machine makes a judgment automatically and sends a color information by the color transmission and records the color information; and sends a two-valued information by the two-valued transmission and records the two-valued information without requiring users' setting, thus making the apparatus more useful.

As described above, according to the present embodiment, even if a color information and a two-valued information are mixedly present, the machine makes a judgment automatically and sends a color information by the color transmission and records the color information; and sends a two-valued information by the two-valued transmission and records the two valued information without requiring users' setting, thus making the apparatus more useful.

Particularly, according to the present embodiment, in executing a memory sending, the page number discriminated as having a color information is stored, and prior to the execution of the memory sending, such numbers thus stored are sent to the destination. Hence, there is an effect that the control on the receiving side becomes significantly simple.

According to the present embodiment, there is an effect that the control on the receiving side becomes simple.

What is claimed is:

1. An image transmitting apparatus for transmitting image information in accordance with a selection of a destination, comprising:

transmitting means capable of transmitting color image information;

registering means for registering communication addresses and function data of a plurality of destinations correspondingly, the function data being capable of having three states which correspond to having a color receiving function, not having the color receiving function, and it being unknown whether the destination has the color receiving function, wherein said registering means automatically registers the communication address of a destination with the corresponding function data upon communication with that destination; and control means for controlling said image transmitting apparatus to perform three different procedures respectively in accordance with the three states of the function data registered by said registering means.

2. An image transmitting apparatus according to claim 1, further comprising:

means for notifying that the destination does not have the color receiving function.

3. An image transmitting apparatus, comprising:

discriminating means for discriminating for each of a plurality of images whether image information to be transmitted involves color information or not; and transmitting means capable of transmitting color image information, said transmitting means transmitting page information corresponding to results of discrimination by said discriminating means with respect to the plurality of images before the image information of the plurality of images is transmitted, where the page information includes an image number involving color page information.

4. An image transmitting apparatus, comprising:

discriminating means for discriminating, for each of a plurality of images, whether image information to be transmitted involves color information or not; and transmitting means capable of transmitting color image information, said transmitting means transmitting page information corresponding to outputs of said discriminating means with respect to the plurality of images, said transmitting means transmitting the color image information of the plurality of images after the page information in a first mode, and transmitting monochromatic image information in a second mode, where the page information includes an image number involving color page information.

5. An image transmitting apparatus according to claim 4, wherein the page information includes a total number of images and the image number involving color page information.

6. An image transmitting apparatus according to claim 4, wherein the color page information is recorded by color recording means, and two-valued image information is recorded by two-valued recording means.

7. An image transmitting apparatus according to claim 3, further comprising:

converting means for reading an original to be sent, and converting it into color image data.

8. An image transmitting apparatus according to claim 7, further comprising a memory for storing a plurality of pages of the image data to be sent.

9. An image transmitting apparatus according to claim 8, wherein said transmitting means transmits image data stored in said memory.

10. An image transmitting apparatus according to claim 1, further comprising converting means for reading an original to be transmitted, and converting it into color image data.

11. An image transmitting apparatus according to claim 1, further comprising a memory for storing a plurality of pages of the image data to be transmitted.

12. An image transmitting apparatus according to claim 1, further comprising discriminating means for discriminating whether a particular destination has the color receiving function or not by communicating with that destination.

13. An image transmitting apparatus according to claim 12, wherein the function data is initially registered as a state which indicates that it is unknown whether the destination has the color receiving function.

14. An image transmitting apparatus according to claim 13, wherein said registering means registers the function state in response to an output of said discriminating means.

15. An image transmitting apparatus according to claim 1, further comprising printing means for printing all registered destinations, respective telephone numbers and respective function data.

* * * * *